US012499597B2

(12) United States Patent
Tagra et al.

(10) Patent No.: US 12,499,597 B2
(45) Date of Patent: Dec. 16, 2025

(54) TECHNIQUES FOR CREATING DIGITAL COLLAGES

(71) Applicant: Adobe Inc., San Jose, CA (US)

(72) Inventors: Sanjeev Tagra, San Jose, CA (US); Sachin Soni, San Jose, CA (US); Prasenjit Mondal, San Jose, CA (US); Ajay Jain, San Jose, CA (US)

(73) Assignee: Adobe Inc., San Jose, CA (US)

( * ) Notice: Subject to any disclaimer, the term of this patent is extended or adjusted under 35 U.S.C. 154(b) by 176 days.

(21) Appl. No.: 18/372,625

(22) Filed: Sep. 25, 2023

(65) Prior Publication Data

US 2025/0104305 A1 Mar. 27, 2025

(51) Int. Cl.
| | |
|---|---|
| *G06T 11/60* | (2006.01) |
| *G06T 7/11* | (2017.01) |
| *G06T 7/73* | (2017.01) |
| *G06V 10/70* | (2022.01) |
| *G06V 40/10* | (2022.01) |

(52) U.S. Cl.
CPC ............... *G06T 11/60* (2013.01); *G06T 7/11* (2017.01); *G06T 7/74* (2017.01); *G06V 10/70* (2022.01); *G06V 40/10* (2022.01); *G06T 2200/24* (2013.01); *G06T 2207/20081* (2013.01); *G06T 2207/30196* (2013.01)

(58) Field of Classification Search
CPC . G06T 11/60; G06T 7/74; G06T 2207/30196; G06V 10/70
See application file for complete search history.

(56) References Cited

U.S. PATENT DOCUMENTS

| | | | | |
|---|---|---|---|---|
| 8,958,662 | B1* | 2/2015 | Grosz | G06T 3/4038 382/118 |
| 11,615,507 | B2 | 3/2023 | Mironică et al. | |
| 11,727,614 | B2* | 8/2023 | Kumar | G06N 3/045 345/619 |
| 11,762,622 | B1* | 9/2023 | Olsen | G06F 3/147 345/619 |
| 2020/0143514 | A1 | 5/2020 | Yadav et al. | |
| 2022/0101577 | A1* | 3/2022 | Chakrabarty | G06T 7/11 |
| 2025/0265751 | A1* | 8/2025 | Singh | G06F 40/40 |

FOREIGN PATENT DOCUMENTS

| | | | | |
|---|---|---|---|---|
| CN | 118710782 A | * | 9/2024 | G06N 3/0455 |
| CN | 119006636 A | * | 11/2024 | |

\* cited by examiner

*Primary Examiner* — Chante E Harrison
(74) *Attorney, Agent, or Firm* — KDW FIRM PLLC

(57) ABSTRACT

Systems and methods are disclosed for reflowing documents to display semantically related content. Embodiments may include receiving a request to view a document that includes body text and one or more images. A trimodal document relationship model identifies relationships between segments of the body text and the one or more images. A linearized view of the document is generated based on the relationships and the linearized view is caused to be displayed on a user device.

20 Claims, 31 Drawing Sheets

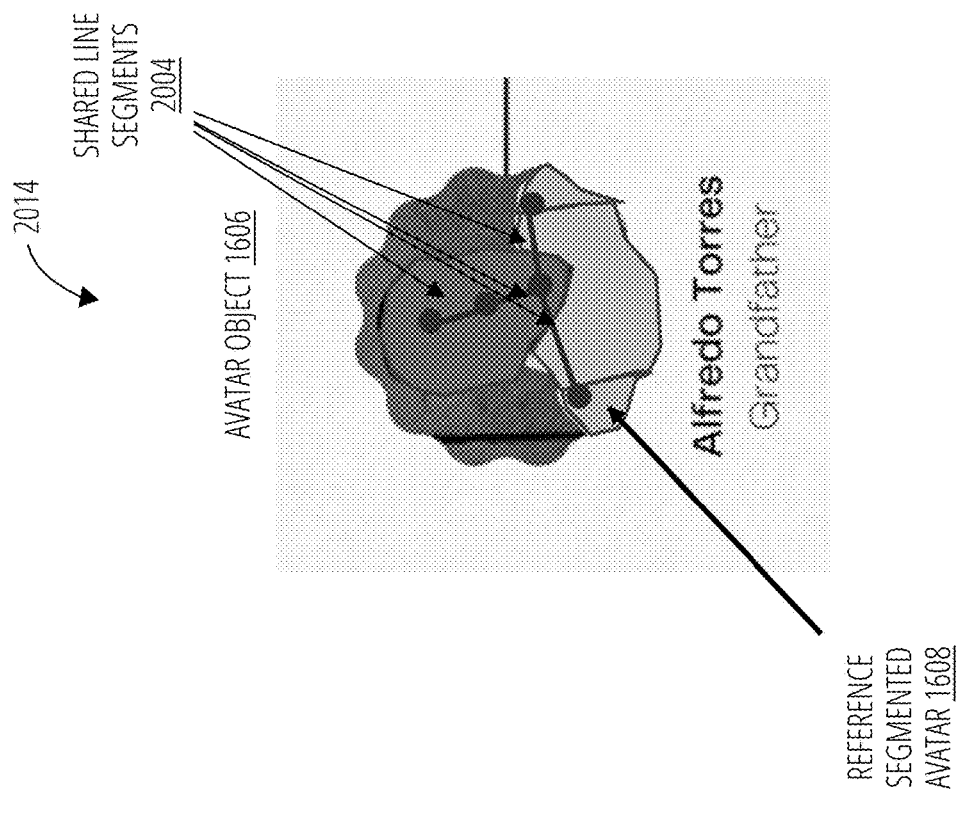
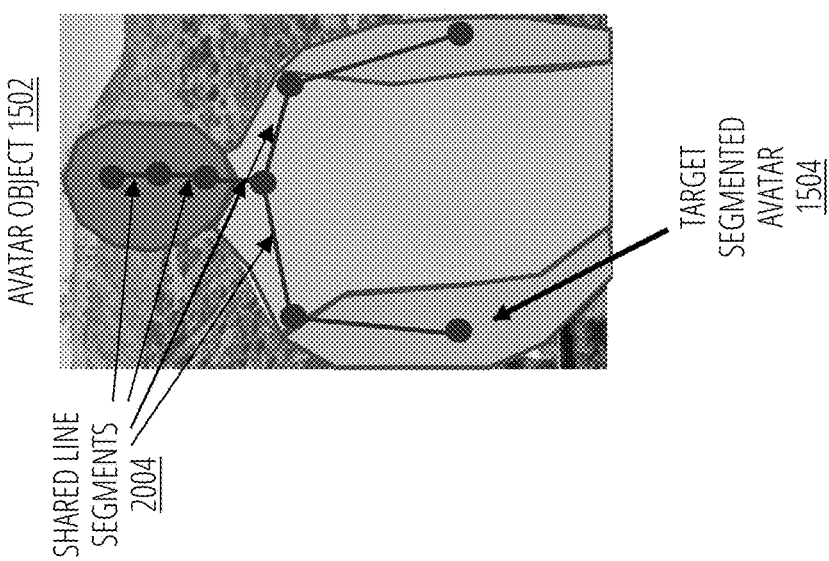
FIG. 20B

TECHNIQUES FOR CREATING DIGITAL COLLAGES

BACKGROUND

A digital collage is a form of artwork that merges and manipulates various digital elements such as images, graphics, and text to create a cohesive piece, leveraging computer software. This modern version of traditional paper-based collage art allows artists to collect, edit, assemble, and add final touches to their works more conveniently. Its versatile nature offers the ability to experiment with different arrangements, colors, textures, and effects with ease, while also enabling easy sharing online or printing for physical display.

SUMMARY

Embodiments are directed to techniques for an image editing system that enable a user to automatically add digital images into digital frames of a collage template to generate a digital collage. An imaging editing system allows a user to select a collage template and add a digital image such as a digital photo to each digital frame. Since the digital photo is not the same size or shape as the digital frame, the image editing system uses a fitting algorithm to automatically adjust a visual property or characteristic of the digital photo so that it fits within the borders of the digital frame. For example, the fitting algorithm may crop a portion of the image, adjust a visual property or characteristic of the cropped portion, and attempt to fit the adjusted cropped portion within the digital frame.

In order to properly fit the digital photo into the digital frame, the fitting algorithm uses a reference image that is associated with the digital frame as a guide or a model. The reference image is a digital photo that includes exemplary visual objects within a digital photo having a size and a shape that fits the digital frame in an aesthetically pleasing manner. For example, if a digital frame is designed to present a digital photo with a headshot of a person, the reference image is a digital photo with a headshot of a person with visual properties (e.g., size, shape, aspect ratio, color, etc.) suitable for the digital frame. The fitting algorithm uses artificial intelligence (AI) and machine learning (ML) techniques to identify a region of interest in the reference image, detect a visual object within the region of interest, and generate visual object data. In one embodiment, the visual object data comprises a reference segmented avatar. The reference segmented avatar is a stick diagram with key points, line segments and angles between line segments that represents body segments for a person within the reference image.

The fitting algorithm uses the visual object data of the reference image to identify a region of interest in the digital photo that includes a visual object. The fitting algorithm generates visual object data for the visual object. In one embodiment, the visual object data comprises a target segmented avatar. The target segmented avatar is a stick diagram with key points, line segments and angles between line segments to represent body segments for a person within the digital image. The fitting algorithm matches at least a portion of the target segmented avatar with the reference segmented avatar based on a shared set of key points, line segments, and/or angles between line segments. It then scales the region of interest comprising the target segmented avatar so that it matches a visual property of the reference segmented avatar (e.g., a height, a width, a focal point, aspect ratio, etc.). The fitting algorithm inserts the scaled region of interest from the digital photo into the digital frame of the collage template. The image editing system then repeats this process for the other digital frames, and it generates a digital collage from the digital template.

In various embodiments, a method, apparatus, system or computer-readable storage medium implements structure and operations that includes receiving a selection of a collage template to generate a digital collage, the collage template including a set of digital frames, each digital frame associated with a reference image. The embodiments include receiving a digital image for placement within a digital frame of the collage template. The embodiments include retrieving visual object data for a reference image associated with the digital frame using a machine learning (ML) model. The embodiments include identifying a visual object within a target region of interest (ROI) of the digital image based on the visual object data for the reference image using the ML model. The embodiments include adjusting a visual property of the target ROI to place the visual object in a defined position within the digital frame based on the visual object data. The embodiments include inserting the target ROI with the adjusted visual property into the digital frame of the collage template. Other embodiments are described and claimed.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

FIG. 20B illustrates an operating environment in accordance with one embodiment.

DETAILED DESCRIPTION

Figure 1:
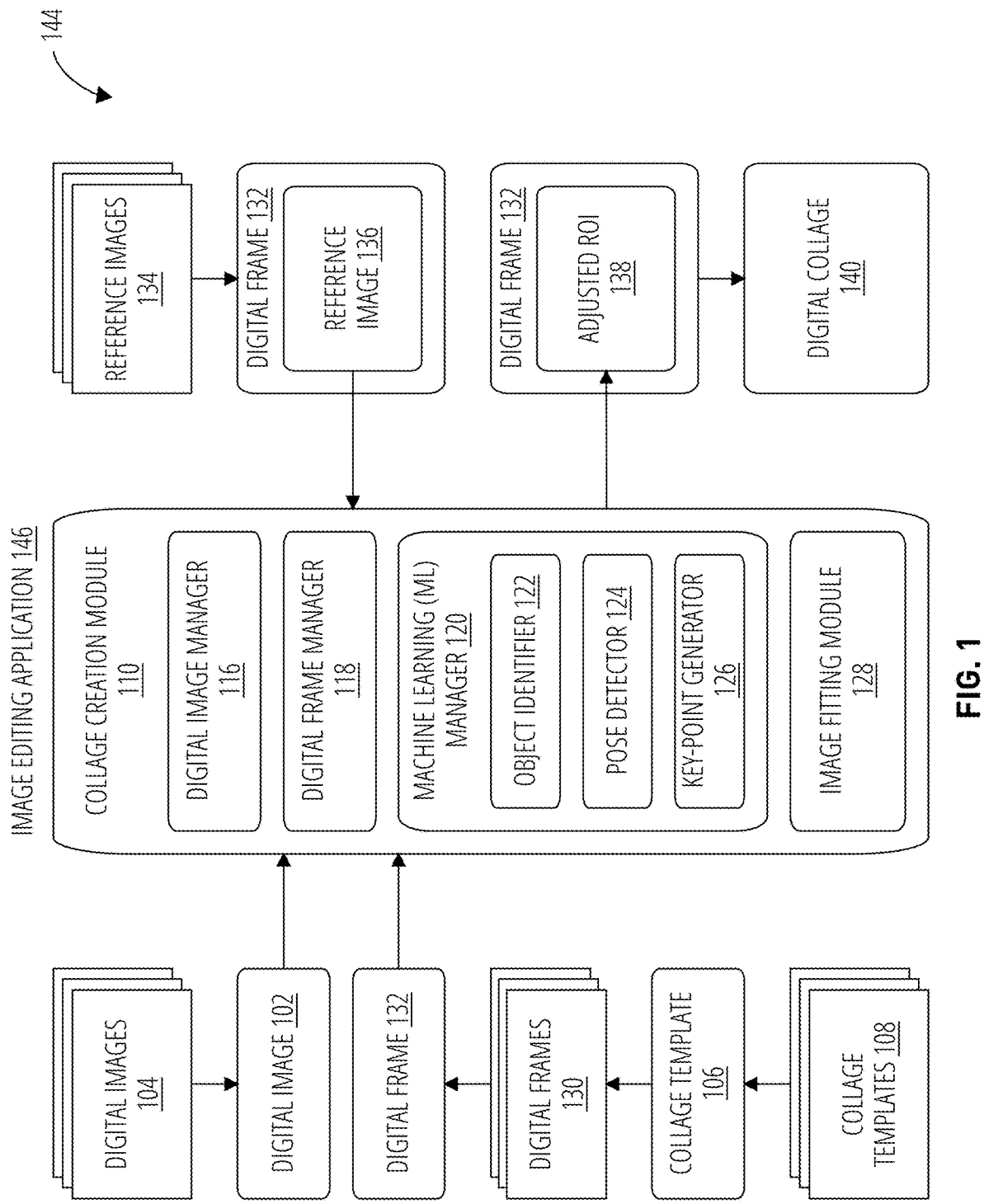
FIG. 1 illustrates an aspect of an apparatus in accordance with one embodiment.

Image editing systems provide different functionalities for visually transforming digital images. For instance, an image editing system enables a user to apply different editing operations to a digital image, such as image resizing, image cropping, color transformations, visual object extraction and replacement, and so forth. One particularly popular image editing functionality is the ability to combine multiple digital images into a composite image, often referred to as a collage or a digital collage. A digital collage comprises an overall composition frame that is partitioned into multiple smaller digital frames arranged in an asymmetric or artistic format. Each digital frame is designed to hold a separate digital image, such as a digital photograph. A user creates a digital collage to present a collection of digital photos in a way that conveys a certain theme, aesthetic, special event, or visual story. One example of an image editing system to create a digital collage is Adobe® Photoshop® Express®, made by Adobe Inc., San Jose, California, among others.

Conventional image editing systems that provide collage functionality typically enable a user to select a digital image and place it into a digital frame within a collage template. The image editing system uses a fitting algorithm that attempts to fit the digital image within the digital frame. When a size or shape of the digital image does not match a size or shape of the digital frame, the fitting algorithm resizes or crops the digital image to obtain a better fit. However, conventional fitting algorithms do not account for subject matter or composition within a digital image. For example, a digital image often has a region of interest that represents a visual focal point within the digital image. Consider, for instance, a digital photo of a person in an outdoor setting and that the person's face represents a region of interest within the digital photo. A conventional image editing system would typically process and place the digital photo into the digital frame based on the aggregate content of the digital photo, without considering the position and size of the person's face relative to the digital photo as a whole. This conventional placement technique often results in a suboptimal visual arrangement, such as not centering the person's face in the digital frame or making the person's face too big or too small relative to the borders of the digital frame.

In an attempt to mitigate such a scenario, user's that interact with conventional image editing systems manually manipulate digital images to arrive at an optimal arrangement of a digital image within a digital frame. For instance, a user manually transforms the digital images via interaction with the conventional image editing interface, such as through cropping and resizing, in order to fit the digital images into a visual arrangement that the user finds visually satisfactory. However, there are a multitude of different ways that a set of digital images can be moved, resized, cropped, and so forth, to place the digital images within a collage. This results in very large sets of possible visual arrangements that greatly reduce the likelihood that a user will manually generate a visual arrangement that presents each digital image in an optimal position within a digital frame. Further, such manual interactions with conventional image editing interfaces are extremely time consuming and require users to manually and individually select multiple different editing controls in repetitive processes in an attempt to arrive at a visual optimal arrangement of digital images in a digital collage.

Thus, conventional image editing systems that provide collage functionality typically fail to account for variations in digital image composition when placing digital images in a collage. Further, such conventional systems provide interfaces that are difficult and inefficient for a user to navigate when attempting to manually transform and arrange digital images to generate a collage. These drawbacks significantly reduce the likelihood that a visually optimal arrangement of digital images will be identified, particularly in scenarios that involve a collage with numerous digital images.

To overcome these and other problems, embodiments of an image editing system implements artificial intelligence (AI) and machine learning (ML) techniques for automatically generating a digital collage using digital images in a digital medium environment. The image editing system obtains a set of digital images to generate a digital collage, and identifies a collage template suitable for generating the digital collage using the digital images. The collage template includes a collection of digital frames arranged in a particular format. Each digital frame in the collage template is associated with a reference image. The reference image is a model digital image with visual elements suitable for placement in the digital frame to create a visually appealing and engaging photo with clear intention and meaning. The reference image varies according to a given collage template for a digital collage. For instance, if the collage template is designed for digital photos of individual people, the reference image is a person with a defined set of body segments (e.g., a face, neck and shoulders), a particular pose (e.g., a tilted head), a particular background (e.g., bright or dark), and so forth.

In one embodiment, for example, assume the model reference image depicts an image of a person in various poses. The image editing system identifies a region of interest in each of the digital images and associated reference images. A region of interest, for example, represents a focal point or set of focal points in a digital image, such as a human face or other body parts. A fitting algorithm for the image editing system then performs an image fitting operation for each digital image by automatically placing each digital image into a respective digital frame such that the region of interest for each digital image is prioritized in positioning the digital image in a respective digital frame. By way of example, the image editing system places each digital image into a respective digital frame such that the region of interest for each digital image is in a defined position within the respective digital frame. Examples of defined positions include without limitation left, right, center, top, bottom, or various intermediate positions between these positions. The defined positions are represented as coordinates in a Cartesian coordinate system, where points are represented by ordered pairs of numbers (x, y) on a two-dimensional plane.

In some implementations, and particularly where the region of interest is not located in the center of a digital image and/or where the aspect ratio of a digital image is different than that of a corresponding reference image associated with a digital frame, centering the region of interest of a digital image within a digital frame may result in empty spaces within the digital frame that are not filled by portions of the digital image. Accordingly, the image editing system may resize and move a digital image within a digital frame such that the entire digital frame is filled with the digital image, and the region of interest of the digital image is positioned at or near the center of the digital frame.

In this way, techniques for generating a digital collage using digital images provide automated processes for selecting appropriate collage templates for generating a digital collage using a set of digital images, and for optimizing visual placement of the digital images within a particular collage template. Consequently, the disclosed techniques are usable generate digital collages that preserve, to the extent possible, the integrity of regions of interest within constituent digital images. Since the described techniques fit digital images by considering regions of interest and not just digital images as a whole, the techniques can generate digital collages using non-standard frame shapes and arrangements. Further, by automatically processing and fitting digital images into collage templates, the disclosed techniques greatly reduce the number of user interactions required to generate a digital collage, thus conserving system resources and providing a more efficient image editing interface experience.

Using prior art systems, an image editing system attempts to automatically fit a digital photo into a digital frame of a collage template. However, the prior art fitting algorithms do not use a reference image. Rather, the fitting algorithm attempts to identify a region of interest with a prominent visual feature, such as a person, a mountain, a sunset, and so forth. It then centers the region of interest in the digital frame. This technique has multiple deficiencies. First, it guesses at the visual feature to center in the digital frame. Second, it does not scale the visual feature to fit the digital frame. For example, if the visual feature is a person's face, it may crop a region around the face and simply insert the cropped photo into the digital frame. This may cause the person's face to appear too large or too small relative to the borders of the digital frame. This may require a user to make manual adjustments to the cropped photo using complex and cumbersome manual editing tools. Third, prior art fitting algorithms do not use a machine learning algorithm to accelerate searches for a given region of interest in the digital photo, thereby dramatically increasing search times. Fourth, it automatically attempts to center a visual feature in the digital frame. In some cases, the visual feature should be offset from the center to achieve a particular aesthetic effect.

As a result, the deficiencies of the prior art fitting algorithms lead to inserting digital photos into digital frames in a mechanical and non-artistic manner, thereby causing a user to have to perform manual adjustments, which is significantly time-consuming and error prone, particularly when the user must do the same exercise for multiple photographs.

Embodiments attempt to solve these and other deficiencies of prior art systems. An image editing system implements AI/ML techniques to replace many of the manual tasks traditionally done by a user. The AI/ML techniques support generation of a digital collage using personal digital images by providing a set of automated processes for optimizing visual placement of the personal digital images within a particular collage template. Once a user selects a digital image and a target digital frame, AI/ML models automatically process the digital image to identify a region of interest within the digital image that contains a visual object representing one or more human beings, isolates one of the individuals, and crops a portion of the digital image so that only those body parts matching a reference image for the digital frame appear in the cropped portion. The image editing system then modifies one or more visual properties of the cropped image to ensure that any points of interest are placed within a border of the digital frame in an artistic and aesthetically pleasing manner. For example, if the reference image is a head and shoulders of a woman tilting her head, and her tilted head leans towards a left side of the border, the image editing system modifies a size, scale, rotation or position of the cropped image to match the head, shoulders, and tilt of the head in the cropped portion to the reference image. Consequently, the disclosed techniques are usable to generate digital collages that preserve, to the extent possible, the integrity of regions of interest within constituent digital images. Since the described techniques fit digital images by considering regions of interest and not just digital images as a whole, the techniques can generate digital collages using non-standard frame shapes and arrangements. Further, by automatically processing and fitting digital images into digital frames of collage templates, the disclosed techniques greatly reduce the number of user interactions required to generate a digital collage, thus conserving system resources and providing a more efficient image editing interface experience. Accordingly, the image editing system consumes less electronic resources, including: device resources such as compute and memory resources; device platform resources such as input/output (I/O) devices, peripheral components, and interfaces; network resources such as interconnect, wired and wireless bandwidth and associated protocol stack interfaces; cloud computing and data center resources; and other valuable and scarce computing and communications resources.

In the following discussion, an example environment is first described that may employ the techniques described herein. Example implementation details and procedures are then described which may be performed in the example environment as well as other environments. Consequently, performance of the example procedures is not limited to the example environment and the example environment is not limited to performance of the example procedures.

FIG. 1 is an illustration of an apparatus 144 in an example implementation that is operable to employ techniques for generating a digital collage using digital images described herein. The apparatus 142 comprises an image editing application 146. The image editing application 146 is representative of functionality to perform various editing interactions with digital images 104, such as various types of image transformations. In one embodiment, the image editing application 146 is suitable for implementation by a device in a digital collage system as further described in relation to FIG. 24.

The image editing application 146 provides functionality that allows a user to edit digital images 104. The digital images 104 are generally representative of different types of images that are stored in digital form, such as raster images, bitmap images, vector images, and so forth. In a typical, non-limiting implementation, the digital images 104 represent photographs that are captured in digital form by a digital camera, or that are converted into digital form. Embodiments are not limited in this context.

The image editing application 146 includes a collage creation module 110. The collage creation module 110 provides functionality that allows a user to create a digital collage 140. A digital collage 140 comprises an overall composition frame that is partitioned into multiple smaller digital frames 130 arranged in a symmetric, asymmetric or artistic format. Each digital frame 132 is designed to hold a separate digital image 102, such as a digital photograph. A user creates a digital collage 140 to present a collection of digital photos in a way that conveys a certain theme, aesthetic, special event, or visual story.

The collage creation module 110 implements a set of collage creation tools to assist a user in automatically placing digital images 104 into corresponding digital frames 130 of a collage template 106 from a set of collage templates 108. The collage templates 108 represent data that describes different ways for arranging different sets of the digital images 104. For instance, the collage templates 108 include different arrangements or patterns of digital frames 130 into which sets of the digital images 104 can be placed to create the digital collage 140. Accordingly, the digital collage 140 represents different composite digital images that are generated by arranging sets of the digital images 104 according to different collage templates 108. The collage creation module 110 generates the digital collage 140 from the collage templates 108.

The collage creation module 110 includes a digital image manager 116. The digital image manager 116 generally manages a set of digital images 104 for the image editing application 146. The digital image manager 116 receives a digital image 102 for placement within a digital frame 132 of the collage template 106. For example, a user manipulates an input/output (I/O) device to interact with an image editing graphical user interface (GUI) to select the digital image 102, and the user initiates an action to place to the digital image within the digital frame 132. When necessary, the digital image manager 116 converts or transforms the digital images 104 from a native format to a format suitable for the collage creation module 110.

The digital frame manager 118 also analyzes various visual properties or characteristics for a digital image 102. The visual properties or characteristics collectively determine an overall appearance and quality of the digital image 102, impacting how it is perceived and interpreted by viewers. Examples of visual properties or characteristics for the digital image include without limitation resolution, size, color depth, color space, brightness and contrast, hue saturation and value (HSV), composition, texture, perspective, noise, and so forth. The digital image manager 116 outputs the digital images 104 or digital image data representing the digital images 104 to the ML manager 120.

The collage creation module 110 includes a digital frame manager 118. The digital frame manager 118 generally manages a set of digital frames 130 for the image editing application 146. It receives as input a digital frame 132 from a set of digital frames 130. For example, the user selects the digital image 102 and drags the digital image 102 to within a border of the digital frame 132. The set of digital frames 130 are part of a collage template 106 from a set of collage templates 108. Each of the digital frames 130 has a set of visual properties or characteristics suitable to frame a digital image 102, such as a border, a border edge, an image presentation area, a dimension, a size, a shape, a background, and so forth. The digital frame manager 118 analyzes the visual properties or characteristics of a given digital frame 132, and it outputs frame data representing the digital frame 132 to the image fitting module 128.

The collage creation module 110 includes an ML manager 120. The ML manager 120 is a machine learning model specifically designed to support and accelerate certain collage creation operations of the collage creation module 110. In one embodiment, for example, the ML manager 120 comprises a trained convolutional neural network (CNN), such as a region based CNN (R-CNN) or a fast R-CNN, among others. One example operation is to generate visual object data from a reference image 136. For example, the ML manager 120 identifies a region of interest (ROI) within a reference image 136, referred to herein as a "reference ROI". The ML manager 120 detects a visual object within the reference ROI, and generates visual object data representing the visual object. In another example operation, the ML manager 120 uses the visual object data derived from the reference image 136 to search for matching visual objects within the digital image 102. For example, the ML manager 120 identifies a ROI within the digital image 102, referred to herein as a "target ROI". The ML manager 120 detects a visual object within the target ROI, and generates visual object data representing the visual object.

The collage creation module 110 processes the digital image 102 to ensure it properly fits within the digital frame 132 in an aesthetically pleasing manner. To ensure a proper fit of the digital image 102 in the digital frame 132, the image fitting module 128 of the collage creation module 110 retrieves a reference image 136 from a set of reference images 134 to act as a guide. Each reference image 136 of the reference images 134 is associated one or more of the digital frames 130.

The reference image 136 is a model digital image with predefined visual elements suitable for placement in the digital frame to create a visually appealing and engaging photo with clear intention and meaning. More particularly, the reference image 136 is a model digital image that includes exemplary visual objects within the model reference image having a size and a shape that fits the digital frame 132 in an aesthetically pleasing manner. A reference image 136 varies according to a given digital frame 132 and/or a collage template 106 for a digital collage 140. For instance, if the collage template 106 is designed to present digital images 104 of individual people, the reference image 136 is a person with a defined set of body segments (e.g., a face, neck and shoulders), a particular pose (e.g., a tilted head), a particular background (e.g., bright or dark), and so forth. For example, if a digital frame 132 is designed to present a digital photo with a headshot of a person, the reference image 136 is a digital photo with a headshot of a person with certain visual properties (e.g., size, shape, aspect ratio, color, etc.) suitable for presentation by the digital frame 132.

In various embodiments, the visual object data for both the reference image 136 and the digital image 102 comprises a segmented avatar representative of segmented body parts for a human being. The ML manager 120 is designed to detect visual objects representative of partial views or full views of human beings within the reference image 136 and the digital image 102. More particularly, the ML manager 120 is tuned to detect individual body segments for a human being, such as head, neck, shoulders, arms, legs, torso, and other anatomical body parts. The ML manager 120 identifies and generates a reference segmented avatar for a person within the reference ROI. In some embodiments, the ML manager 120 uses the reference segmented avatar to quickly locate a target ROI having a person within the digital image 102. The ML manager 120 then identifies and generates a target segmented avatar for the person within the target ROI.

In general, a segmented avatar is a lower-fidelity digital or graphical representation of a person comprising various body parts or body segments. In one embodiment, a segmented avatar is a minimally detailed stick diagram or stick figure of a person composed of a few lines and dots. In one embodiment, a stick diagram conveys basic universal information for a person that is useful for rapid identification of a higher-fidelity version of a person within a digital image, such as digital images 104 and reference images 134. In another embodiment, a pair of stick diagrams, such as from a digital image 102 and a reference image 136, are compared and analyzed to determined measured differences between the stick diagrams. The image fitting module 128 uses the measured differences to modify or adjust visual properties, characteristics or parameters associated with the target ROI to better fit within the digital frame 132.

In its most basic form, a stick diagram comprises key-points to represent parts of body segments of a person, line segments between adjacent key-points to represent entire body segments of the person, and angles between adjacent line segments to represent articulated joints for the body segments of the person. Given a human arm, for example, a set of key-points represent various parts of the arm, a set of line segments between adjacent key-points represents the entire arm, and angles between adjacent line segments represent a bend at a wrist, elbow, or shoulder of the arm. In this manner, the image fitting module 128 uses the stick diagrams to quickly measure and approximate relative size and shapes between visual objects for better placement within borders of a digital frame 132.

In various embodiments, the ML manager 120 is a R-CNN, a fast R-CNN or a faster R-CNN trained to generate a reference segmented avatar and a target segmented avatar using an object identifier 122, a pose detector 124, and a key-point generator 126. The object identifier 122 identifies a visual object within a ROI in a digital image, such as a target ROI in the digital image 102 and a reference ROI in the reference image 136. In one embodiment, for example, the visual object is an image or view of a person. The object identifier 122 generates visual data representative of the visual object, and it outputs the visual data for the visual object to the pose detector 124.

The pose detector 124 detects a pose for a person within a given ROI based on the visual data from the object identifier 122. A pose refers to a position or arrangement of an entire body for a person or certain body segments for the person. Examples of a pose include standing or leaning in a certain way, tilting of a head, arrangement of arms and legs, and so forth. The pose detector 124 detects pose information for the person in the ROI, and it identifies and highlights various body segments for the person. The pose information allows for more accurate identification of body segments of a person, particularly when the image of the person is performing certain dynamic actions, such as running, jumping, twisting, and other dynamic movement that confuse detection of certain body segments. The pose detector 124 outputs the pose information to the key-point generator 126.

The key-point generator 126 generates a set of key-points from the visual data and the pose information. Each key-point comprises a dot in a stick diagram. In one embodiment, the key-point generator 126 uses a defined reference key-point model of a human being to assist in generating the set of key-points. The set of key-points represent various points within a given body segment, such as a head, neck, shoulders, and so forth. For example, assume a body segment is a human head. The key-point generator 126 generates a sub-set of key-points from the set of key-points that represent the human head. In some cases, the sub-set of key-points comprise 3 key-points (e.g., dots) positioned at a forehead, nose, and chin of the human head. The key-point generator 126 then uses an avatar build algorithm to build a segmented avatar from the key-points by connecting adjacent key-points with line segments and calculating angles between adjacent line segments.

The ML manager 120 identifies and generates a reference segmented avatar for a person within the reference ROI of the reference image 136. In one embodiment, the ML manager 120 generates the visual object data for the reference segmented avatar in a pre-processing stage during creation of the collage template 106, and it stores the visual object data in a database for retrieval during collage creation operations. For example, when a user selects a digital image 102 for placement in a digital frame 132, the image fitting module 128 retrieves the visual object data for the reference image 136 from the database. In one embodiment, the ML manager 120 generates the visual object data in real-time during collage creation operations. For example, when a user selects a digital image 102 for placement in a digital frame 132, the ML manager 120 generates the visual object data for the reference image 136 contemporaneously with processing the digital image 102, and it outputs the visual object data to the image fitting module 128 in real-time during fitting operations for the digital image 102.

In one embodiment, the ML manager 120 identifies a visual object within the target ROI of the digital image 102 based on the shared set of key points, line segments, or angles between line segments for the reference segmented avatar and the target segmented avatar. For example, the ML manager 120 uses the reference segmented avatar to quickly locate a target ROI having a person within the digital image 102. For instance, the ML manager 120 determines that the reference segmented avatar represents a person, and it searches the digital image 102 for a person. In another example, the ML manager 120 identifies matching portions for the reference segmented avatar and the target segmented avatar, where the matching portions comprise a shared set of key points, line segments, or angles between line segments. The ML manager 120 then searches the digital image 102 for portions of a person, such as certain body parts (e.g., a head, neck, and shoulders). This quickly eliminates various ROI within the digital image 102 that do not contain visual objects representing a human being or specific parts of a human being based on the matching portions, thereby accelerating search operations for the ML manager 120. In another example, the ML manager 120 determines that the reference segmented avatar represents a person sitting in a chair, and it searches the digital image 102 for visual objects associated with a person, a chair, or both a person and chair.

In one embodiment, the ML manager 120 does not use the reference segmented avatar to search the digital image 102. For example, the ML manager 120 is previously tuned to specifically detect human beings. In such cases, the ML manager 120 does not need any information from the reference image 136 to conduct a search for relevant visual objects within the digital image 102. It immediately begins scanning operations for a target ROI within the digital image 102, and the image fitting module 128 uses the reference segmented avatar for image fitting operations.

In some cases, the digital image 102 contains multiple visual objects representing multiple people. In this case the ML manager 120 identifies each person independently. It generates a target segmented avatar for each person. It then compares each target segmented avatar with the reference segmented avatar. The ML manager 120 selects a target segmented avatar from the multiple target segmented avatars with the highest number of shared characteristics with the reference segmented avatar, such as the highest number of shared key-points, shared line segments, and/or shared angles between line segments.

Once the ML manager 120 identifies a target ROI comprising a person, the ML manager 120 generates a target segmented avatar for the person within the target ROI. Similar to the reference segmented avatar, the target segmented avatar is a stick diagram composed of a set of key-points representing a human being, a set of line segments connecting adjacent key-points representing body segments for the human being, and a set of angles between line segments representing articulated joints of adjacent body segments. The ML manager 120 outputs both the reference segmented avatar and the target segmented avatar to the image fitting module 128.

The image editing application 146 provides functionality that allows a user to select a collage template 106 and add a digital image 102 (e.g., a digital photo) to a digital frame 132. Since the digital image 102 is typically not the same size or shape as the digital frame 132, the image editing application 146 includes an image fitting module 128 that implements a fitting algorithm to automatically adjust a visual property of the digital image 102 so that it fits within the borders of the digital frame 132. For example, the image fitting module 128 crops a portion of the digital image 102 and adjusts various visual properties, characteristics or parameters associated with the target ROI in an attempt to fit the cropped portion within an image presentation area of the digital frame 132.

The image fitting module 128 manages execution of a fitting algorithm to fit the target ROI from the digital image 102 in the digital frame 132. The image fitting module 128 receives the reference segmented avatar, the target segmented avatar, and information for a target ROI from the ML manager 120. It also receives the digital image 102 from the digital image manager 116 and the frame data for the digital frame 132 from the digital frame manager 118. The image fitting module 128 compares the reference segmented avatar with the target segmented avatar to find matching parts. The image fitting module 128 also uses the frame data for the digital frame 132 to better understand its shape, size, and aesthetics.

The fitting algorithm uses knowledge of the matching parts of the segmented avatars along with the visual properties and characteristics of the digital frame 132, and automatically adjusts one or more visual properties associated with the target ROI containing the visual object represented by the target segmented avatar so that the target ROI matches one or more visual properties of the reference segmented avatar (e.g., a height, a width, a focal point, etc.). The result of this process is an adjusted ROI 138 relative to the target ROI. For example, the image fitting module 128 crops the target ROI from the digital image 102, and it attempts to scale the cropped portion to match the reference ROI in order to fit the cropped portion within the digital frame 132 in a defined manner. With respect to scaling operations, the image fitting module 128 increases or decreases a height or width of the target ROI to match a height or width of the person within the reference ROI. As another example of scaling operations, the image fitting module 128 increases or decreases a height or width of the target ROI to ensure it fills an entire image presentation area of the digital frame 132. In yet another example of scaling operations, the image fitting module 128 moves the target ROI within the image presentation area of the digital frame 132 to place a person in a certain defined position within the image presentation area, such as a top, bottom, center, left or right position. An example of a defined position is a position of a person in the target ROI with a focal point that matches a position of a person in the reference ROI of the reference image 136.

In some cases, scaling and movement of the target ROI causes blank portions in the image presentation area of the digital frame 132. In such cases, the ML manager 120 uses various ML techniques to generate image filler data to match the background scene of the target ROI, and it fills the blank portions with the image filler data. Alternatively, it moves the person within the target ROI, and it fills blank areas caused by the movement of the person, such as the previously occupied space within the target ROI.

The image fitting module 128 adjusts one or more visual properties, characteristics or parameters of the target ROI, and it creates an adjusted ROI 138 relative to the target ROI that fits within the digital frame 132 in an aesthetically pleasing manner. The image fitting module 128 inserts the adjusted ROI 138 from the digital image 102 into the digital frame 132 of the collage template 106.

The image editing application 146 repeats this fitting process for the other digital images 104 and the remaining digital frames 130 of the collage template 106. After all the digital images 104 are automatically added to the corresponding digital frames 130, the image editing application 146 generates a digital collage 140 from the collage template 106.

As a non-limiting example of the operations for the image editing application 146, the collage creation module 110 receives a selection of a collage template 106 to generate a digital collage 140. The collage template 106 includes a set of digital frames 130, each digital frame 132 associated with a reference image 136. The digital image manager 116 of the collage creation module 110 receives a digital image for placement within a digital frame 132 of the collage template 106. The ML manager 120 of the collage creation module 110 retrieves or generates visual object data for a reference image 136 associated with the digital frame 132 using a machine learning algorithm, such as an R-CNN or fast R-CNN. The ML manager 120 identifies a visual object within a target ROI of the digital image 102 based on the visual object data for the reference image 136 using the machine learning algorithm. The image fitting module 128 adjusts a visual property of the target ROI to place the visual object in a defined position within the digital frame 132 based on the visual object data. The image fitting module 128 inserts the target ROI with the adjusted visual property into the digital frame 132 of the collage template 106.

In one embodiment, the ML manager 120 generates a target segmented avatar representing the visual object within the target ROI of the digital image 102. The visual object includes a person with a set of body segments. The target segmented avatar includes a set of key points, line segments, and angles between line segments representing the set of body segments for the person. The target segmented avatar is further described with reference to FIG. 15.

In one embodiment, the visual object data for the reference image 136 includes a reference segmented avatar representing a visual object within a reference ROI of the reference image 136. The visual object includes a person with a set of body segments. The reference segmented avatar includes a set of key points, line segments, and angles between line segments representing the set of body segments for the person. The reference segmented avatar is further described with reference to FIG. 16.

Once all the digital images 104 are automatically fitted into corresponding digital frames 132 of the collage template 106, the collage creation module 110 generates the digital collage 140 using the populated collage template 106. The image editing application 146 causes the digital collage 140 to be presented on an electronic display of an electronic device. The electronic device is either a local client device implementing the image editing application 146, or a remote client device separate from a server device implementing the image editing application 146. In the former case, the image editing application 146 presents the digital collage 140 on an image editing graphical user interface (GUI) displayed on an electronic display of the local client device. In the latter case, the image editing application 146 causes the server device to send information for the digital collage 140 over a network to the remote client device for presentation by an image editing GUI on an electronic display of the remote client device.

Figure 2:
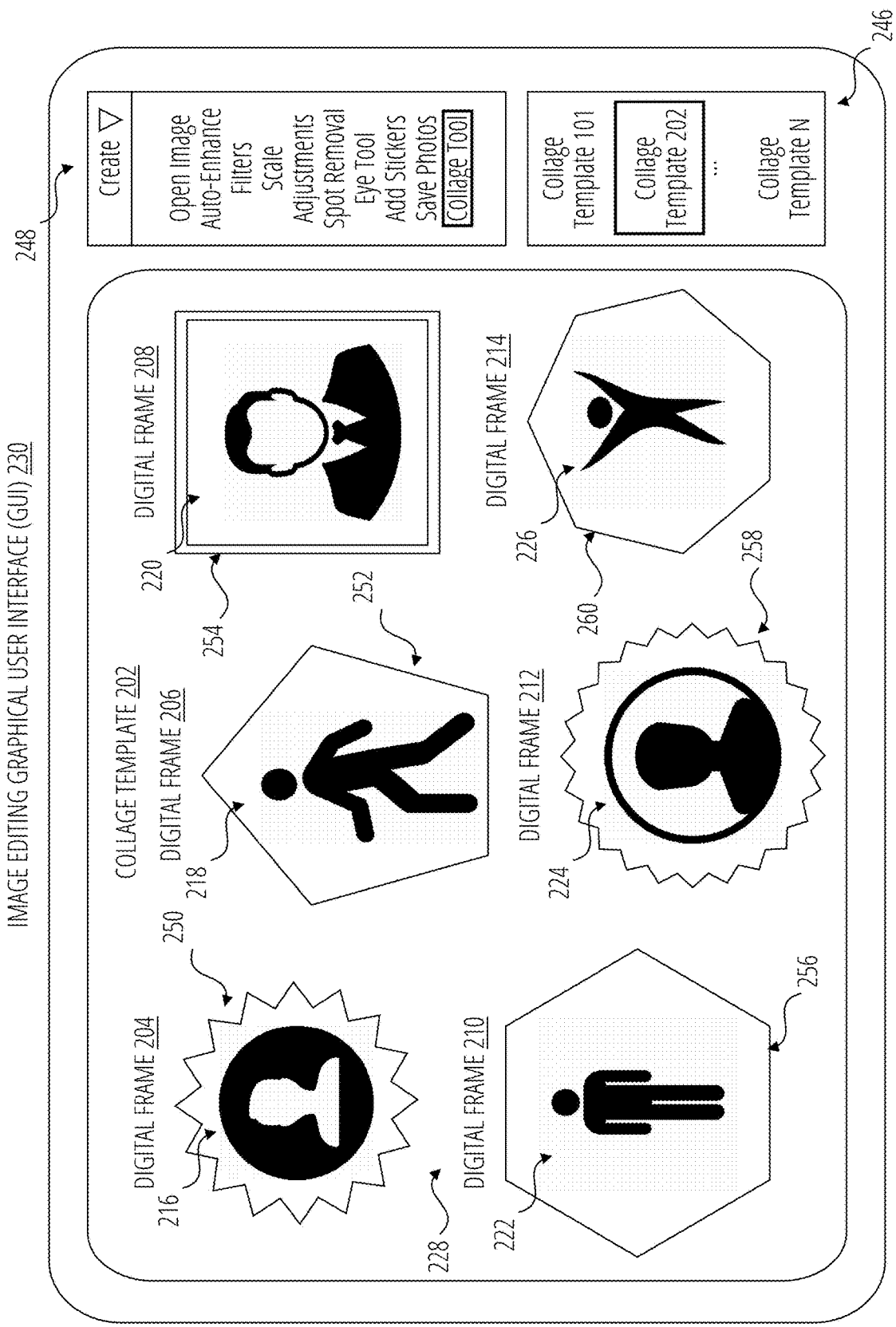
FIG. 2 illustrates an aspect of a collage template in accordance with one embodiment.

FIG. 2 illustrates an example of an image editing graphical user interface (GUI) 230. To enable users to interact with the image editing application 146, such as to create instances of the digital collage 140, the image editing application 146 includes an image editing GUI 230 displayed on an electronic display of an electronic device, such as a client device.

The image editing GUI 230 is representative of functionality to present various visual affordances for interacting with the image editing application 146. The image editing GUI 230, for example, receives user input to invoke various actions by the image editing application 146. For instance, a user may provide input to the image editing GUI 230 to select a set of digital images 104 and to select a collage template 106 to cause the image editing application 146 to generate an instance of a digital collage 140. The user utilizes an input/output (I/O) device, such as a mouse or trackpad on a desktop computer, a finger on a touch-screen display, or a microphone to accept voice commands. The user manipulates the I/O device to access a photo menu 248 having a "Create" sub-menu with several image editing operations, such as "Open Image" and "Auto-Enhance" and "Filters" and so forth. The user selects the "Collage Tool" option which presents a template set 246 comprising a "Collage Template 101" and a "Collage Template 202" and a "Collage Template N", where N represents any positive integer.

The image editing system obtains a set of digital images 104 to generate a digital collage 140, and identifies a collage template 106 suitable for generating the digital collage 140 using the digital images 104. By way of example, as depicted in the image editing GUI 230, assume the user selects "Collage Template 202". In response, the image editing GUI 230 presents the collage template 202 comprising a set of 6 digital frames 130, denoted as digital frame 204 through digital frame 214, arranged in an example frame arrangement 228.

Each digital frame 204 through digital frame 214 comprises a border 250 through border 260, respectively, each with different visual effects such as different geometric shapes, sizes, border edges, heights, widths, and so forth. In addition, each digital frame 204 through digital frame 214 comprises an image presentation area that is designed to presents an associated reference image 136, denoted as reference image 216 through reference image 226, respectively. As previously described, the reference image 136 is a model digital image with visual elements suitable for placement in the digital frame to create a visually appealing and engaging photo with clear intention and meaning. The reference image 136 varies according to a given collage template 106 for a digital collage 140. For instance, if the collage template 106 is designed for digital images 104 of individual people, the reference image 136 is a person with a defined set of body segments (e.g., a face, neck and shoulders), a particular pose (e.g., a tilted head), a particular background (e.g., bright or dark), and so forth. In this example, the reference image 216 associated with the digital frame 204 depicts a headshot of a person, the reference image 218 associated with the digital frame 206 depicts a person walking, the reference image 220 associated with the digital frame 208 depicts a head and shoulders for a man in a business suit, the reference image 222 associated with the digital frame 210 depicts a man standing, the reference image 224 associated with the digital frame 212 depicts a head and shoulders for a woman, and the reference image 226 associated with the digital frame 214 depicts a boy jumping.

It may be appreciated that the collage template 202 illustrates only a few non-limiting examples of a reference image 136, and any reference image 136 is acceptable as long as it provides a suitable guide, model or reference for a given digital frame 132. Further, while the example reference images 134 are depicted as clip-art icons for purposes of clarity and description, in practical implementation the reference images 134 are generally representative of different images that are stored in digital form, such as raster images, bitmap images, vector images, and so forth. In a typical, non-limiting implementation, the reference images 134 represent photographs that are captured in digital form by a digital camera, or that are converted into digital form. Embodiments are not limited in this context.

Figure 3:
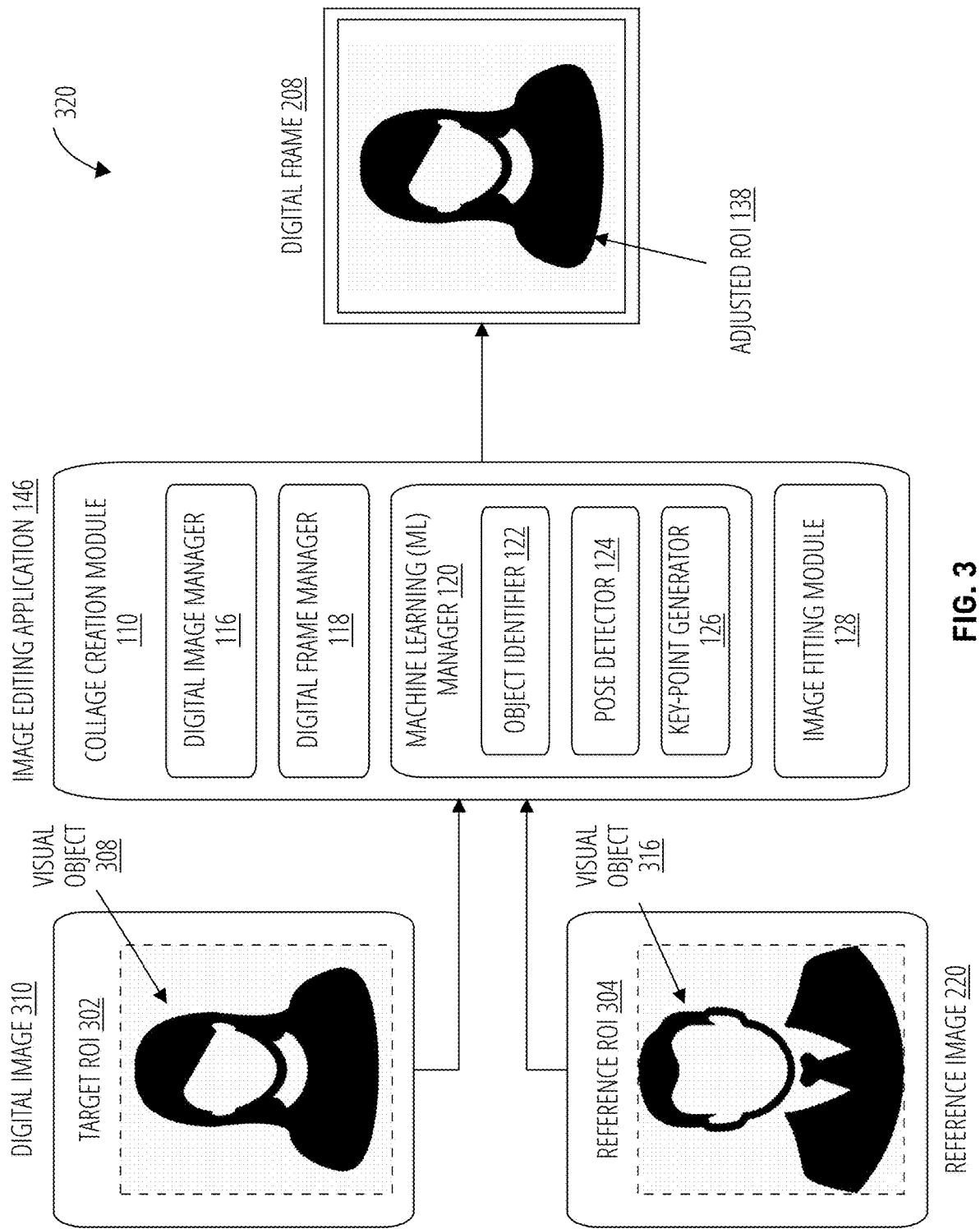
FIG. 3 illustrates an aspect of an operating environment in accordance with one embodiment.

FIG. 3 illustrates an operating environment 320 depicting operations for the image editing application 146. More particularly, the operating environment 320 illustrates an example of general operations performed by the image editing application 146 to automatically fit a new digital image 310 within the digital frame 208 of the collage template 202.

Assume a user wants to replace the reference image 220 associated with the digital frame 208 depicting a head and shoulders of a man in a business suit with a digital image 310 depicting a head and shoulders of a woman in a business dress. The user accesses the image editing application 146, and they use an I/O device to manipulate the image editing GUI 230 to select the collage template 202 and drag and drop digital images 104 into digital frames 132 of the collage template 106 to generate a digital collage 140.

As depicted in FIG. 3, the user adds a digital image 310 such as a digital photo to a digital frame 208. Since the digital photo is not the same size or shape as the digital frame 208, the image editing application 146 uses the ML manager 120 and the image fitting module 128 to execute a fitting algorithm to automatically adjust a visual property of the digital image 310 so that it fits within the borders of the digital frame 208. For example, the image fitting module 128 crops a portion of the digital image 310 and attempts to re-size the cropped portion within the digital frame 208 using the reference image 220 as a guide or model.

The ML manager 120 of the image editing application 146 identifies matching ROIs between the digital image 310 and the reference image 220 associated with the digital frame 208. An ROI, for example, represents an area around a focal point or set of focal points in a digital image, such as a visual object representing a human face or other body parts. In one embodiment, for example, the object identifier 122 of the ML manager 120 implements a fast region based convolutional neural network (R-CNN) model for object region detection. As depicted in operating environment 320, the object identifier 122 processes the reference image 220 and it identifies a reference ROI 304.

The ML manager 120 generates visual object data representing visual objects within the reference ROI 304. The object identifier 122 processes the reference ROI 304 to identify a visual object 316 within the reference ROI 304, which in this example is a head and shoulders for a man. The pose detector 124 processes the visual object 316 to detect a pose for the image of the man, such as standing, sitting, running, leaning, and so forth. In this case, the visual object 316 of the man is vertically aligned with a vertical y-axis and horizontally aligned with a horizontal x-axis. The key-point generator 126 generates a set of key points representative of the head and shoulders of the visual object 316. The key-point generator 126 connects adjacent key-points with line segments, and calculates angles between line segments, to generate a reference segmented avatar. The reference segmented avatar appears as a stick diagram as further discussed with reference to FIG. 16.

In order to properly fit the digital image 310 into the digital frame 208, the collage creation module 110 uses the reference image 220 that is associated with the digital frame 208 as a reference guide or model. The reference image 220 is a digital photo that includes exemplary visual objects within a digital photo having a size and a shape that fits the digital frame 208 in an aesthetically pleasing manner. In this example, the digital frame 208 is artistically designed to present a head and shoulders for a person. As such, since the digital frame 208 is designed to present a digital photo with a headshot of a person, the reference image 220 is a digital photo with a headshot of a person with visual properties (e.g., size, shape, aspect ratio, color, etc.) suitable for the digital frame 208.

The ML manager 120 uses the visual object data of the reference image 220 to identify a target ROI 302 in the digital image 310 that includes a visual object 308. For example, the visual object data for the visual object 316 of the reference ROI 304 is an image of a head and shoulders of a person, which in this case is a man. With this information, the ML manager 120 searches the digital image 310 for the target ROI 302 with a visual object 308 that comprises an image of a head and shoulders of a person, which in this case is a woman. The ML manager 120 generates visual object data for the visual object 308. In one embodiment, the visual object data comprises a target segmented avatar. The target segmented avatar is a stick diagram with key points, line segments and angles between line segments to represent body segments for a person within the digital image as further discussed with reference to FIG. 15.

The image fitting module 128 matches at least a portion of the target segmented avatar with the reference segmented avatar. In this example, the target segmented avatar is a stick diagram representing a head and shoulders of the visual object 308 and the reference segmented avatar is a stick diagram representing a head and shoulders of the visual object 316. When there is a size difference between the stick diagrams, the image fitting module 128 scales a visual property of the target ROI 302 comprising the visual object 308 so that it matches a visual property of the reference ROI 304 comprising the visual object 316. For example, the image fitting module 128 adjusts a height, a width, a focal point, a position, and so forth. The fitting algorithm inserts an adjusted ROI 314 from the digital image 310 into the digital frame 208 of the collage template 202. The image editing application 146 then repeats this process for the other digital frames in the collage template 202, such as digital frame 204, digital frame 206, digital frame 210, digital frame 212 and digital frame 214. The image editing application 146 then generates a digital collage 140 from the collage template 202.

Figure 4:
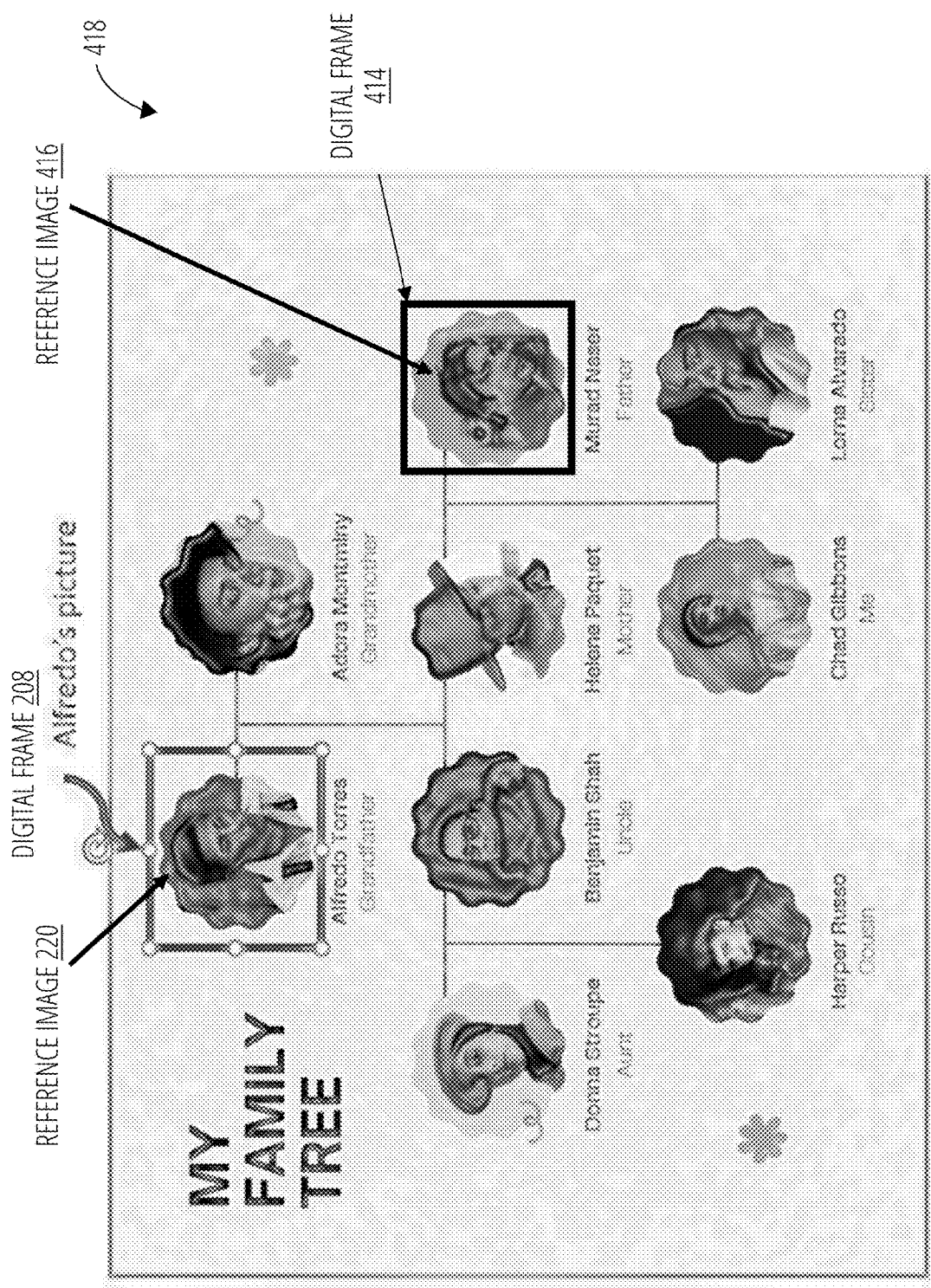
FIG. 4 illustrates an example of a collage template in accordance with one embodiment.

FIG. 4 illustrates an operating environment 418. The operating environment 418 illustrates an example of a collage template 202 comprising a set of digital frames 130, where each digital frame 132 is associated with a different reference image 136. The collage template 202 is titled "My Family Tree". The collage template 202 includes reference images 134 which are examples of digital images that include head and shoulder shots of different people. Each headshot comprises different visual characteristics, such as resolution, color, lighting, composition, facial expression, pose, background, focus, skin textures, clothing and accessories, image format, aspect ratio, and so forth. These visual characteristics collectively create a distinct representation of the person in the headshot, conveying information about their appearance, personality, and the context of the photograph.

Some or all of these visual characteristics serve as a guide for the image fitting module 128 to fit a new digital image 102 into the digital frames 130 of the collage template 202. Assume a user selects a digital frame 208 from the collage template 202 using the image editing GUI 230. The digital frame 208 is associated with a reference image 220 titled "Alfredo Torres-Grandfather" which shows a head and shoulders of a man looking to the right side of the digital frame 208 with his head slightly tilted to the left. Some of these visual characteristics serves as a model or guide for insertion of a new digital image 310 into the digital frame 208.

Figure 5:
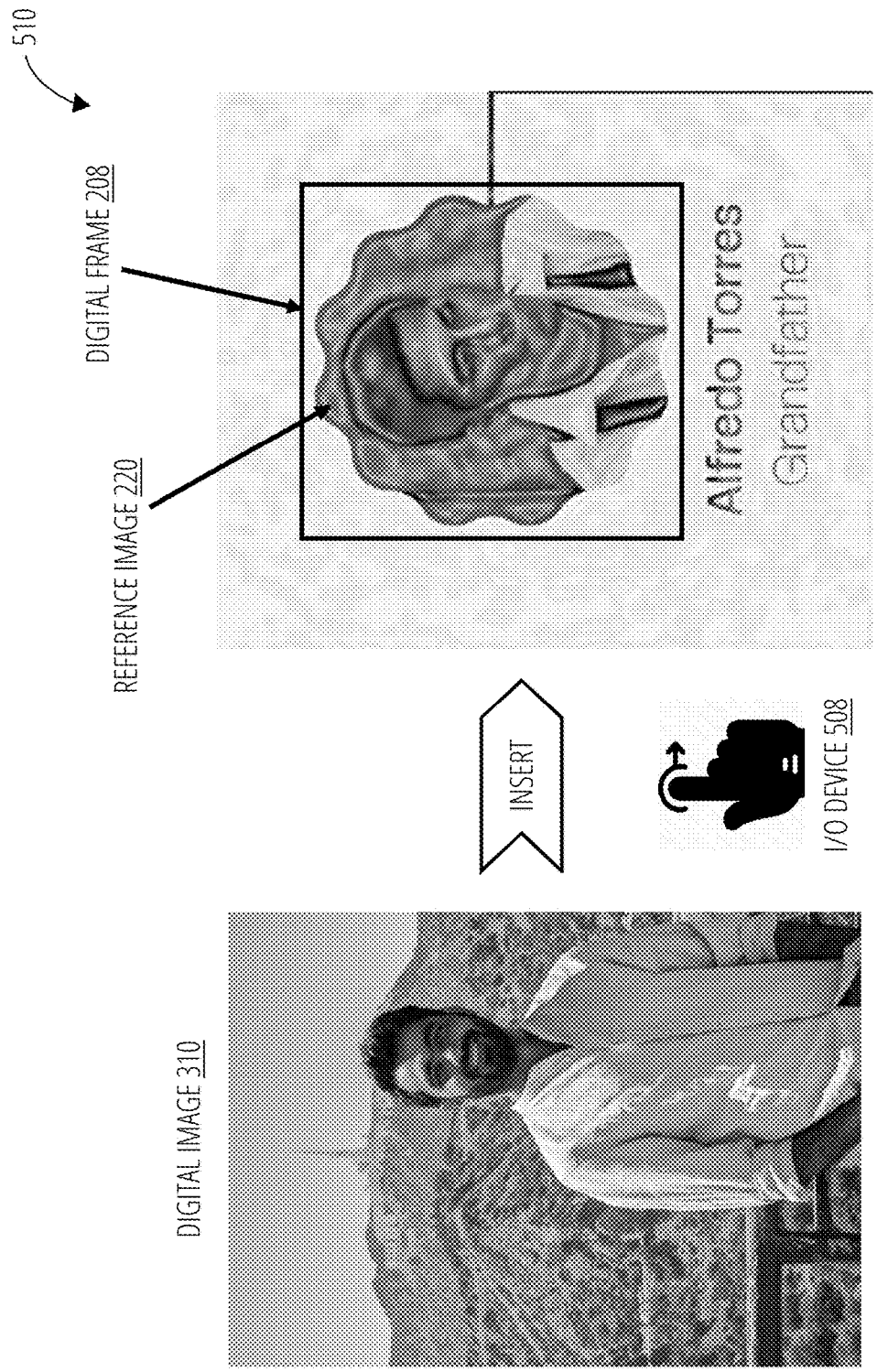
FIG. 5 illustrates an example of an operating environment in accordance with one embodiment.

FIG. 5 illustrates an operating environment 510. The operating environment 510 illustrates an example of a digital image 310 selected by a user for insertion into the digital frame 208. A user manipulates the image editing GUI 230 to select the digital image 310 using an I/O device 508 on a touchscreen display of a client device (e.g., a smartphone or tablet), and drags the digital image 310 to within the borders of the digital frame 208. The digital image manager 116 receives an input signal from the image editing GUI 230 indicating the user selection, and it begins pre-processing operations for the digital image 310 to prepare it for insertion into the digital frame 208. The pre-processing operations include checking an image format for the digital image 310, and using an image format converter to perform any format conversion operations needed to convert the digital image 310 from a source format (e.g., jpeg) to a native format (e.g., PNG) used by the image editing application 146. The image format converter is tuned for converting any image format into a native format used by the image editing application 146, including without limitation JPEG, PNG, CR2, ARW, DNG, CRW, MRW, PEF, SRW, NRW, ORF, and so forth. Embodiments are not limited in this context.

Figure 6:
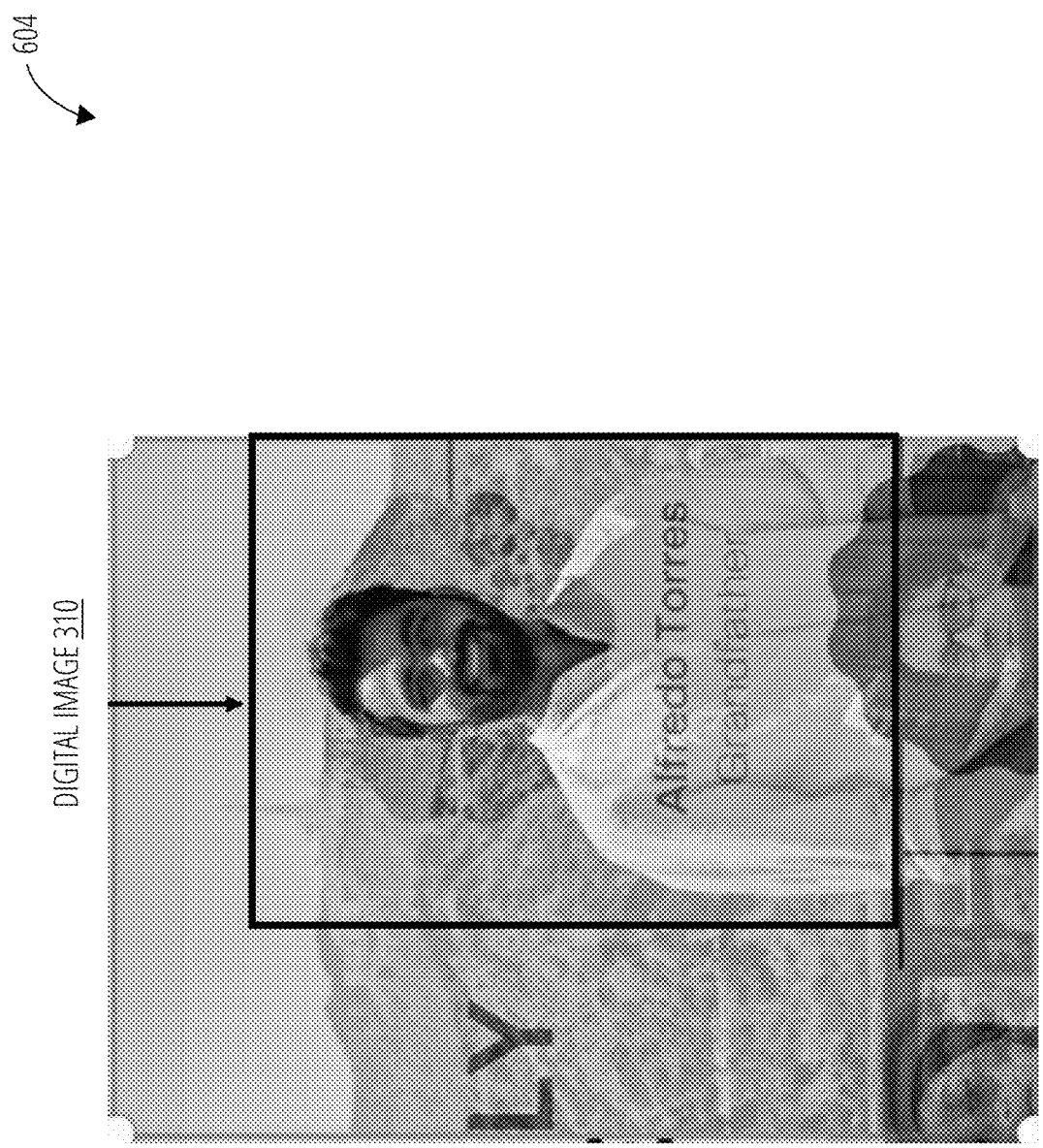
FIG. 6 illustrates an example of an operating environment in accordance with one embodiment

FIG. 6 illustrates an operating environment 604. The operating environment 604 illustrates a case where the user manipulates a conventional GUI in an attempt to manually fit the digital image 310 into the digital frame 208.

To accomplish this operation, a user interacts with a conventional image editing system to manually manipulate digital images to arrive at an optimal arrangement of a digital image within a digital frame. For instance, a user manually transforms the digital images via interaction with the conventional image editing interface, such as through cropping and resizing, in order to fit the digital images into a visual arrangement that the user finds visually satisfactory. However, there are a multitude of different ways that a set of digital images can be moved, resized, cropped, and so forth, to place the digital images within a collage. This results in very large sets of possible visual arrangements that greatly reduce the likelihood that a user will manually generate a visual arrangement that presents each digital image in an optimal position within a digital frame. Further, such manual interactions with conventional image editing interfaces are extremely time consuming and require users to manually and individually select multiple different editing controls in repetitive processes in an attempt to arrive at a visual optimal arrangement of digital images in a digital collage.

As depicted in FIG. 6, the user must manually select the digital image 310 and drag the digital image 310 across the conventional GUI to manually adjust a position for a face in the digital image 310 from an original large photograph. The user must then precisely fit the face within the border of the digital frame 208 provided in the collage template 202. This results in a highly inefficient, time consuming, and error prone process for the user, particularly when the user must repeat the image fitting operations for the entire 10 digital frames 130 of the collage template 202.

Thus, conventional image editing systems that provide collage functionality typically fail to account for variations in digital image composition when placing digital images in a collage. Further, such conventional systems provide interfaces that are difficult and inefficient for a user to navigate when attempting to manually transform and arrange digital images to generate a collage. These drawbacks significantly reduce the likelihood that a visually optimal arrangement of digital images will be identified, particularly in scenarios that involve a collage with numerous digital images.

Figure 7:
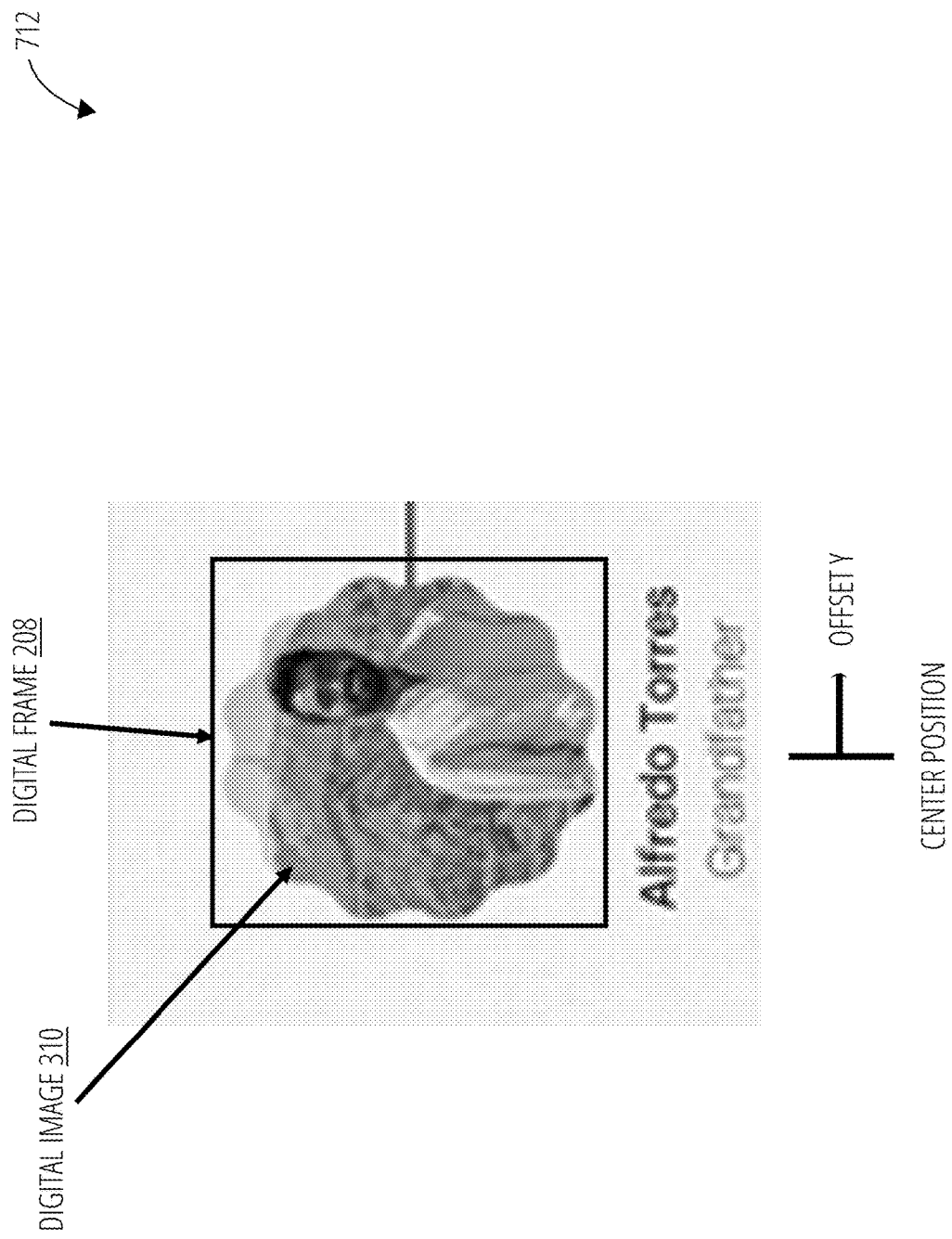
FIG. 7 illustrates an example of an operating environment in accordance with one embodiment

FIG. 7 illustrates an operating environment 712. The operating environment 712 illustrates a case where the user manipulates a conventional GUI, and a conventional image editing system attempts to automatically fit the digital image 310 into the digital frame 208.

Conventional image editing systems that provide collage functionality typically enable a user to select a digital image and place it into a digital frame within a collage template. The image editing system uses a fitting algorithm that attempts to fit the digital image within the digital frame. When a size or shape of the digital image does not match a size or shape of the digital frame, the fitting algorithm resizes or crops the digital image to obtain a better fit. However, conventional fitting algorithms do not account for subject matter or composition within a digital image. For example, a digital image often has a region of interest that represents a visual focal point within the digital image. Consider, for instance, a digital photo of a person in an outdoor setting and that the person's face represents a region of interest within the digital photo. A conventional image editing system would typically process and place the digital photo into the digital frame based on the aggregate content of the digital photo, without considering the position and size of the person's face relative to the digital photo as a whole. This conventional placement technique often results in a suboptimal visual arrangement, such as not centering the person's face in the digital frame or making the person's face too big or too small relative to the borders of the digital frame.

As depicted in FIG. 7, a conventional image editing system fits the digital image 310 into the digital frame 208 by selecting an ROI that includes a focal point of a mountain in the background rather than a face of a person standing in the foreground of the mountain. Instead of centering the face of the person towards the center position of the digital frame 208, the conventional image editing system has a Y offset that positions the face on the right side of the digital frame 208. The conventional editing system has also down-converted the image size while reducing a resolution for the digital image 310. The result is a sub-optimal placement of the digital image 310 into the digital frame 208.

Figure 8:
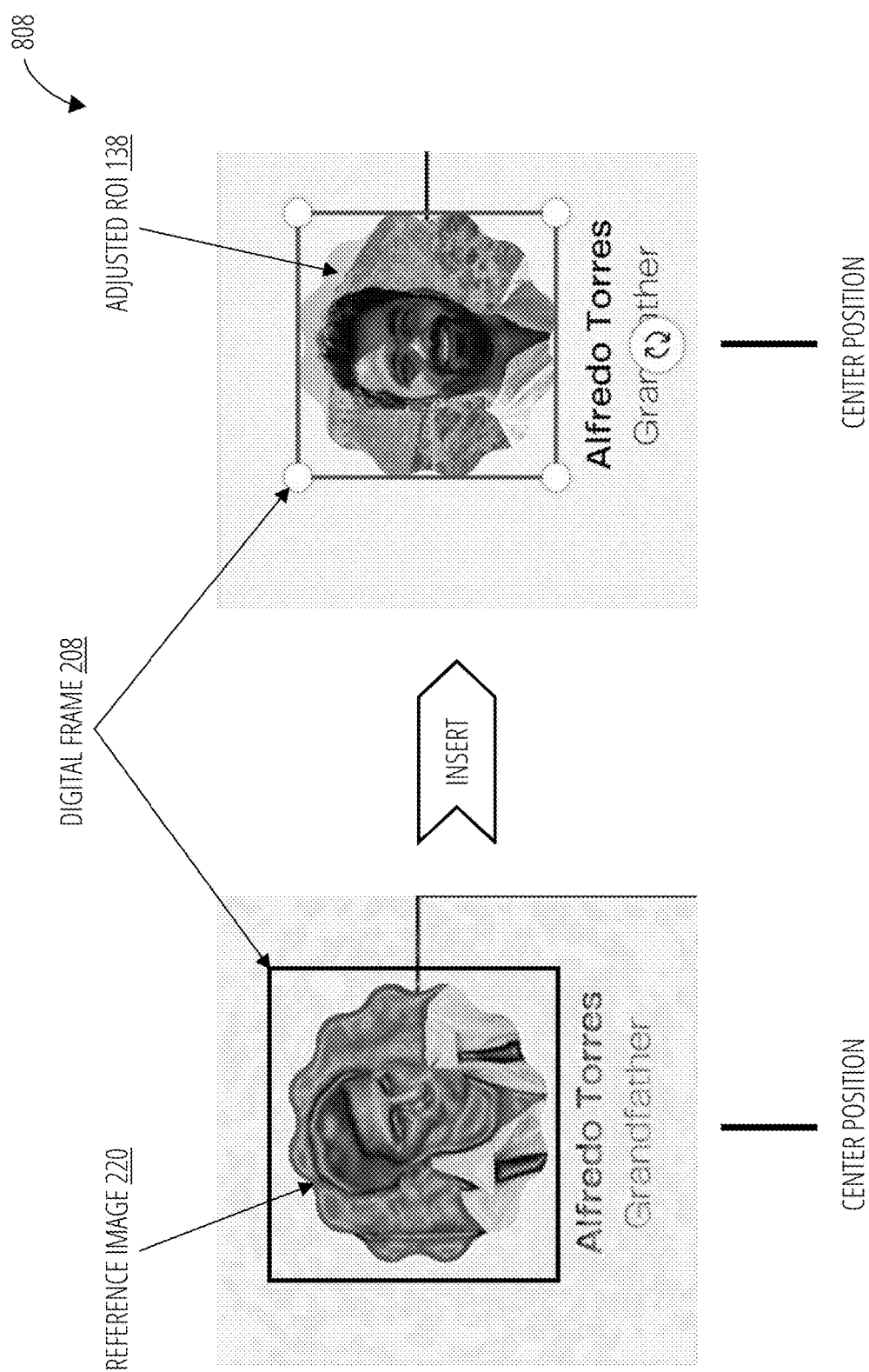
FIG. 8 illustrates an example of an operating environment in accordance with one embodiment

FIG. 8 illustrates an operating environment 808. The operating environment 808 illustrates a case where the user manipulates the image editing GUI 230 of the image editing application 146 to automatically place and fit the digital image 310 into the digital frame 208 of the collage template 202.

Assume the user selects the digital image 310 and drags the digital image 310 to the digital frame 208 of the collage template 202. The image fitting module 128 of the collage creation module 110 of the image editing application 146 performs a series of image processing operations that includes detecting a visual object 308 within a target ROI 302 of the digital image 310, cropping the target ROI 302 from the digital image 310, generating a target segmented avatar for a visual object 308 in the target ROI 302, generating or retrieving a reference segmented avatar for a visual object 316 in the reference ROI 304, and comparing the target segmented avatar and the reference segmented avatar to find matching portions. The image fitting module 128 then automatically adjusts a visual characteristic of the target ROI 302 based on the matching portions to fit the visual object 308 within the target ROI 302 from the digital image 310 into the digital frame 408.

Figure 9:
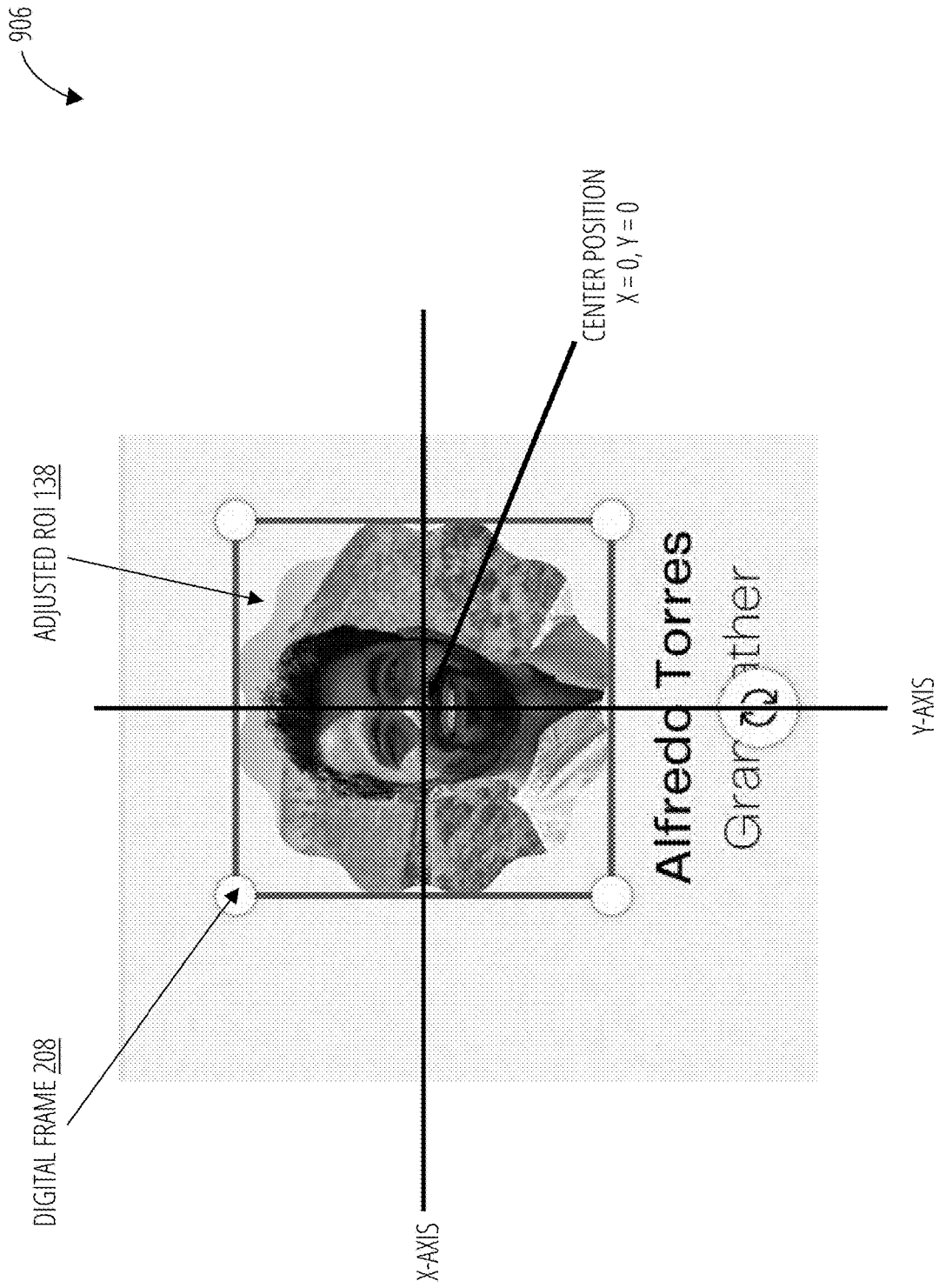
FIG. 9 illustrates an example of an operating environment in accordance with one embodiment

FIG. 9 illustrates an operating environment 906. The operating environment 906 illustrates a final result from the image processing operations described with reference to FIG. 8. As depicted in FIG. 9, the image fitting module 128 performs a series of image fitting operations that includes cropping a target ROI 302 from the digital image 310. The target ROI 302 includes the face of the person in the digital image 310. The image fitting module 128 modifies a size of the target ROI 302 based on a size difference between the matching portions of the target segmented avatar and the reference segmented avatar to form an adjusted ROI 138. The image fitting module 128 inserts the adjusted ROI 138 into the digital frame 208 so that a focal point of the face of the person in the adjusted ROI 138 is in a center position denoted as X=0 and Y=0 coordinates of the x-axis and the y-axis of the digital frame 208. In one embodiment, the center position is a target position for the adjusted ROI 138 based on the reference image 220 associated with the destination digital frame 208.

For other digital frames 130 of the collage template 202, the target position changes based on a particular reference image 136 associated with a particular digital frame 132. For example, the collage template 202 comprises a digital frame 414 with an associated reference image 416. The reference image 416 is a view of a head and shoulders of a man with a tilting head where the focal point of the tilting head is towards a right position of the digital frame 414. In this case, the image fitting module 128 attempts to perform the image fitting operations for a new digital image 102 so that the adjusted ROI 138 includes a focal point of a head positioned on the left side of the digital frame 414.

Figure 10:
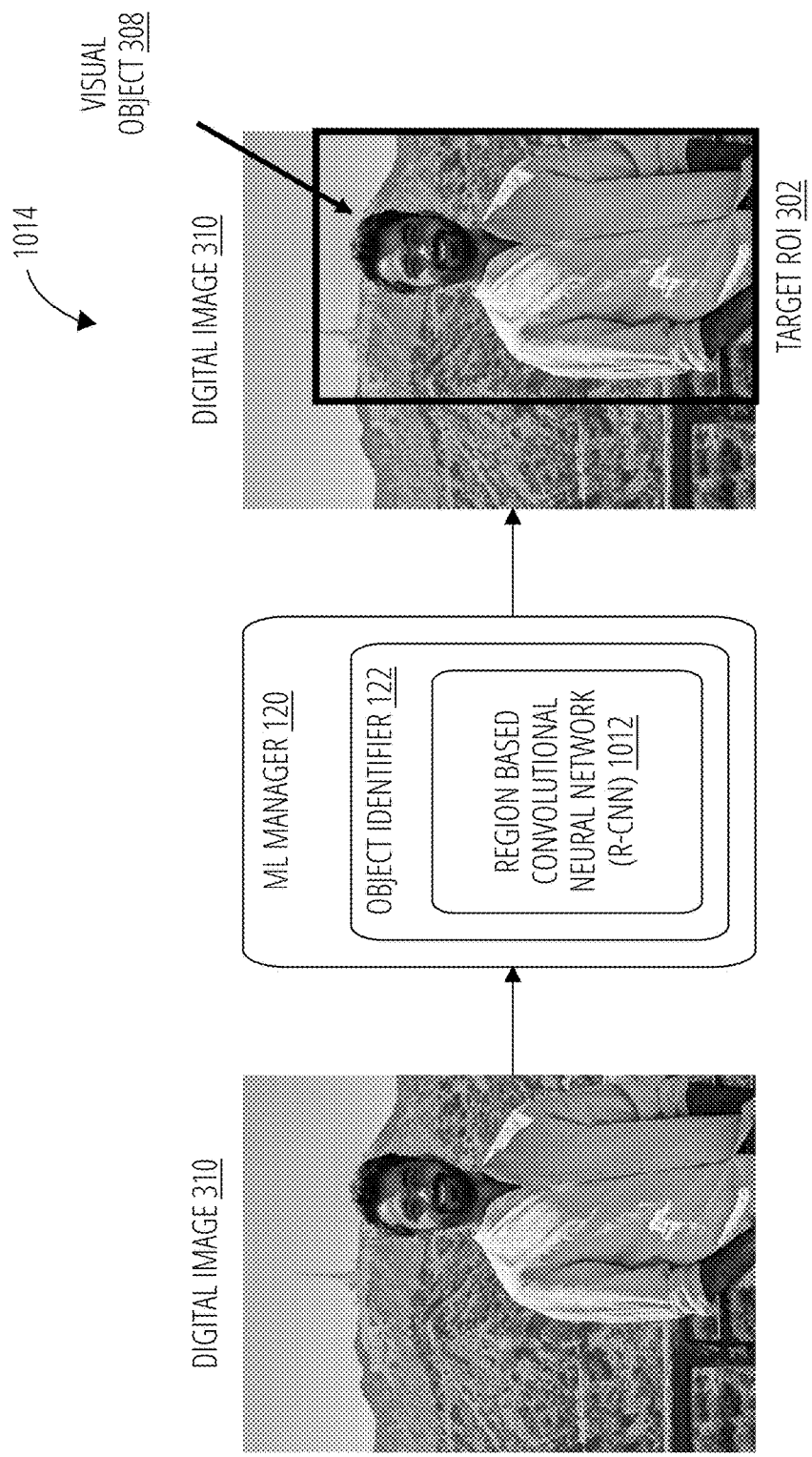
FIG. 10 illustrates an example of an object identifier in accordance with one embodiment.

FIG. 10 illustrates an operating environment 1014. The operating environment 1014 illustrates an example of the ML manager 120 implementing AI and ML techniques for searching the digital image 310 for a target ROI 302. As previously described, the ML manager 120 of the collage creation module 110 of the image editing application 146 accelerates multiple image processing operations for the image editing application 146. In one embodiment, for example, the ML manager 120 accelerates searching and identifying a target ROI with one or more candidate visual objects within a digital image, detecting a pose for the visual objects within the target ROI, and generating a set of key-points, line segments, and angles representing the visual objects.

As depicted in FIG. 10, the ML manager 120 includes an object identifier 122. The object identifier 122 implements any AI or ML model suitable for object recognition, such as a region based CNN (R-CNN) 1012 or any variants, among other types of object recognition models. The R-CNN 1012 receives as input the digital image 310, and searches various regions of the digital image 310 to find a target ROI 302 with a visual object 308. Once the object identifier 122 identifies the target ROI 302 using the R-CNN 1012, the object identifier 122 outputs the target ROI 302 to the pose detector 124 of the ML manager 120.

Figure 11:
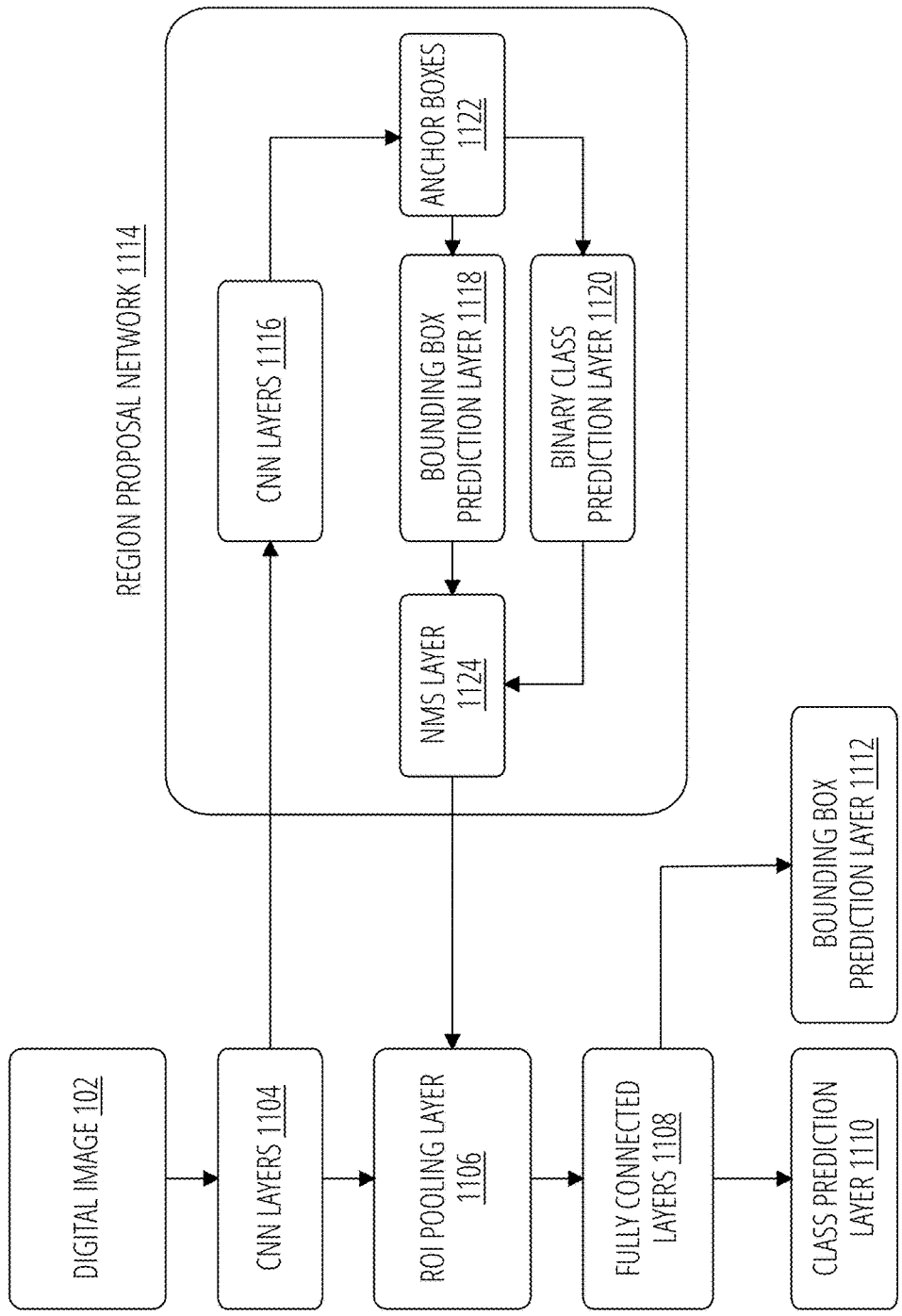
FIG. 11 illustrates an example of a faster region based convolutional neural network (R-CNN) in accordance with one embodiment.

FIG. 11 illustrates an operating environment 1128. The operating environment 1128 illustrates an example of the object identifier 122 implementing a ML model that is suitable for performing object identification operations of the object identifier 122. In various embodiments, the ML manager 120 manages the object identifier 122 which is designed for object recognition in a digital image, such as a digital image 102 or a reference image 136, for example. The object identifier 122 of the ML manager 120 is implemented using any ML model suitable for object recognition, such as the R-CNN 1012 or a variant thereof. Variants of the R-CNN 1012 include, for example, a fast R-CNN and a faster R-CNN, among others. These variants build additional features upon the core network of the R-CNN 1012.

In one example embodiment, the object identifier 122 is implemented using a faster R-CNN 1126. The faster R-CNN 1126 is an improvement of a fast R-CNN, which is itself an improvement over a classical R-CNN 1012. While a faster R-CNN 1126 is suitable for use in some implementations, the ML manager 120 varies based upon a particular use case and application. For example, some embodiments implement the R-CNN 1012 or a fast R-CNN instead of a faster R-CNN 1126, due to a variety of technical factors, such as a throughput requirement, input images, device capabilities, network bandwidth, and so forth. As such, embodiments are not limited to a particular ML manager 120.

In general, deep convolution networks have significantly improved image classification and object detection accuracy. Compared to image classification, object detection is a more challenging task that requires more complex methods to solve. Complexity arises because detection requires the accurate localization of objects, creating two primary challenges: (a) numerous candidate object locations, and (b) to achieve precise localization of these candidates. Precise localization is achieved using the R-CNN 1012.

The R-CNN 1012 is a powerful ML model specifically tailored for object detection tasks. However, the original R-CNN 1012 suffers from inefficiencies in speed and computational load. The traditional R-CNN 1012 would apply convolutional operations to every ROI proposed by a region proposal algorithm. This process was highly computationally intensive because the same computations were performed on the overlapping parts of different ROIs, leading to computational redundancy.

Fast R-CNN efficiently handles the limitations of the R-CNN 1012. A fast R-CNN network takes as input an entire image and a set of object proposals. The network first processes the whole image with several convolutional and max pooling layers to produce a convolutional feature map. Then, for each object proposal, an ROI pooling layer extracts a fixed-length feature vector from the feature map. Each feature vector is fed into a sequence of fully connected layers that finally branch into two sibling output layers: one that produces SoftMax probability estimates over K object classes plus a catch-all "background" class, and another layer that outputs four real-valued numbers for each of the K object classes. Each set of 4 values encodes refined bounding-box positions for one of the K classes.

An input image and multiple ROIs are input into a fully convolutional network. Each ROI is pooled into a fixed-size feature map and then mapped to a feature vector by fully connected layers. The network has two output vectors per ROI: (1) SoftMax probabilities; and (2) per-class bounding-box regression offsets. The architecture is trained end-to-end with a multi-task loss.

While fast R-CNN improved upon R-CNN in many significant ways, it still had one critical limitation: it depended on an external method for region proposal. This dependency could create a bottleneck in the pipeline, slowing down the object detection process. The region proposal step is also non-differentiable, which prevents end-to-end learning and optimization of this step.

In one embodiment, the ML manager 120 is implemented as a faster R-CNN 1126. The faster R-CNN 1126 improves upon certain limitations of the fast R-CNN and the R-CNN 1012. As depicted in FIG. 11, the faster R-CNN 1126 comprises a CNN layers 1104, a ROI pooling layer 1106, a set of fully connected layers 1108, and a region proposal network 1114. The faster R-CNN 1126 receives as input a digital image, such as digital image 102 or reference image 136. The faster R-CNN 1126 processes the digital image, and outputs a class prediction layer 1110 and a bounding box prediction layer 1112.

The faster R-CNN 1126 is a more efficient approach to object detection tasks compared to its predecessors, R-CNN 1012 and a fast R-CNN. The fundamental advancement in the faster R-CNN 1126 is the inclusion of the region proposal network 1114, making it a single, unified network for object detection. This end-to-end design not only simplifies the object detection pipeline but also helps in optimizing the model performance as a whole.

By way of example, the digital image manager 116 of the collage creation module 110 inputs a digital image 102 into the ML manager 120, such as the object identifier 122. The object identifier 122 comprises a set of CNN layers 1104. The CNN layers 1104 extract features from the digital image 102. The faster R-CNN 1126 operates on the entire digital image 102 at once rather than on individual proposed regions. For a given input image, the CNN layers 1104 generates a feature map of the entire input image. This process involves convolutional operations that compute a set of feature maps, each representing different learned features, followed by pooling operations to reduce the spatial dimensions while retaining important information. This results in a condensed representation of the original image, highlighting features that are important for object detection tasks. The output from this convolutional layer is a high-dimensional feature map that encodes abstract representations of the image's content. The ROIs proposed by a region proposal algorithm are then projected onto this feature map. This strategy differs from the traditional R-CNN model, where the convolutional operations were performed independently for each proposed region, leading to a significant computational burden.

The region proposal network 1114 is a fully convolutional network that simultaneously predicts object bounds and "objectness" scores at each position. More particularly, the region proposal network 1114 is a fully convolutional network designed to generate a set of potential bounding boxes, or "region proposals", that could contain visual objects. The region proposal network 1114 shares convolutional layers with the fast R-CNN, denoted as CNN layers 1104 and CNN layers 1116. The feature maps obtained from these layers are used to generate region proposals and detect objects. The sharing of convolutional features significantly reduces the computation, making the model more efficient.

At each location of the feature map, the region proposal network 1114 generates multiple region proposals. A small network is slid over the convolutional feature map output by the previous layers. This sliding window operates on a single square (e.g., usually 3×3) of the feature map at each step. At each sliding-window location, the region proposal network 1114 proposes multiple regions of different scales and aspect ratios. These proposed regions are called "anchors." The network is designed to be translation-invariant, so the same proposals are made regardless of the location of the sliding window. The anchor boxes 1122 play a significant role in the region proposal network 1114. At each sliding window location, k anchor boxes are defined, where k represents any positive integer. In a typical implementation, k is generally set to 9, indicating 3 scales and 3 aspect ratios. Each anchor is associated with two scores representing "objectness", which is how likely the box contains an object, and coordinates of the bounding box. These scores are outputted by two sibling fully-connected layers-a bounding box prediction layer 1112 and a binary class prediction layer 1120. The bounding box prediction layer 1112 is a regression layer that predicts the bounding box adjustments necessary to better match the ground truth boxes. The binary class prediction layer 1120 is a classification layer that predicts the probability of an object being present.

To reduce the number of proposals, the faster R-CNN 1126 uses a technique called Non-Maximum Suppression (NMS). An NMS layer 1124 removes proposals that have a higher overlap and retains the ones with the highest classification scores. The region proposals generated by the region proposal network 1114 are then used by the fast R-CNN for object detection. This approach allows the entire system (region proposal network 1114 and fast R-CNN) to be trained end-to-end with backpropagation and stochastic gradient descent.

Faster R-CNN 1126 uses a multi-task loss function to train the region proposal network 1114. The loss function comprises two components: a binary logistic regression loss (or cross-entropy loss) for the "objectness" score, and a smooth L1 loss for the bounding box coordinates. These two losses are combined into a single loss function to train the region proposal network 1114. This enables the model to learn better region proposals by simultaneously optimizing for object presence and the precise location.

After the region proposals are generated by the region proposal network 1114, the region proposals are processed by a ROI pooling layer 1106, which transforms the features inside each region proposal into a fixed-size feature map. The ROI pooling layer 1106 takes an ROI of any size and applies pooling to convert it into a fixed-size feature map. This process allows the network to handle inputs of various sizes and aspect ratios. The advantages of the ROI pooling layer 1106 are twofold. First, it saves computational resources by reducing the input size for the fully connected layers. Second, it introduces translation invariance, which is beneficial for detecting visual objects in various locations within a digital image, such as visual object 308 and visual object 316 in digital image 310 and reference image 220, respectively, for example. This feature is significant because the location of a visual object within an image does not impact the ML manager 120 ability to detect the visual object.

The fixed-size feature maps are then passed through several fully connected layers 1108, which in turn output class scores for class prediction layer 1110 and bounding box coordinates for bounding box prediction layer 1112. Class prediction layer 1110 is where the network identifies the type of object contained within a proposed region. This is a crucial part of the object detection process. For each ROI proposed by the region proposal network 1114, the network needs to predict not only the presence of an object but also the specific class of that object. The class prediction layer 1110 is done by passing the feature vector through the fully connected layers 1108 followed by a SoftMax function, which outputs a probability distribution over all possible classes. These probabilities indicate the network's confidence that the ROI belongs to each specific class. While the class prediction layer 1110 estimates the probabilities of each class, the bounding box prediction layer 1112 refines a spatial location and size of the object based on the initial proposal from the region proposal network 1114.

Figure 12:
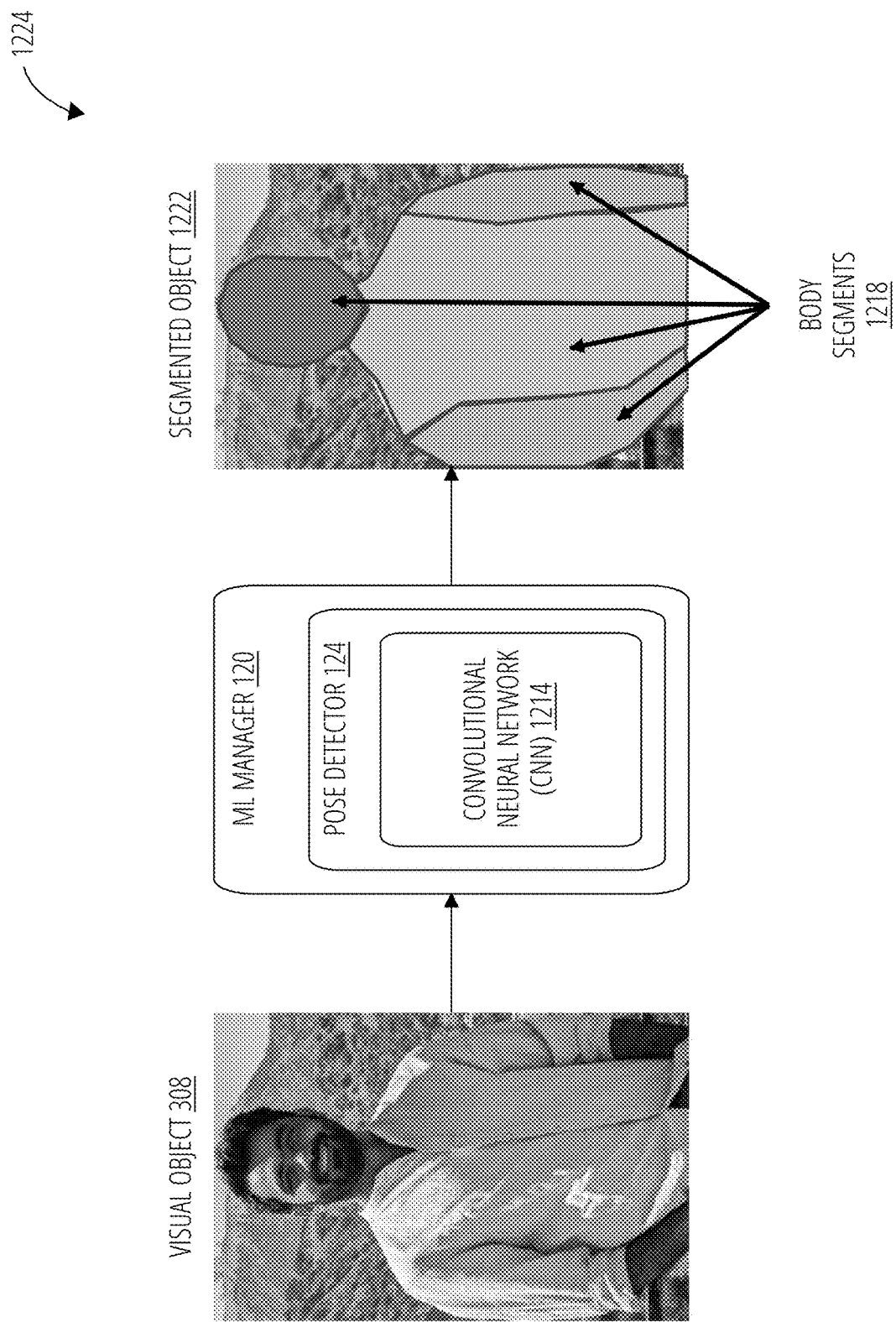
FIG. 12 illustrates an example of a pose detector in accordance with one embodiment.

FIG. 12 illustrates an operating environment 1224. The operating environment 1224 illustrates an example of a pose detector 124 of the ML manager 120 implementing a CNN 1214 to perform pose detection operations and output pose information for a visual object in a digital image, such as a visual object 308 and visual object 316 in the digital image 310 and the reference image 220, respectively.

In addition to object recognition, the ML manager 120 includes a pose detector 124. The pose detector 124 is designed to detect individual body parts segmentation using pose-based learning. In one embodiment, for example, the pose detector 124 implements a CNN 1214.

Human body part segmentation aims at partitioning persons in the image to multiple semantically consistent regions (e.g., head, arms, legs), which is important to many human-centric analysis applications. Supervised training with deep CNNs significantly improves the performance of various visual recognition tasks including the human body part segmentation. However, it requires large amount of training data. Data labeling, especially at pixel level, is labor intensive and the acquisition of such annotations in large scale is prohibitively expensive.

Studies show that the real and synthetic humans both have a skeleton (pose) representation and show that the skeletons can effectively bridge the synthetic and real domains during the training. As such, the pose detector 124 uses cross-domain complementary learning techniques to train the CNN 1214 to predict body parts or body segments for a human. The CNN 1214 is trained with synthetic data with part labels and real data without part labels. During training, the CNN 1214 extracts human skeletons which effectively bridges the synthetic and real domains. Without using human-annotated part segmentation labels, the resultant model works well on real world images. Sample synthetic data used for training contains multiple persons performing various actions in a three-dimensional (3D) room.

Based on the training set, the framework operates in two main stages. The first is the synthetic input training to learn body parts and human poses in the synthetic domain. In the second component for real input training, the network parameters of the backbone are shared, key-point map head, and part affinity field head with the first component. During training, the CNN 1214 is trained using two modules within a mini-batch, and the network is optimized using back-propagation.

The CNN 1214 receives as input the visual object 308 from the digital image 310, and it processes the visual object 308 to identify body segments 1218 for the visual object 308. As a result, the CNN 1214 outputs a segmented object 1222, which is a shaded or color coded image having different shades or colors representing different poses for body segments 1218 of a person in a digital image 102. The CNN 1214 outputs the segmented object 1222 to the key-point generator 126.

Figure 13:
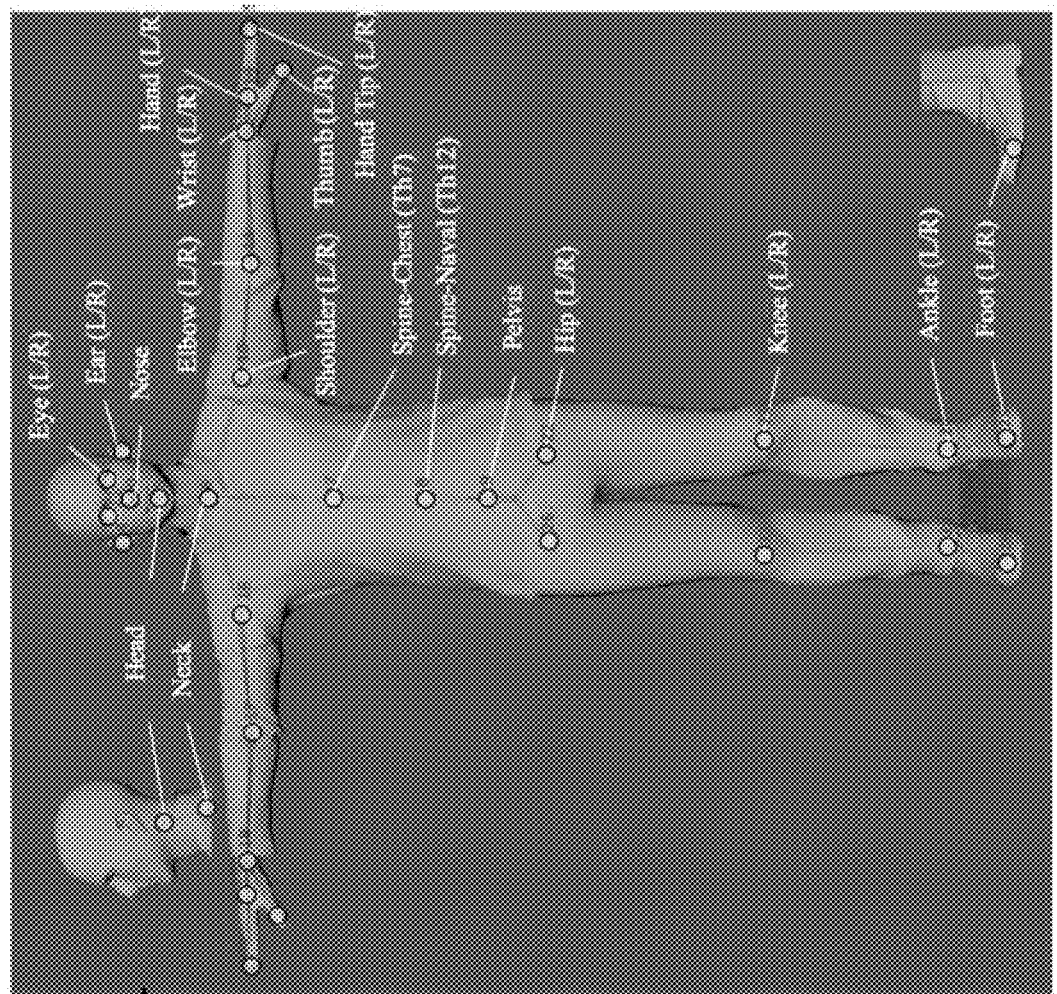
FIG. 13 illustrates an example of reference key-points in accordance with one embodiment.

FIG. 13 illustrates an operating environment 1306. The operating environment 1306 illustrates an example of a key-point reference image 1304 comprises a set of reference key-points 1302 suitable for use by a key-point generator 126 of the ML manager 120. In addition to object recognition and pose detection, the ML manager 120 includes a key-point generator 126. The key-point generator 126 receives the segmented object 1222, and processes the segmented object 1222 to identify and generate a set of key-points representing each of the body segments 1218 of the visual object 308. To identify different key-points in the segmented object 1222, the key-point generator 126 uses a set of reference key-points 1302.

As depicted in the key-point reference image 1304, the reference key-points 1302 are a pre-defined set of 30 important key-points of humans. The set of reference key-points 1302 approximate an outline of a human skeleton, with key-points defined for each of the body segments 1218, and major features within each of the body segments 1218. For example, the reference key-points 1302 include a set of 6 important key-points for a human head, including 2 key-points for each eye, 2 key-points for each ear, 1 key-point for a nose, and 1 key-point for a chin. The CNN 1214 is a deep learning model for key-point identification that is trained from multiple images having labeled key-points. The CNN 1214 learns the novel skeleton representations from real data and synthetic data, and transfers the knowledge to the real domain for inferencing operations.

Figure 14:
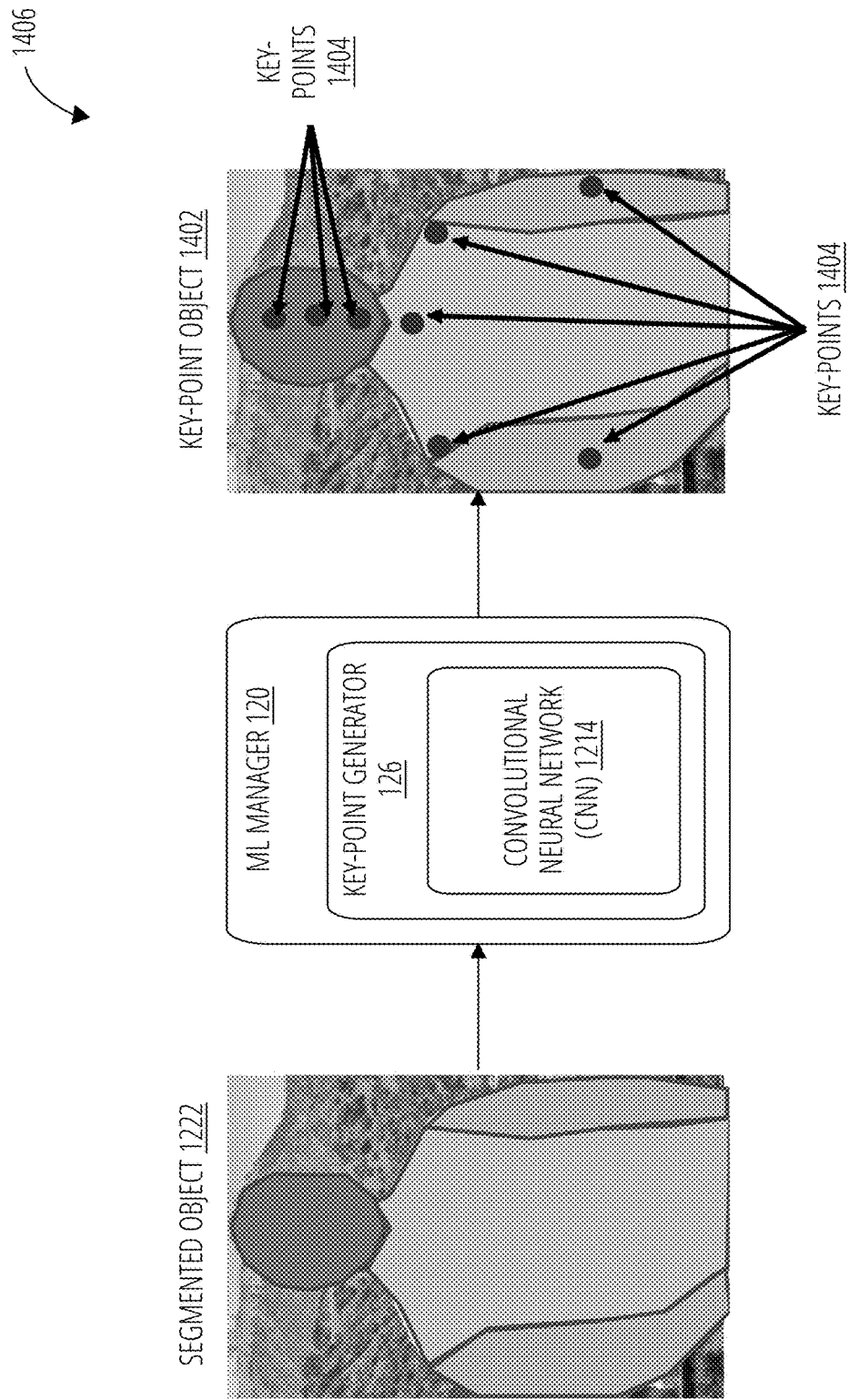
FIG. 14 illustrates an example of a key-point generator in accordance with one embodiment.

FIG. 14 illustrates an operating environment 1406. The operating environment 1406 illustrates an example of a first stage for a key-point generator 126 for the ML manager 120 to perform key-point generation operations for a visual object in a digital image, such as a visual object 308 and visual object 316 in the digital image 310 and the reference image 220, respectively.

In addition to object recognition and pose detection, the ML manager 120 includes a key-point generator 126. In one embodiment, for example, the key-point generator 126 implements the CNN 1214 of the pose detector 124. Once the CNN 1214 of the pose detector 124 detects different poses for body segments 1218 of a person in a digital image 102, the key-point generator 126 uses the CNN 1214 to identify and generate a set of key-points 1404 for each of the body segments 1218. The set of key-points 1404 provide an outline of a skeleton for a person. As previously described, the set of key-points 1404 are used as a basis to form a segmented avatar, which is a stick diagram for a person in a target ROI 302 or a reference ROI 304.

In one embodiment, a segmented avatar is a minimally detailed stick diagram or stick figure of a person composed of a few lines and dots. In one embodiment, a stick diagram conveys basic universal information for a person that is useful for rapid identification of a higher-fidelity version of a person within a digital image, such as digital images 104 and reference images 134. In another embodiment, a pair of stick diagrams, such as from a digital image 102 and a reference image 136, are compared and analyzed to determined measured differences between the stick diagrams. The image fitting module 128 uses the measured differences to modify or adjust visual properties, characteristics or parameters associated with the target ROI to better fit within the digital frame 132.

As depicted in FIG. 14, the CNN 1214 of the key-point generator 126 receives as input the segmented object 1222 from the pose detector 124. The CNN 1214 processes the segmented object 1222, and it identifies a set of key-points 1404, with a subset of key-points corresponding to each of the body segments 1218. The CNN 1214 outputs a key-point object 1402 comprising the set of key-points 1404 annotated on the segmented object 1222. The key-point object 1402 is passed to a second stage of the key-point generator 126, as a basis for generating a segmented avatar.

Figure 15:
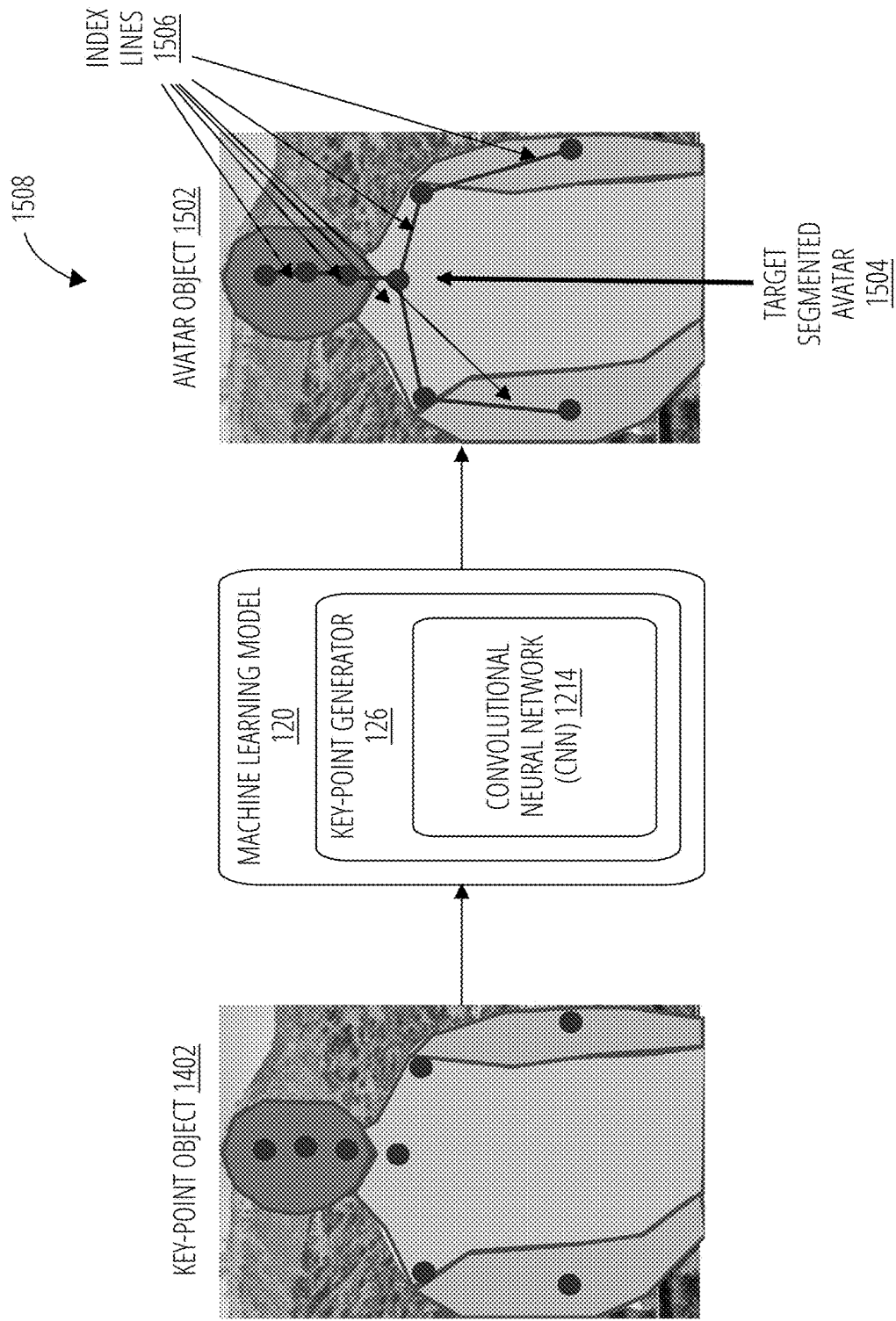
FIG. 15 illustrates an example of a key-point generator in accordance with one embodiment.

FIG. 15 illustrates an operating environment 1508. The operating environment 1508 illustrates an example of a second stage for a key-point generator 126 for the ML manager 120 to perform key-point generation operations for a visual object in a digital image, such as a visual object 308 and visual object 316 in the digital image 310 and the reference image 220, respectively.

In its most basic form, a stick diagram comprises key-points 1404 to represent parts of body segments 1218 of a person, line segments between adjacent key-points 1404 to represent entire body segments 1218 of the person, and angles between adjacent line segments to represent articulated joints for the body segments 1218 of the person. Given a human arm, for example, a subset of key-points 1404 represent various parts of the arm, a set of line segments between adjacent key-points represents the entire arm, and angles between adjacent line segments represent a bend at a wrist, elbow, or shoulder of the arm. In this manner, the image fitting module 128 uses the stick diagrams to quickly measure and approximate relative size and shapes between visual objects for better placement within borders of a digital frame 132.

As depicted in FIG. 15, a second stage of the CNN 1214 of the key-point generator 126 receives as input the key-point object 1402 from the first stage of the CNN 1214. The CNN 1214 processes the key-point object 1402, and it connects adjacent key-points 1404 from the set of key-points 1404 with a set of index lines 1506. A subset of key-points 1404 and index lines 1506 approximate each of the body segments 1218. Adjacent index lines 1506 form angles between the adjacent index lines 1506. The angles represent articulated joints within or between body segments 1218, where a measurement for the angle represents a particular position for the articulated joints in a range of motion for the articulated joints for a given set of body segments 1218. The CNN 1214 outputs an avatar object 1502 comprising the set of key-points 1404 and connecting index lines 1506 annotated on the key-point object 1402. The avatar object 1502 comprises a target segmented avatar 1504 overlaid upon the key-point object 1402.

Figure 16:
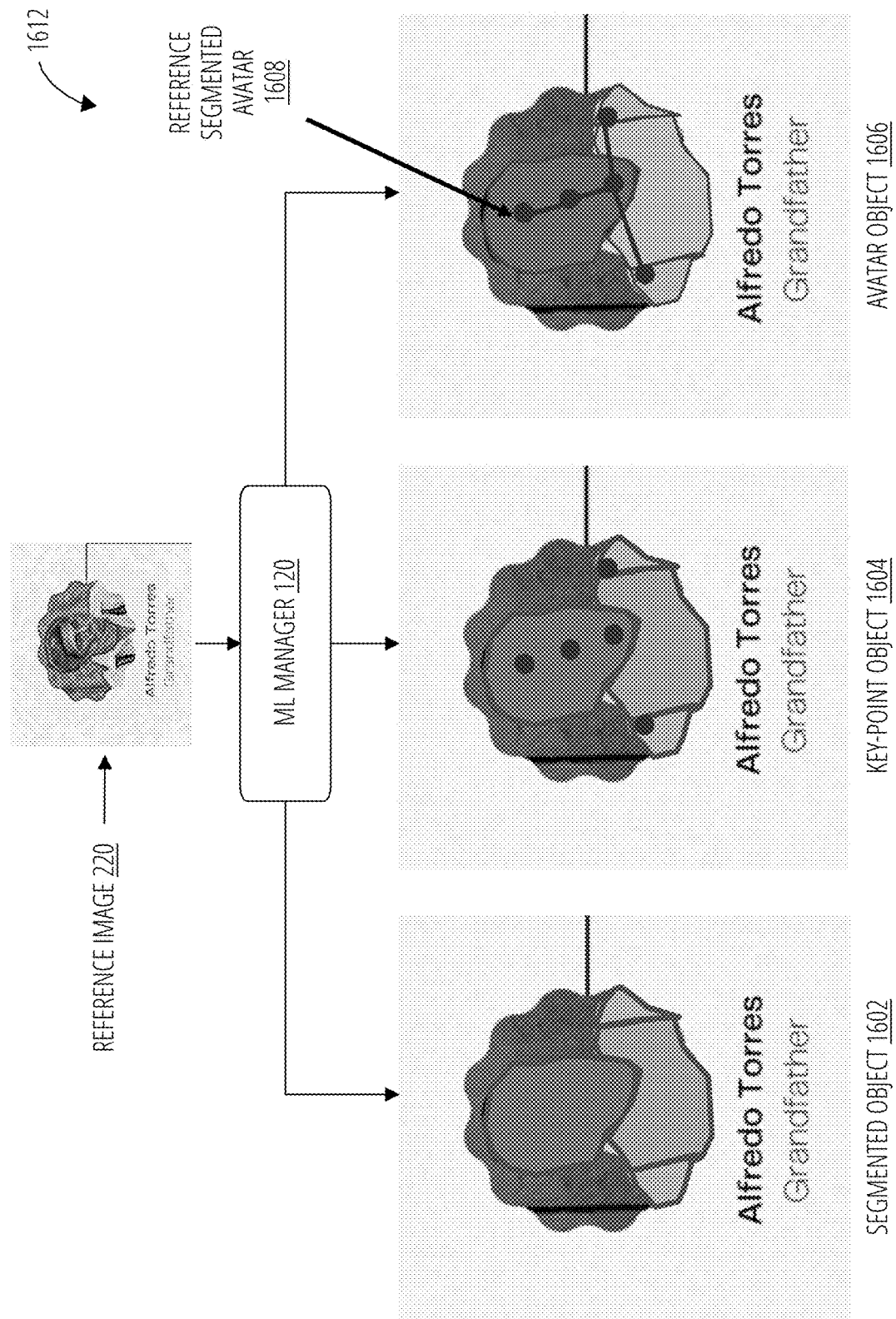
FIG. 16 illustrates an operating environment in accordance with one embodiment.

FIG. 16 illustrates an operating environment 1612. The operating environment 1612 illustrates an example of the ML manager 120 using the object identifier 122, the pose detector 124, and the key-point generator 126 to generate a reference segmented avatar 1608. Using a similar set of image processing operations as those used to generate the target segmented avatar 1504, the ML manager 120 receives as input the reference image 220. The object identifier 122 identifies a reference ROI 304 with a visual object 316 in the reference image 220, and it outputs the reference ROI 304 to the pose detector 124. The pose detector 124 receives the reference ROI 304, and it outputs a segmented object 1602 for the visual object 316 of the reference image 220 to the key-point generator 126. The key-point generator 126 generates a key-point object 1604 and an avatar object 1606 for the visual object 316. The avatar object 1606 comprises a reference segmented avatar 1608 overlaid upon the key-point object 1604.

Figure 17:
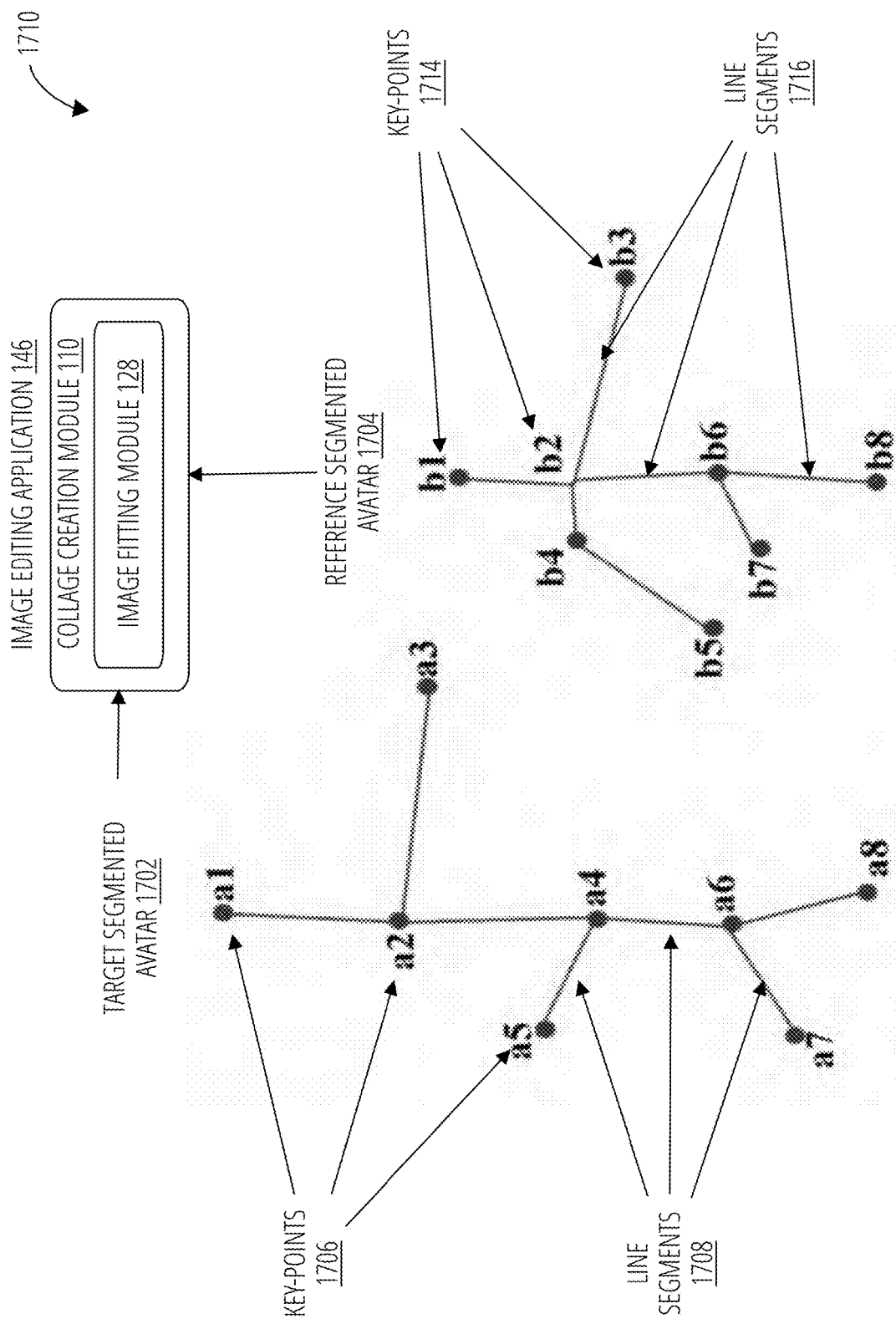
FIG. 17 illustrates an example of segmented avatars in accordance with one embodiment.

FIG. 17 illustrates an operating environment 1710. The operating environment 1710 illustrates a case where the image fitting module 128 of the collage creation module 110 of the image editing application 146 analyzes a target segmented avatar 1702 and a reference segmented avatar 1704 to support image fitting operations.

Once the ML manager 120 obtains a set of key-points 1404, it constructs a stick diagram using the key-points 1404. The operating environment 1710 depicts a sample image with two segmented avatars. The first segmented avatar comprises a target segmented avatar 1702 from a target ROI 302 with a visual object 308 from a digital image 102. Assume the target segmented avatar 1702 represents a human female. The second segmented avatar comprises a reference segmented avatar 1704 from a reference ROI 304 with a visual object 316 from a reference image 136. Assume the reference segmented avatar 1704 also represents a human female of a smaller size relative to the human female of the target segmented avatar 1702. The two segmented avatars are represented as stick diagrams formed from visual object 308 and visual object 316, where each visual object is an image of a different person. The ML manager 120 outputs the target segmented avatar 1702 and the reference segmented avatar 1704 to the image fitting module 128 of the collage creation module 110 of the image editing application 146.

The image fitting module 128 receives as input the two segmented avatars, and it begins matching operations to match portions of the two segmented avatars. In the stick diagram, the image fitting module 128 defines a line segment as represented by two adjacent points. For example, the target segmented avatar 1702 comprises a set of key-points 1706 and a set of line segments 1708. The image fitting module 128 computes all adjacent points from the target segmented avatar 1702 as A={a1, a2, a3, a4, a5, a6, a7, a8}. The image fitting module 128 determines a total number of points, which in this case is 8 key-points 1706. The image fitting module 128 determines 7 line segments connecting the 8 key-points 1706. Similarly, the image fitting module 128 computes all adjacent points from the reference segmented avatar 1704 as B={b1, b2, b3, b4, b5, b6, b7, b8}. The image fitting module determines a total number of points, which in this case is 8 key-points 1714. The image fitting module 128 determines 7 line segments connecting the 8 key-points 1714.

Figure 18:
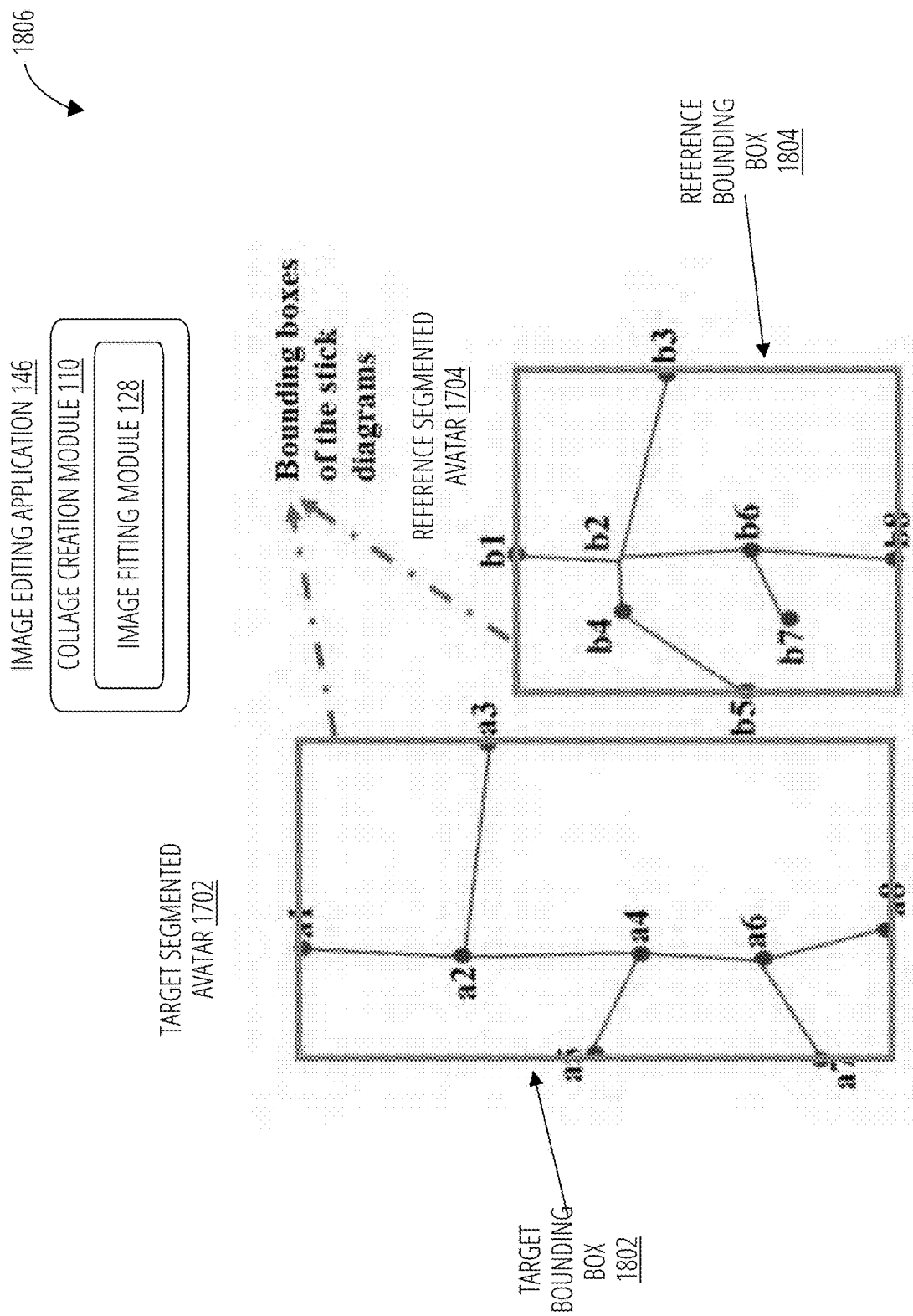
FIG. 18 illustrates an example of bounding boxes for segmented avatars in accordance with one embodiment.

FIG. 18 illustrates an operating environment 1806. The operating environment 1806 illustrates continued matching operations for the image fitting module 128. Once the image fitting module 128 computes set A of adjacent points a1 through a8, the image fitting module 128 computes a target bounding box 1802 for the target segmented avatar 1702 and a reference bounding box 1804 for the reference segmented avatar 1704. It then computes a set of normalized coordinates for all points computed in set A of adjacent points a1 through a8. For each of the line segments 1708, the image fitting module 128 computes a normalized length based on the target bounding box 1802. For each of the line segments 1716, the image fitting module 128 computes a normalized length based on the reference bounding box 1804. Normalization results in scale invariance.

Figure 19:
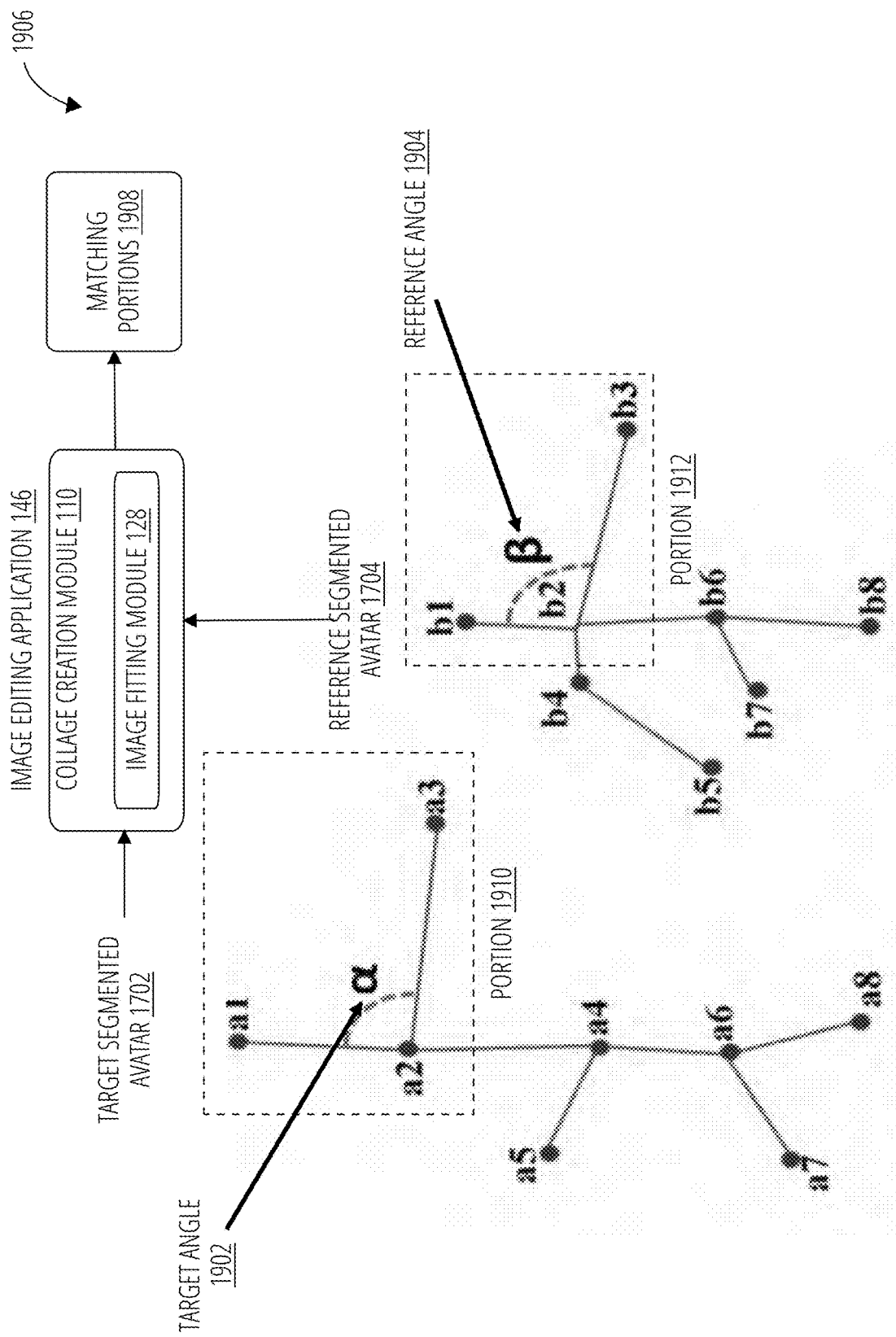
FIG. 19 illustrates an example of matching portions between segmented avatars in accordance with one embodiment.

FIG. 19 illustrates an operating environment 1906. The operating environment 1906 illustrates continued matching operations for the image fitting module 128. Once normalization operations are complete, the image fitting module 128 computes an angle between touching line segments 1708 for each pair of adjacent line segments 1708, where the adjacent line segments 1708 have a common adjacent key-point. For example, the target segmented avatar 1702 includes an angle between line segments a1, a2 and a2, a3, denoted as a target angle 1902 with a measured value of a. Similarly, the reference segmented avatar 1704 includes an angle between line segments b1, b2 and b2, b3, denoted as a reference angle 1904 with a measured value of B.

Once the image fitting module 128 generates the key-points 1706 and key-points 1714, the line segments 1708 and the line segments 1716, and the angles α and β, the image fitting module 128 matches a portion of the reference segmented avatar 1704 for the visual object 316 within the reference ROI 304 of the reference image 136 with a portion of the target segmented avatar 1702 for the visual object 308 within the target ROI 302 of the digital image 102 based on a shared number of key-points, a shared number of line segments, and/or a shared number of angles between line segments.

The image fitting module 128 defines a match based a set of pre-defined threshold values for a shared set of key-points, line segments, and/or angles between line segments between the reference segmented avatar 1704 and the target segmented avatar 1702.

In one embodiment, for example, the shared set of key-points comprises a number of key-points 1706 and key-points 1714 with coordinate values within the target bounding box 1802 and the reference bounding box 1804, respectively, where the coordinate values are within some defined range. The shared set of key-points should include a number of points that is greater than a defined threshold value. In one embodiment, for example, the shared set of angles comprises a threshold number of angles having a similar measured value, where two angles are similar if the measured values are within some defined range. In one embodiment, for example, the shared number of line segments comprises a threshold number of line segments having a similar length, where two lengths are similar if within some defined range.

As depicted in FIG. 19, the image fitting module 128 identifies a match between a portion 1910 of the target segmented avatar 1702 and a portion 1912 of the reference segmented avatar 1704. The image fitting module 128 outputs a set of matching portions 1908, which in this example includes the portion 1910 and the portion 1912.

In one embodiment, the image fitting module 128 adjusts the visual property of the target ROI based on the shared set of key points, line segments, and angles between line segments for a reference segmented avatar and a target segmented avatar. More particularly, the image fitting module 128 identifies a set of matching portions 1908, and compares the portion 1910 with the portion 1912 to identify differences between the portion 1910 and the portion 1912. The image fitting module 128 then scales the target ROI 302 with the visual object 308 represented by the target segmented avatar 1702 so that the portion 1910 of the target segmented avatar 1702 matches a dimension of the portion 1912 of the reference segmented avatar 1704. To scale the portion 1910, the image fitting module 128 computes a length of the line segments 1708 and a length of the line segments 1716, and computes an average between the lengths. The image fitting module 128 then uses a ratio of the average lengths to upsample or downsample the target ROI 302 to fit within the digital frame 132. The adjusted ROI 138 is then inserted into the digital frame 132.

In one embodiment, the image fitting module 128 of the collage creation module 110 adjusts a visual property of the target ROI to place the visual object in a defined position within the digital frame 132 based on the visual object data. The image fitting module 128 inserts an adjusted ROI 138 comprising the target ROI with the adjusted visual property into the digital frame 132 of the collage template 106.

In one embodiment, the visual property includes a size for the target ROI. The image fitting module 128 calculates a reference average length across line segments in a reference segmented avatar for the visual object within the reference image 136. The image fitting module 128 calculates a target average length across line segments in a target segmented avatar for the visual object within the digital image 102. The image fitting module 128 adjusts a size parameter of the target ROI using a ratio of the reference average length and the target average length. In the example described in FIG. 19, for example, the portion 1910 is larger than the portion 1912. Consequently, the image fitting module 128 downsizes or downsamples the portion 1910 to match a dimension of the portion 1912.

In one embodiment, the image fitting module 128 adjusts a parameter controlling the visual property of the target ROI of the digital image 102. Examples of parameters include, without limitation, a size parameter, an angle parameter, an alignment parameter, a position parameter, a light parameter, a color parameter, a sharpness parameter, a filter parameter, a crop parameter, an orientation parameter, a transform parameter, a skew parameter, an aspect ratio parameter, an effect parameter, a spot removal parameter, an eye parameter, or a style parameter.

In one embodiment, the image fitting module 128 adjusts a parameter of the digital frame 132 of the collage template 106 to fit the adjusted ROI of the digital image 102. Examples of parameters include, without limitation, a parameter that represents a shape adjustment, a size adjustment, a border adjustment, a text adjustment, an edge adjustment, a sticker adjustment, or a background adjustment. For example, assume the image fitting module 128 attempts to downsample the portion 1910 to match a dimension of the portion 1912, and it finds that the adjusted ROI 138 is too small to property fit within the image presentation area of the digital frame 132. In this case, the image fitting module 128 can reduce a size or shape of the digital frame 132 to better fit the adjusted ROI 138.

Figure 20A:
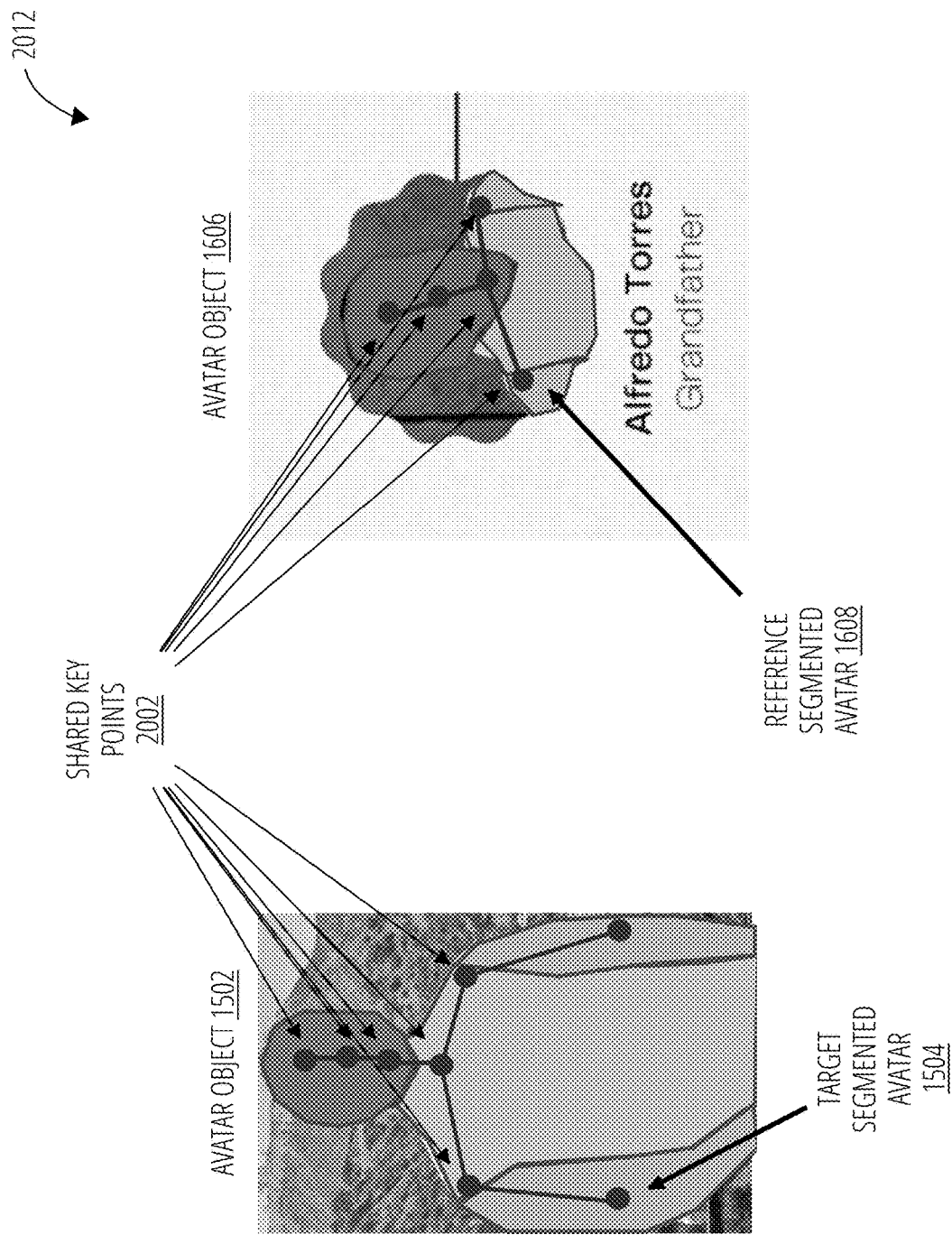
FIG. 20A illustrates an operating environment in accordance with one embodiment.

FIG. 20A illustrates an operating environment 2012. The operating environment 2012 illustrates the image fitting module 128 receiving as input the target segmented avatar 1504 from the avatar object 1502 representing a visual object 308 from the digital image 310. The operating environment 2012 further illustrates the image fitting module 128 receiving as input the reference segmented avatar 1608 from the avatar object 1606 representing a visual object 316 from the reference image 220.

In one embodiment, the image fitting module 128 adjusts the visual property of the target ROI based on the shared set of key points, line segments, and angles between line segments for a reference segmented avatar and a target segmented avatar. The operating environment 2012 depicts a set of shared key points 2002 between the target segmented avatar 1504 and the reference segmented avatar 1608. The set of shared key points 2002 comprise a set of 5 key-points, with 2 key-points representing a body segment for a head, and 3 key-points representing a body segment for shoulders.

FIG. 20B illustrates an operating environment 2014. The operating environment 2014 illustrates the image fitting module 128 receiving as input the target segmented avatar 1504 from the avatar object 1502 representing a visual object 308 from the digital image 310. The operating environment 2012 further illustrates the image fitting module 128 receiving as input the reference segmented avatar 1608 from the avatar object 1606 representing a visual object 316 from the reference image 220.

In one embodiment, the image fitting module 128 adjusts the visual property of the target ROI based on the shared set of key points, line segments, and angles between line segments for a reference segmented avatar and a target segmented avatar. The operating environment 2014 depicts a set of shared line segments 2004 between the target segmented avatar 1504 and the reference segmented avatar 1608. The set of shared line segments 2004 comprise a set of 4 line segments, with 2 line segments representing the body segment for the head, and 2 line segments representing the body segment for the shoulders.

Figure 20C:
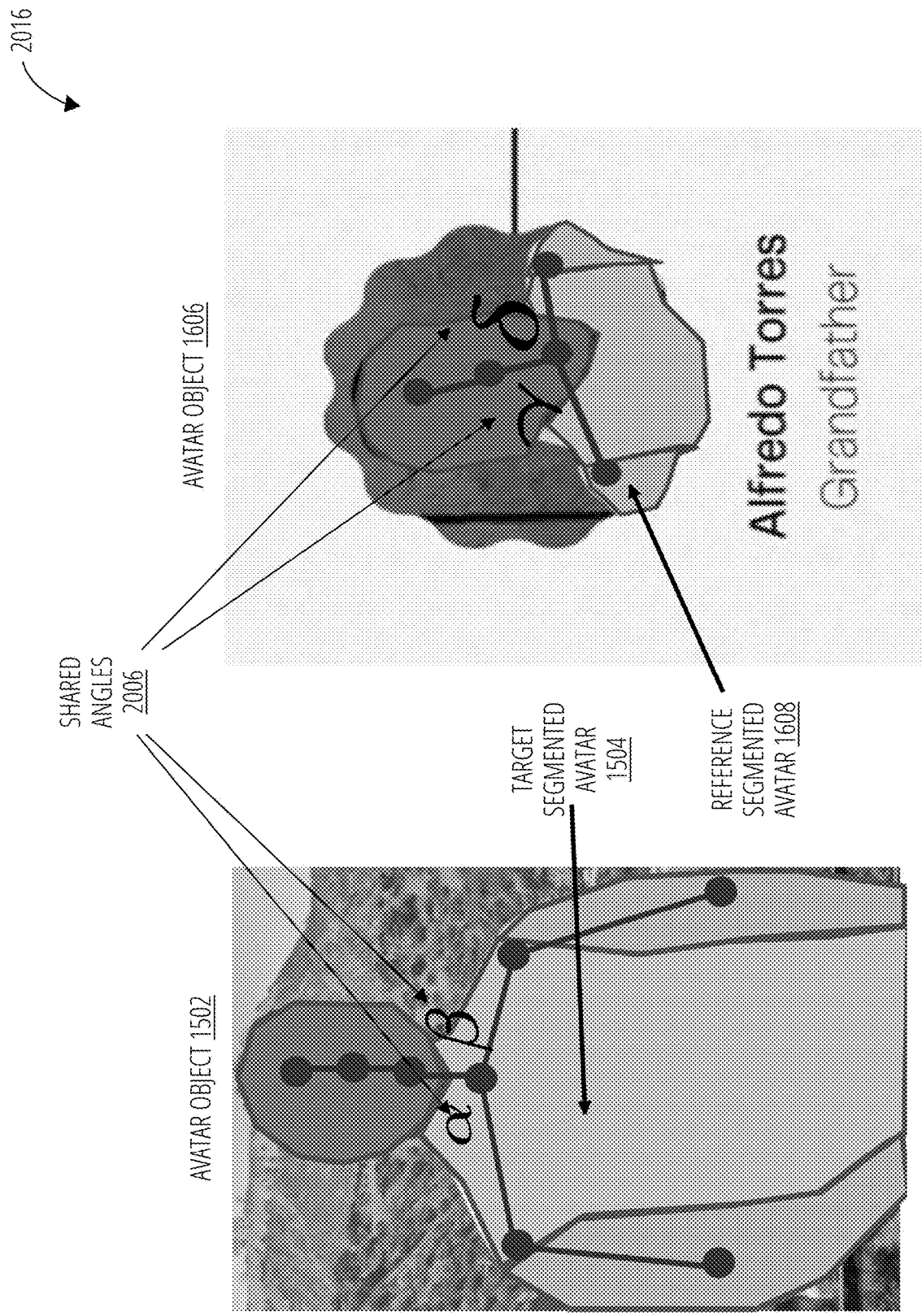
FIG. 20C illustrates an operating environment in accordance with one embodiment.

FIG. 20C illustrates an operating environment 2016. The operating environment 2016 illustrates the image fitting module 128 receiving as input the target segmented avatar 1504 from the avatar object 1502 representing a visual object 308 from the digital image 310. The operating environment 2012 further illustrates the image fitting module 128 receiving as input the reference segmented avatar 1608 from the avatar object 1606 representing a visual object 316 from the reference image 220.

In one embodiment, the image fitting module 128 adjusts the visual property of the target ROI based on the shared set of key points, line segments, and angles between line segments for a reference segmented avatar and a target segmented avatar. The operating environment 2016 depicts a set of shared angles 2006 between the target segmented avatar 1504 and the reference segmented avatar 1608. The set of shared angles 2006 comprise a set of 2 angles $\alpha$, $\gamma$ and $\beta$, $\delta$, with 1 angle representing an articulated joint between the head and the left shoulder, and 1 angle representing an articulated joint between the head the right shoulder.

Operations for the disclosed embodiments are further described with reference to the following figures. Some of the figures include a logic flow. Although such figures presented herein include a particular logic flow, the logic flow merely provides an example of how the general functionality as described herein is implemented. Further, a given logic flow does not necessarily have to be executed in the order presented unless otherwise indicated. Moreover, not all acts illustrated in a logic flow are required in some embodiments. In addition, the given logic flow is implemented by a hardware element, a software element executed by one or more processing devices, or any combination thereof. The embodiments are not limited in this context.

Figure 21:
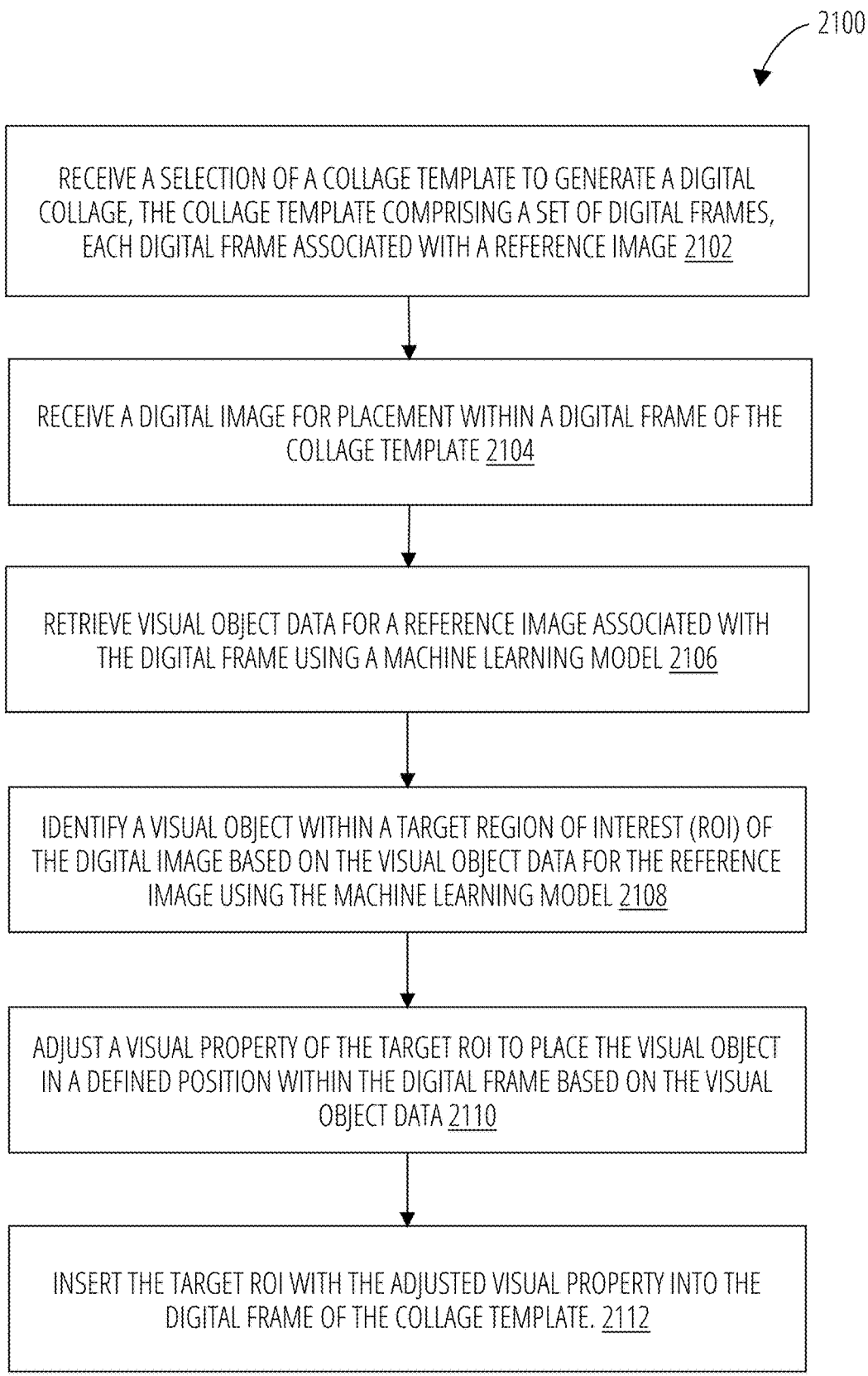
FIG. 21 illustrates a first logic flow in accordance with one embodiment.

FIG. 21 illustrates an embodiment of a logic flow 2100. The logic flow 2100 is representative of some or all of the operations executed by one or more embodiments described herein. For example, the logic flow 2100 includes some or all of the operations performed by devices or entities within the image editing application 146 of the apparatus 142. In one embodiment, the logic flow 2100 is implemented as instructions stored on a non-transitory computer-readable storage medium, such as the computer-readable storage medium 2802, that when executed by the processing circuitry 2520 causes the processing circuitry 2520 to perform the described operations. The computer-readable storage medium 2802 and processing circuitry 2520 may be co-located, or the instructions may be stored remotely from the processing circuitry 2520. Collectively, the computer-readable storage medium 2802 and the processing circuitry 2520 may form a system.

In block 2102, the logic flow 2100 includes receiving a selection of a collage template to generate a digital collage, the collage template includes a set of digital frames, each digital frame associated with a reference image. In block 2104, the logic flow 2100 includes receiving a digital image for placement within a digital frame of the collage template. In block 2106, the logic flow 2100 includes retrieving visual object data for a reference image associated with the digital frame using a machine learning model. In block 2108, the logic flow 2100 includes identifying a visual object within a target region of interest (ROI) of the digital image based on the visual object data for the reference image using the machine learning model. In block 2110, the logic flow 2100 includes adjusting a visual property of the target ROI to place the visual object in a defined position within the digital frame based on the visual object data. In block 2112, the logic flow 2100 includes inserting the target ROI with the adjusted visual property into the digital frame of the collage template.

With reference to the image editing application 146, by way of example, the image editing application 146 includes receiving a selection of a collage template 106 to generate a digital collage 140, the collage template 106 including a set of digital frames 130, each digital frame 132 associated with a reference image 136. The digital image manager 116 receives a digital image 102 for placement within a digital frame 132 of the collage template 106. The digital frame manager 118 retrieves visual object data for a reference image 136 associated with the digital frame 132 using a machine learning (ML) model, such as a ML model managed by the ML manager 120 and implemented by the object identifier 122, the pose detector 124 or the key-point generator 126. The object identifier 122 identifies a visual object 308 within a target ROI 302 of the digital image 102 based on the visual object data for the reference image 136 using the ML model, such as the faster R-CNN 1126.

The image fitting module 128 adjusts a visual property of the target ROI 302 to place the visual object 308 in a defined position within the digital frame 132 based on the visual object data. In one embodiment, adjusting the visual property of the target ROI 302 of the digital image 102 includes adjusting a size parameter, an angle parameter, an alignment parameter, a position parameter, a light parameter, a color parameter, a sharpness parameter, a filter parameter, a crop parameter, an orientation parameter, a transform parameter, a skew parameter, an aspect ratio parameter, an effect parameter, a spot removal parameter, an eye parameter, or a style parameter.

The image fitting module 128 inserts the target ROI 302 with the adjusted visual property, as adjusted ROI 138, into the digital frame 132 of the collage template 106. Once all the digital images 104 are added to the digital frames 130 of the collage template 106, the image fitting module 128 generates the digital collage 140 from the collage template 106. The image editing application 146 presents the digital collage 140 on an image editing GUI 230 of an electronic display of a client device.

Figure 22:
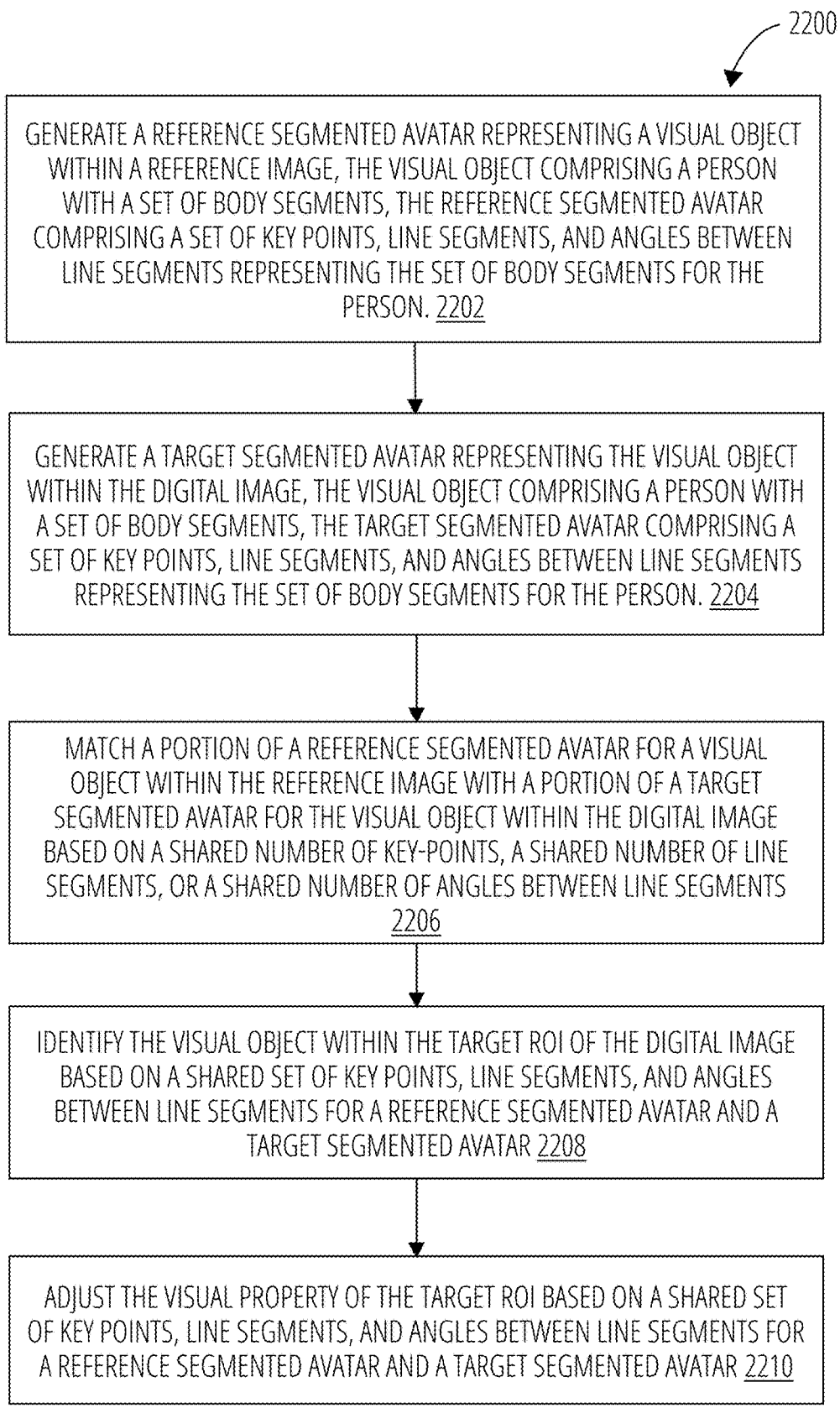
FIG. 22 illustrates a second logic flow in accordance with one embodiment.

FIG. 22 illustrates an embodiment of a logic flow 2200. The logic flow 2200 is representative of some or all of the operations executed by one or more embodiments described herein. For example, the logic flow 2200 includes some or all of the operations performed by devices or entities within the image editing application 146 of the apparatus 142. In one embodiment, the logic flow 2200 is implemented as instructions stored on a non-transitory computer-readable storage medium, such as the computer-readable storage medium 2802, that when executed by the processing circuitry 2520 causes the processing circuitry 2520 to perform the described operations. The computer-readable storage medium 2802 and processing circuitry 2520 may be co-located, or the instructions may be stored remotely from the processing circuitry 2520. Collectively, the computer-readable storage medium 2802 and the processing circuitry 2520 may form a system.

In block 2202, the logic flow 2200 includes generating visual object data for the reference image includes a reference segmented avatar representing a visual object within the reference image, the visual object includes a person with a set of body segments, the reference segmented avatar includes a set of key points, line segments, and angles between line segments representing the set of body segments for the person. In block 2204, the logic flow 2200 includes generating a target segmented avatar representing the visual object within the digital image, the visual object includes a person with a set of body segments, the target segmented avatar includes a set of key points, line segments, and angles between line segments representing the set of body segments for the person. In block 2206, the logic flow 2200 includes matching a portion of a reference segmented avatar for a visual object within the reference image with a portion of a target segmented avatar for the visual object within the digital image based on a shared number of key-points, a shared number of line segments, or a shared number of angles between line segments. In block 2208, the logic flow 2200 includes identifying the visual object within the target ROI of the digital image based on a shared set of key points, line segments, and angles between line segments for a reference segmented avatar and a target segmented avatar. In block 2210, the logic flow 2200 includes adjusting the visual property of the target ROI based on a shared set of key points, line segments, and angles between line segments for a reference segmented avatar and a target segmented avatar.

With reference to the image editing application 146, the key-point generator 126 generates visual object data for the reference image 136 in the form of a reference segmented avatar 1608 representing a visual object 316 within the reference image 136, the visual object 316 including a person with a set of body segments 1218. The reference segmented avatar 1608 includes a set of key points, line segments, and angles between line segments representing the set of body segments 1218 for the person. The key-point generator 126 also generates a target segmented avatar 1504 representing the visual object 308 within the digital image 102, the visual object 308 representing a person with a set of body segments 1218. The target segmented avatar 1504 includes a set of key points, line segments, and angles between line segments representing the set of body segments for the person. The image fitting module 128 matches a portion 1912 of a reference segmented avatar 1608 for a visual object 316 within the reference image 136 with a portion of a target segmented avatar 1504 for the visual object 308 within the digital image 102 based on a shared number of key-points, a shared number of line segments, or a shared number of angles between line segments. The image fitting module 128 identifies the visual object 308 within the target ROI 302 of the digital image 102 based on shared key points 2002, shared line segments 2004, and shared angles 2006 between line segments for the reference segmented avatar 1608 and the target segmented avatar 1504. The image fitting module 128 adjusts the visual property of the target ROI 302 based on a shared key points 2002, shared line segments 2004, and shared angles 2006 between line segments for the reference segmented avatar 1608 and the target segmented avatar 1504.

Figure 23:
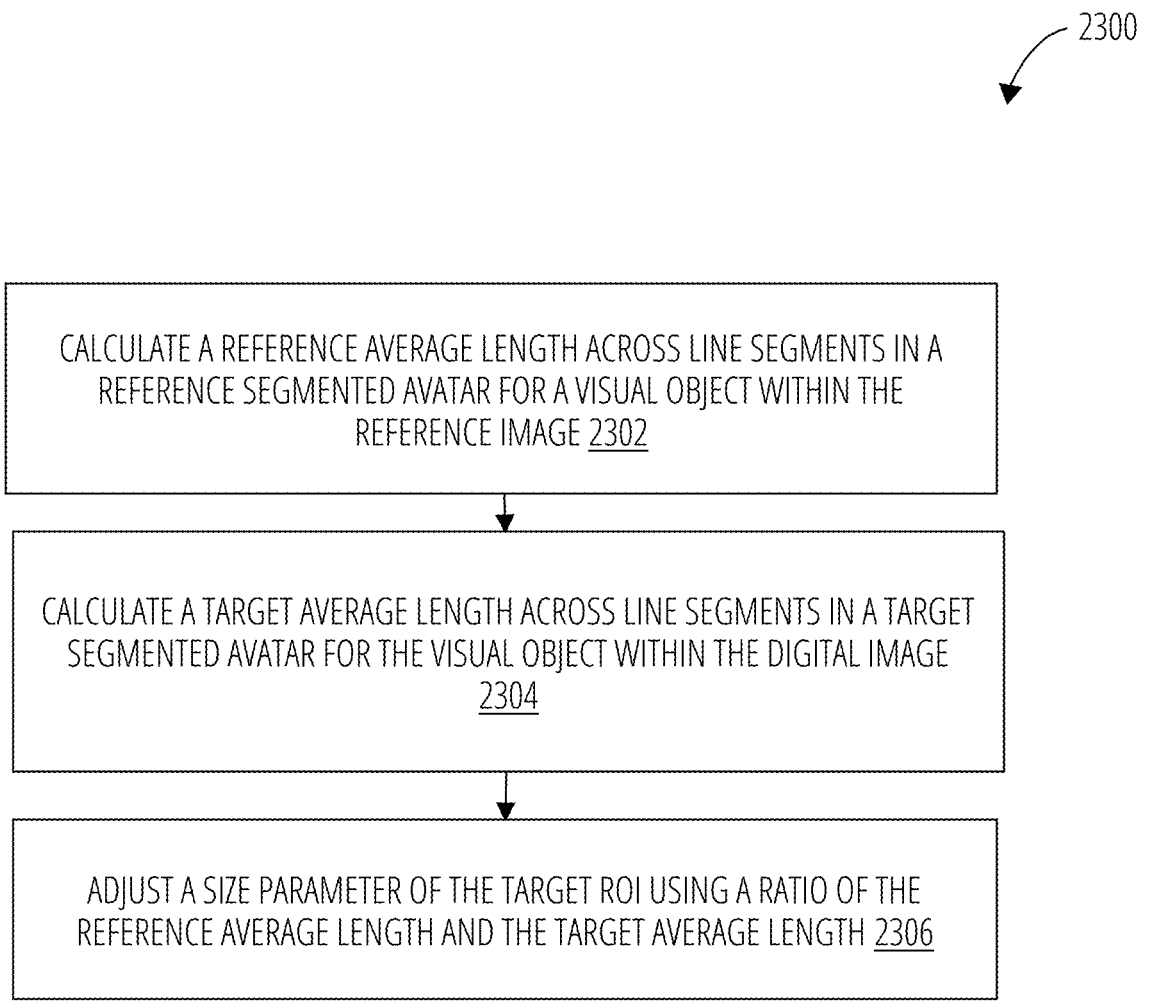
FIG. 23 illustrates a third logic flow in accordance with one embodiment.

FIG. 23 illustrates an embodiment of a logic flow 2300. The logic flow 2300 is representative of some or all of the operations executed by one or more embodiments described herein. For example, the logic flow 2300 includes some or all of the operations performed by devices or entities within the image editing application 146 of the apparatus 142. In one embodiment, the logic flow 2300 is implemented as instructions stored on a non-transitory computer-readable storage medium, such as the computer-readable storage medium 2802, that when executed by the processing circuitry 2520 causes the processing circuitry 2520 to perform the described operations. The computer-readable storage medium 2802 and processing circuitry 2520 may be co-located, or the instructions may be stored remotely from the processing circuitry 2520. Collectively, the computer-readable storage medium 2802 and the processing circuitry 2520 may form a system.

In block 2302, the logic flow 2300 includes calculating a reference average length across line segments in a reference segmented avatar for a visual object within the reference image. In block 2304, the logic flow 2300 includes calculating a target average length across line segments in a target segmented avatar for the visual object within the digital image. In block 2306, the logic flow 2300 includes adjusting a size parameter of the target ROI using a ratio of the reference average length and the target average length.

With reference to the image editing application 146, by way of example, the image fitting module 128 calculates a reference average length across line segments in the reference segmented avatar 1608 for the visual object 316 within the reference image 136. The image fitting module 128 calculates a target average length across line segments in the target segmented avatar 1504 for the visual object 316 within the digital image 102. The image fitting module 128 adjusts a size parameter of the target ROI 302 using a ratio of the reference average length and the target average length. The size parameter includes a height, width or depth for the target ROI 302.

Additionally, or alternatively, the image fitting module 128 adjusts a parameter of the digital frame 132 of the collage template 106 to fit the adjusted ROI 138, where the parameter represents a shape adjustment, a size adjustment, a border adjustment, a text adjustment, an edge adjustment, a sticker adjustment, or a background adjustment.

Figure 24:
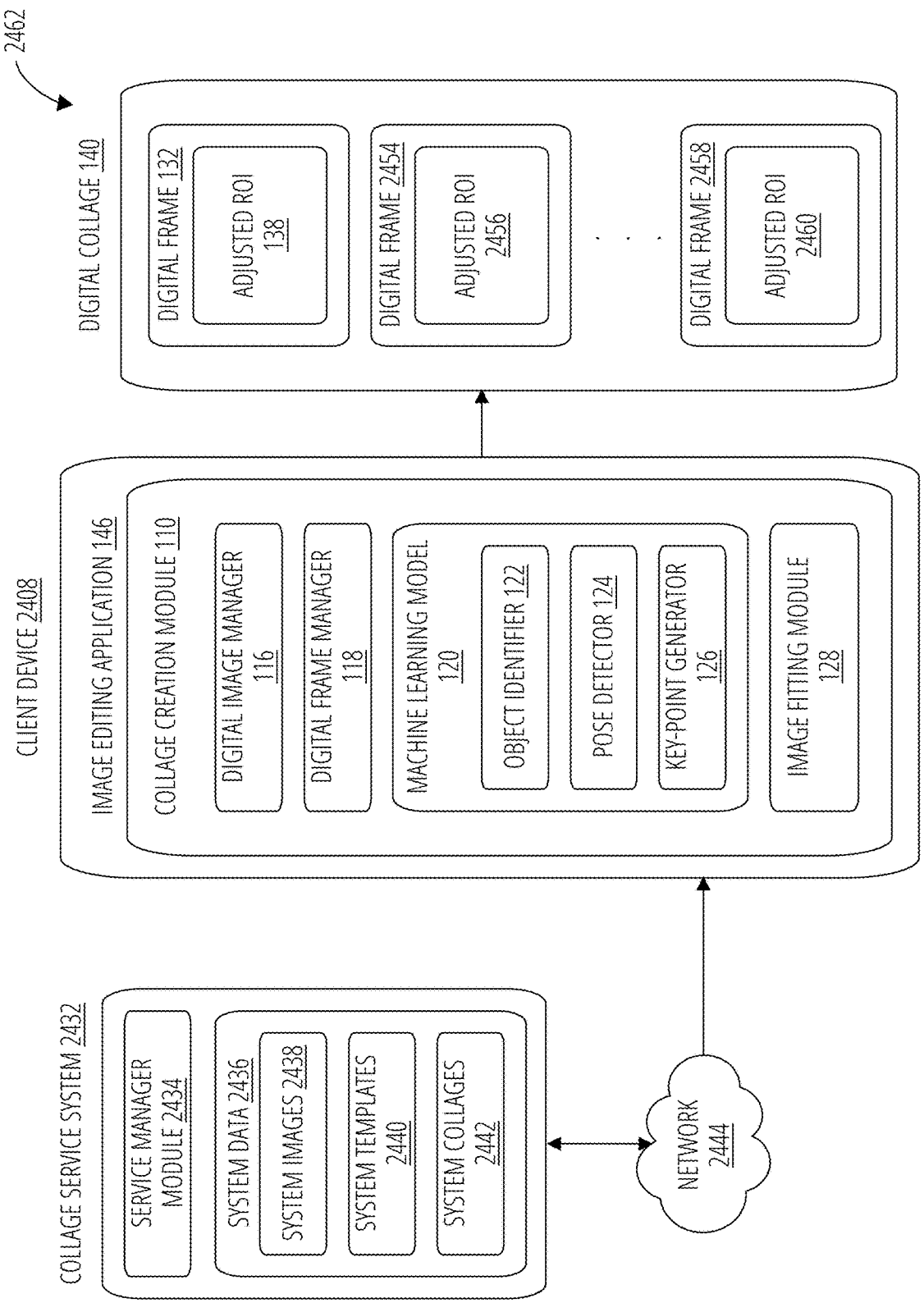
FIG. 24 illustrates an example of a system in accordance with one embodiment.

FIG. 24 illustrates a system 2462. The system 2462 illustrates a system suitable for implementing embodiments described herein, such as the image editing application 146 of the apparatus 142.

System 2462 is an illustration of an environment in an example implementation that is operable to employ techniques for generating a digital collage 140 using digital images 104 described herein. The system 2462 includes a client device 2408 and a collage service system 2422 that are communicatively coupled, one to another, via a network 2444.

Computing devices that are usable to implement the client device 2408 and the collage service system 2422 may be configured in a variety of ways, such as a desktop computer, a laptop computer, a mobile device (e.g., assuming a handheld configuration such as a tablet or mobile phone), a server device, and so forth. Thus, the computing device may range from full resource devices with substantial memory and processor resources (e.g., personal computers, game consoles) to a low-resource device with limited memory and/or processing resources (e.g., mobile devices). Additionally, a computing device may be representative of a plurality of different devices, such as multiple servers utilized by a business to perform operations "over the cloud" such as in a cloud computing system.

The client device 2408 includes an image editing application 146 that is representative of functionality to perform various editing interactions with digital images 104, such as various types of image transformations. The image editing application 146, for instance, includes a collage creation module 110 that is representative of functionality to arrange sets of digital images 104 into composite digital images, referred to herein as a "digital collage." A digital collage 140, for instance, represents an arrangement of multiple digital images 104 into a particular pattern, such as a predefined layout. To enable the collage creation module 110 to create different collages, the image editing application 146 maintains application data 2420 stored on a local storage. The application data 2420 includes digital images 104 and collage templates 108 that are usable by the collage creation module 110 to generate digital collages 140.

The digital images 104 are generally representative of different images that are stored in digital form, such as raster images, bitmap images, vector images, and so forth. In a typical, non-limiting implementation, the digital images 104 represent photographs that are captured in digital form by a digital camera, or that are converted into digital form. The collage templates 108 represent data that describes different ways for arranging different sets of the digital images 104. For instance, the collage templates 108 include different arrangements of "frames" into which sets of the digital images 104 can be placed to create the digital collages 140. Accordingly, the digital collages 140 represents different composite digital images that are generated by arranging sets of the digital images 104 according to different collage templates 108.

To enable users to interact with the image editing application 146, such as to create instances of the digital collages 140, the image editing application 146 includes an image editing GUI 230 displayed on display device of the client device 2408. The image editing GUI 230 is representative of functionality to present various visual affordances for interacting with the image editing application 146. The image editing GUI 230, for example, is configured to receive user input to invoke various actions by the image editing application 146. For instance, a user may provide input to the image editing GUI 230 to select a set of digital images 104 and to select a collage template 106 to cause an instance of a digital collage 140 to be generated.

In at least some implementations, certain image editing actions of the image editing application 146 can be performed in part or wholly by the collage service system 2422. The collage service system 2422, for example, represents a network-based service that can assist the client device 2408 in performing various image editing actions via the image editing application 146. To enable the collage service system 2422 to perform such actions, the collage service system 2422 maintains a service manager module 2424, which is representative of functionality for performing actions as part of techniques for generating a digital collage 140 using digital images 104 described herein. Examples of such actions include different data processing and storage tasks that can be performed by the collage service system 2422.

For instance, additionally or alternatively to storing the application data 2420 locally on the client device 2408, the collage service system 2422 stores system data 2426 on a system storage. The system data 2426 includes system images 2428, system templates 2430, and system collages 2442. A user, for example, can access the collage service system 2422 via the image editing application 146 on the client device 2408 to enable the user to create digital collages 140 via the collage service system 2422. Thus, digital collages 140 may be created locally on the client device 2408, via interaction with the collage service system 2422, and/or cooperatively via distribution of tasks between the client device 2408 and the collage service system 2422. Thus, although certain implementations are discussed herein with reference to instances of the digital images 104, the collage templates 108, and the digital collages 140, such implementations may also apply to the system images 2428, the system templates 2430, and the system collages 2442, respectively.

Figure 25:
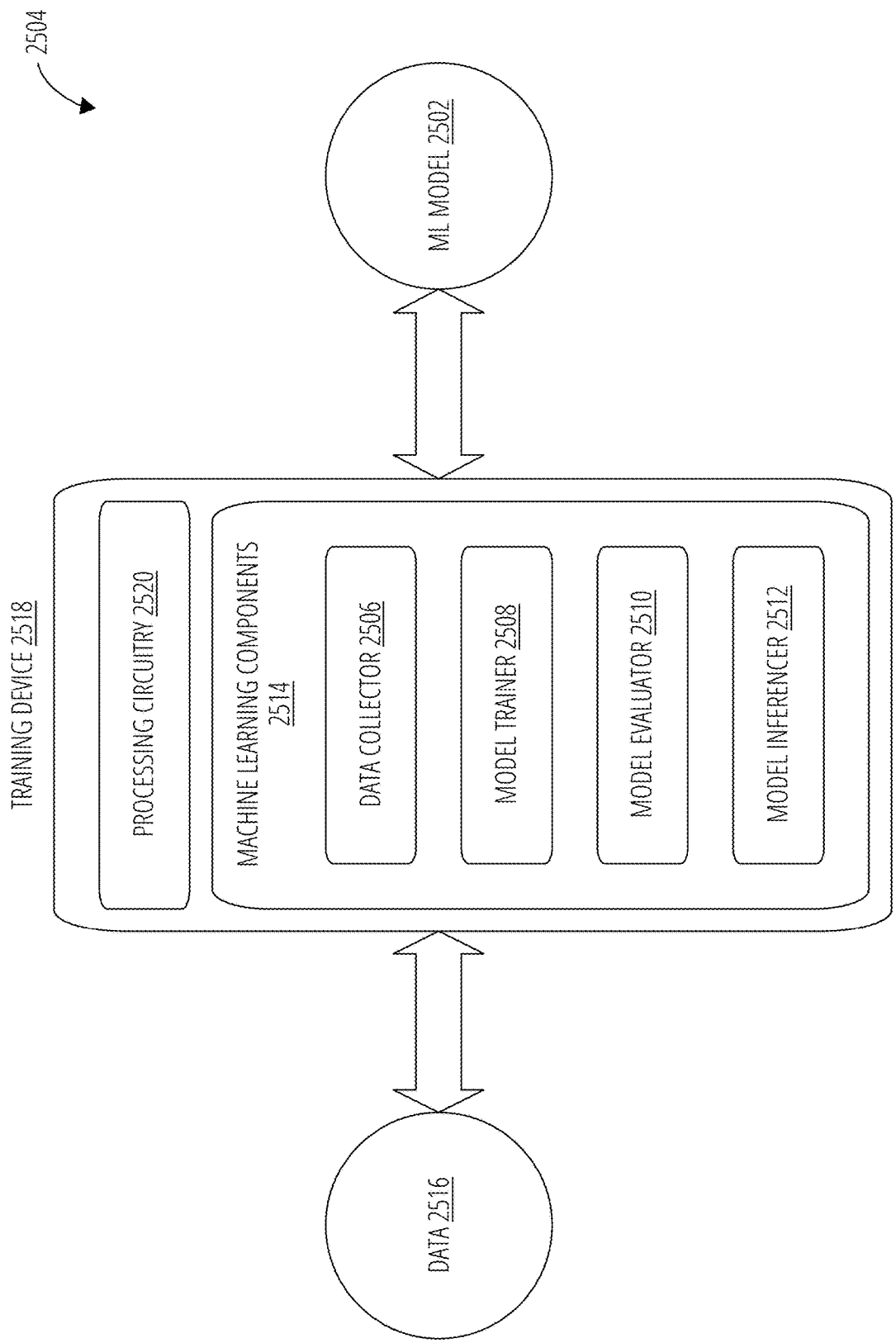
FIG. 25 illustrates an example of a training device in accordance with one embodiment.

FIG. 25 illustrates an apparatus 2504. The apparatus 2504 depicts a training device 2518 suitable to generate a trained ML model 2502 for the ML manager 120 of the apparatus 142 or the system 2462. In one embodiment, the training device 2518 executes various ML components 2514 to general an ML model 2502 for the ML manager 120 by training and testing a pre-trained model.

As depicted in FIG. 25, the training device 2518 includes a processing circuitry 2520 and a set of ML components 2514 to support various AI/ML techniques, such as a data collector 2506, a model trainer 2508, a model evaluator 2510 and a model inferencer 2512.

In general, the data collector 2506 collects data 2516 from one or more data sources to use as training data for the ML model 2502. The data collector 2506 collects different types of data 2516, such as text information, audio information, image information, video information, graphic information, and so forth. The model trainer 2508 receives as input the collected data and uses a portion of the collected data as test data for an AI/ML algorithm to train the ML model 2502. The model evaluator 2510 evaluates and improves the trained ML model 2502 using a portion of the collected data as test data to test the ML model 2502. The model evaluator 2510 also uses feedback information from the deployed ML model 2502. The model inferencer 2512 implements the trained ML model 2502 to receive as input new unseen data, generate one or more inferences on the new data, and output a result such as an alert, a recommendation or other post-solution activity.

An exemplary AI/ML architecture for the ML components 2514 is described in more detail with reference to FIG. 26.

Figure 26:
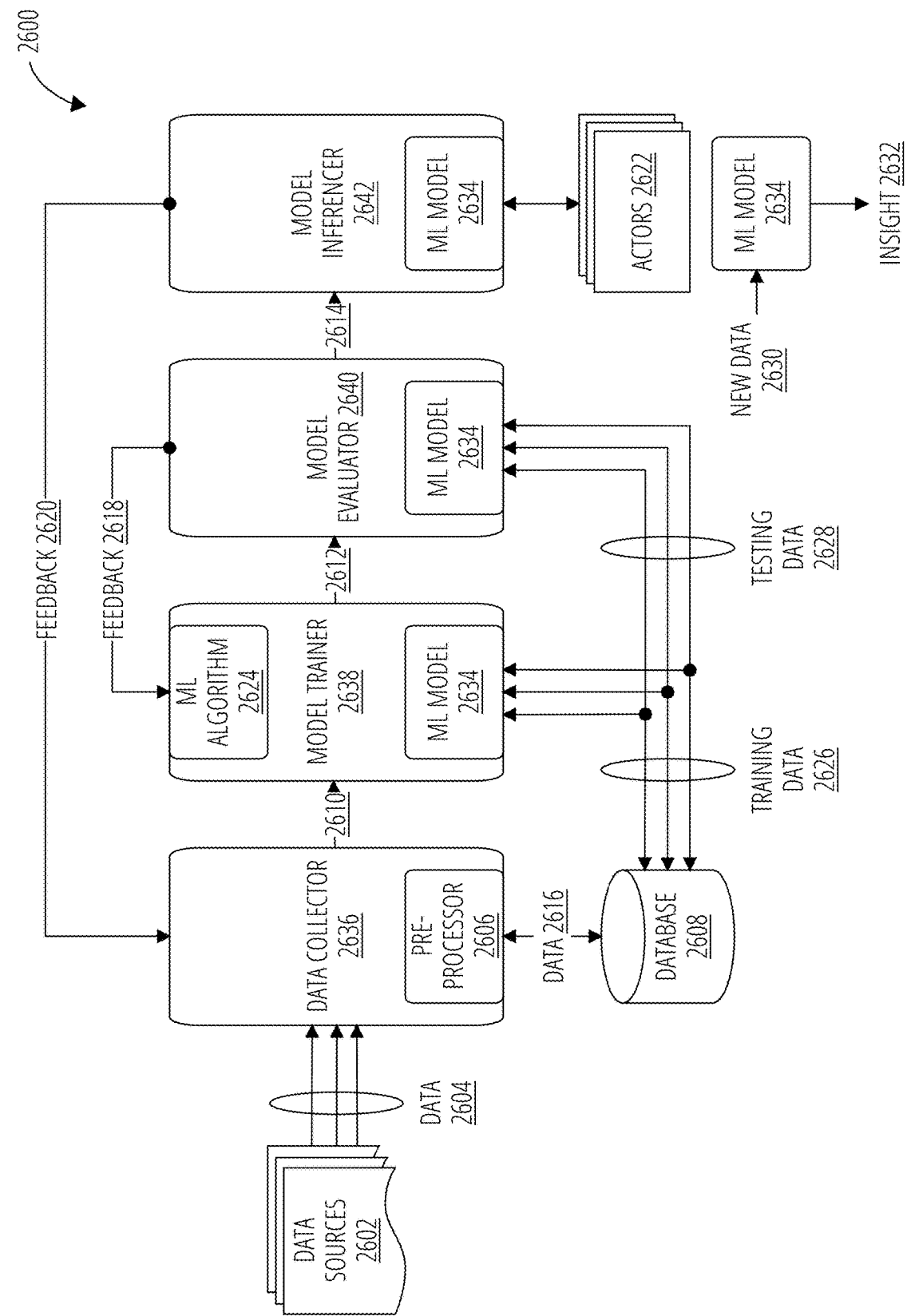
FIG. 26 illustrates an artificial intelligence architecture in accordance with one embodiment.

FIG. 26 illustrates an artificial intelligence architecture 2600 suitable for use by the training device 2518 to generate the ML model 2502 for deployment by an inferencing device, such as the client device 2408. The artificial intelligence architecture 2600 is an example of a system suitable for implementing various AI techniques and/or ML techniques to perform various inferencing tasks on behalf of the various devices of the system 2462.

AI is a science and technology based on principles of cognitive science, computer science and other related disciplines, which deals with the creation of intelligent machines that work and react like humans. AI is used to develop systems that can perform tasks that require human intelligence such as recognizing speech, vision and making decisions. AI can be seen as the ability for a machine or computer to think and learn, rather than just following instructions. ML is a subset of AI that uses algorithms to enable machines to learn from existing data and generate insights or predictions from that data. ML algorithms are used to optimize machine performance in various tasks such as classifying, clustering and forecasting. ML algorithms are used to create ML models that can accurately predict outcomes.

In general, the artificial intelligence architecture 2600 includes various machine or computer components (e.g., circuit, processor circuit, memory, network interfaces, compute platforms, input/output (I/O) devices, etc.) for an AI/ML system that are designed to work together to create a pipeline that can take in raw data, process it, train an ML model 2634 (e.g., the ML model 2502), evaluate performance of the trained ML model 2634, and deploy the tested ML model 2634 as the trained ML model 2634 in a production environment, and continuously monitor and maintain it.

The ML model 2634 is a mathematical construct used to predict outcomes based on a set of input data. The ML model 2634 is trained using large volumes of training data 2626, and it can recognize patterns and trends in the training data 2626 to make accurate predictions. The ML model 2634 is derived from an ML algorithm 2624 (e.g., a neural network, decision tree, support vector machine, etc.). A data set is fed into the ML algorithm 2624 which trains an ML model 2634 to "learn" a function that produces mappings between a set of inputs and a set of outputs with a reasonably high accuracy. Given a sufficiently large enough set of inputs and outputs, the ML algorithm 2624 finds the function for a given task. This function may even be able to produce the correct output for input that it has not seen during training. A data scientist prepares the mappings, selects and tunes the ML algorithm 2624, and evaluates the resulting model performance. Once the ML logic is sufficiently accurate on test data, it can be deployed for production use.

The ML algorithm 2624 may comprise any ML algorithm suitable for a given AI task. Examples of ML algorithms may include supervised algorithms, unsupervised algorithms, or semi-supervised algorithms.

A supervised algorithm is a type of machine learning algorithm that uses labeled data to train a machine learning model. In supervised learning, the machine learning algorithm is given a set of input data and corresponding output data, which are used to train the model to make predictions or classifications. The input data is also known as the features, and the output data is known as the target or label. The goal of a supervised algorithm is to learn the relationship between the input features and the target labels, so that it can make accurate predictions or classifications for new, unseen data. Examples of supervised learning algorithms include: (1) linear regression which is a regression algorithm used to predict continuous numeric values, such as stock prices or temperature; (2) logistic regression which is a classification algorithm used to predict binary outcomes, such as whether a customer will purchase or not purchase a product; (3) decision tree which is a classification algorithm used to predict categorical outcomes by creating a decision tree based on the input features; or (4) random forest which is an ensemble algorithm that combines multiple decision trees to make more accurate predictions.

An unsupervised algorithm is a type of machine learning algorithm that is used to find patterns and relationships in a dataset without the need for labeled data. Unlike supervised learning, where the algorithm is provided with labeled training data and learns to make predictions based on that data, unsupervised learning works with unlabeled data and seeks to identify underlying structures or patterns. Unsupervised learning algorithms use a variety of techniques to discover patterns in the data, such as clustering, anomaly detection, and dimensionality reduction. Clustering algorithms group similar data points together, while anomaly detection algorithms identify unusual or unexpected data points. Dimensionality reduction algorithms are used to reduce the number of features in a dataset, making it easier to analyze and visualize. Unsupervised learning has many applications, such as in data mining, pattern recognition, and recommendation systems. It is particularly useful for tasks where labeled data is scarce or difficult to obtain, and where the goal is to gain insights and understanding from the data itself rather than to make predictions based on it.

Semi-supervised learning is a type of machine learning algorithm that combines both labeled and unlabeled data to improve the accuracy of predictions or classifications. In this approach, the algorithm is trained on a small amount of labeled data and a much larger amount of unlabeled data. The main idea behind semi-supervised learning is that labeled data is often scarce and expensive to obtain, whereas unlabeled data is abundant and easy to collect. By leveraging both types of data, semi-supervised learning can achieve higher accuracy and better generalization than either supervised or unsupervised learning alone. In semi-supervised learning, the algorithm first uses the labeled data to learn the underlying structure of the problem. It then uses this knowledge to identify patterns and relationships in the unlabeled data, and to make predictions or classifications based on these patterns. Semi-supervised learning has many applications, such as in speech recognition, natural language processing, and computer vision. It is particularly useful for tasks where labeled data is expensive or time-consuming to obtain, and where the goal is to improve the accuracy of predictions or classifications by leveraging large amounts of unlabeled data.

The ML algorithm 2624 of the artificial intelligence architecture 2600 is implemented using various types of ML algorithms including supervised algorithms, unsupervised algorithms, semi-supervised algorithms, or a combination thereof. A few examples of ML algorithms include support vector machine (SVM), random forests, naive Bayes, K-means clustering, neural networks, and so forth. A SVM is an algorithm that can be used for both classification and regression problems. It works by finding an optimal hyperplane that maximizes the margin between the two classes. Random forests is a type of decision tree algorithm that is used to make predictions based on a set of randomly selected features. Naive Bayes is a probabilistic classifier that makes predictions based on the probability of certain events occurring. K-Means Clustering is an unsupervised learning algorithm that groups data points into clusters. Neural networks is a type of machine learning algorithm that is designed to mimic the behavior of neurons in the human brain. Other examples of ML algorithms include a support vector machine (SVM) algorithm, a random forest algorithm, a naive Bayes algorithm, a K-means clustering algorithm, a neural network algorithm, an artificial neural network (ANN) algorithm, a convolutional neural network (CNN) algorithm, a recurrent neural network (RNN) algorithm, a long short-term memory (LSTM) algorithm, a deep learning algorithm, a decision tree learning algorithm, a regression analysis algorithm, a Bayesian network algorithm, a genetic algorithm, a federated learning algorithm, a distributed artificial intelligence algorithm, and so forth. Embodiments are not limited in this context.

As depicted in FIG. 26, the artificial intelligence architecture 2600 includes a set of data sources 2602 to source data 2604 for the artificial intelligence architecture 2600. Data sources 2602 may comprise any device capable generating, processing, storing or managing data 2604 suitable for a ML system. Examples of data sources 2602 include without limitation databases, web scraping, sensors and Internet of Things (IoT) devices, image and video cameras, audio devices, text generators, publicly available databases, private databases, and many other data sources 2602. The data sources 2602 may be remote from the artificial intelligence architecture 2600 and accessed via a network, local to the artificial intelligence architecture 2600 an accessed via a network interface, or may be a combination of local and remote data sources 2602.

The data sources 2602 source difference types of data 2604. By way of example and not limitation, the data 2604 includes structured data from relational databases, such as customer profiles, transaction histories, or product inventories. The data 2604 includes unstructured data from websites such as customer reviews, news articles, social media posts, or product specifications. The data 2604 includes data from temperature sensors, motion detectors, and smart home appliances. The data 2604 includes image data from medical images, security footage, or satellite images. The data 2604 includes audio data from speech recognition, music recognition, or call centers. The data 2604 includes text data from emails, chat logs, customer feedback, news articles or social media posts. The data 2604 includes publicly available datasets such as those from government agencies, academic institutions, or research organizations. These are just a few examples of the many sources of data that can be used for ML systems. It is important to note that the quality and quantity of the data is critical for the success of a machine learning project.

The data 2604 is typically in different formats such as structured, unstructured or semi-structured data. Structured data refers to data that is organized in a specific format or schema, such as tables or spreadsheets. Structured data has a well-defined set of rules that dictate how the data should be organized and represented, including the data types and relationships between data elements. Unstructured data refers to any data that does not have a predefined or organized format or schema. Unlike structured data, which is organized in a specific way, unstructured data can take various forms, such as text, images, audio, or video. Unstructured data can come from a variety of sources, including social media, emails, sensor data, and website content. Semi-structured data is a type of data that does not fit neatly into the traditional categories of structured and unstructured data. It has some structure but does not conform to the rigid structure of a traditional relational database. Semi-structured data is characterized by the presence of tags or metadata that provide some structure and context for the data.

The data sources 2602 are communicatively coupled to a data collector 2636. The data collector 2636 gathers relevant data 2604 from the data sources 2602. Once collected, the data collector 2636 may use a pre-processor 2606 to make the data 2604 suitable for analysis. This involves data cleaning, transformation, and feature engineering. Data pre-processing is a critical step in ML as it directly impacts the accuracy and effectiveness of the ML model 2634. The pre-processor 2606 receives the data 2604 as input, processes the data 2604, and outputs pre-processed data 2616 for storage in a database 2608. Examples for the database 2608 includes a hard drive, solid state storage, and/or random access memory (RAM).

The data collector 2636 is communicatively coupled to a model trainer 2638. The model trainer 2638 performs AI/ML model training, validation, and testing which may generate model performance metrics as part of the model testing procedure. The model trainer 2638 receives the pre-processed data 2616 as input 2610 or via the database 2608. The model trainer 2638 implements a suitable ML algorithm 2624 to train an ML model 2634 on a set of training data 2626 from the pre-processed data 2616. The training process involves feeding the pre-processed data 2616 into the ML algorithm 2624 to produce or optimize an ML model 2634. The training process adjusts its parameters until it achieves an initial level of satisfactory performance.

The model trainer 2638 is communicatively coupled to a model evaluator 2640. After an ML model 2634 is trained, the ML model 2634 needs to be evaluated to assess its performance. This is done using various metrics such as accuracy, precision, recall, and F1 score. The model trainer 2638 outputs the ML model 2634, which is received as input 2610 or from the database 2608. The model evaluator 2640 receives the ML model 2634 as input 2612, and it initiates an evaluation process to measure performance of the ML model 2634. The evaluation process includes providing feedback 2618 to the model trainer 2638. The model trainer 2638 re-trains the ML model 2634 to improve performance in an iterative manner.

The model evaluator 2640 is communicatively coupled to a model inferencer 2642. The model inferencer 2642 provides AI/ML model inference output (e.g., inferences, predictions or decisions). Once the ML model 2634 is trained and evaluated, it is deployed in a production environment where it is used to make predictions on new data. The model inferencer 2642 receives the evaluated ML model 2634 as input 2614. The model inferencer 2642 uses the evaluated ML model 2634 to produce insights or predictions on real data, which is deployed as a final production ML model 2634. The inference output of the ML model 2634 is use case specific. The model inferencer 2642 also performs model monitoring and maintenance, which involves continuously monitoring performance of the ML model 2634 in the production environment and making any necessary updates or modifications to maintain its accuracy and effectiveness. The model inferencer 2642 provides feedback 2618 to the data collector 2636 to train or re-train the ML model 2634. The feedback 2618 includes model performance feedback information, which is used for monitoring and improving performance of the ML model 2634.

Some or all of the model inferencer 2642 is implemented by various actors 2622 in the artificial intelligence architecture 2600, including the ML model 2634 of the inferencing device, for example. The actors 2622 use the deployed ML model 2634 on new data to make inferences or predictions for a given task, and output an insight 2632. The actors 2622 implement the model inferencer 2642 locally, or remotely receives outputs from the model inferencer 2642 in a distributed computing manner. The actors 2622 trigger actions directed to other entities or to itself. The actors 2622 provide feedback 2620 to the data collector 2636 via the model inferencer 2642. The feedback 2620 comprise data needed to derive training data, inference data or to monitor the performance of the ML model 2634 and its impact to the network through updating of key performance indicators (KPIs) and performance counters.

As previously described with reference to previous embodiments that implement some or all of the artificial intelligence architecture 2600 to support various use cases and solutions for various AI/ML tasks. In various embodiments, the training device 2518 of the apparatus 2504 uses the artificial intelligence architecture 2600 to generate and train the ML model 2634 for use by the inferencing device for the system 2462. In one embodiment, for example, the training device 2518 may train the ML model 2634 as a neural network, as described in more detail with reference to FIG. 27. Other use cases and solutions for AI/ML are possible as well, and embodiments are not limited in this context.

Figure 27:
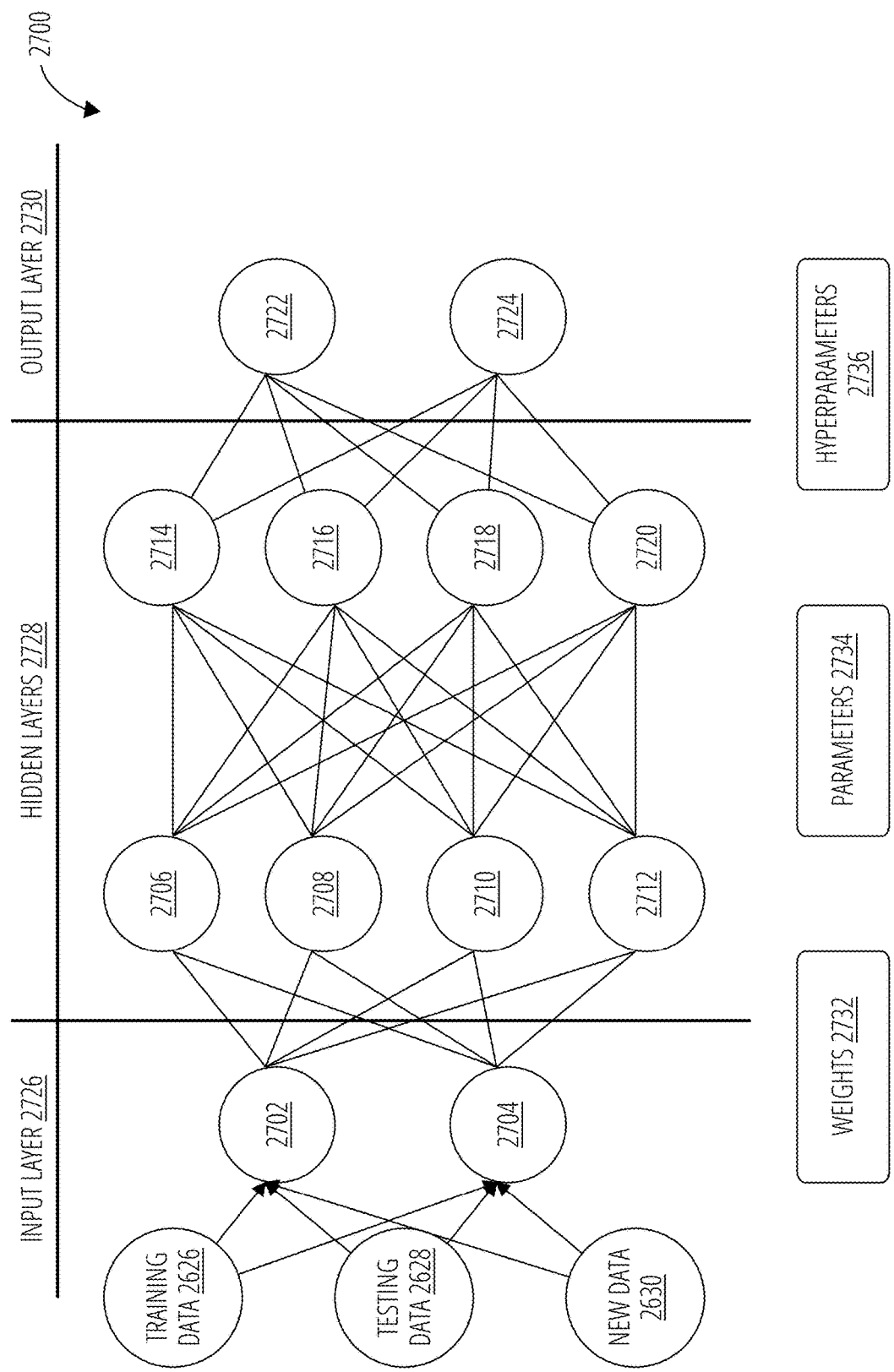
FIG. 27 illustrates an artificial neural network in accordance with one embodiment.

FIG. 27 illustrates an embodiment of an artificial neural network 2700. Neural networks, also known as artificial neural networks (ANNs) or simulated neural networks (SNNs), are a subset of machine learning and are at the core of deep learning algorithms. Their name and structure are inspired by the human brain, mimicking the way that biological neurons signal to one another.

Artificial neural network 2700 comprises multiple node layers, containing an input layer 2726, one or more hidden layers 2728, and an output layer 2730. Each layer comprises one or more nodes, such as nodes 2702 to 2724. As depicted in FIG. 27, for example, the input layer 2726 has nodes 2702, 2704. The artificial neural network 2700 has two hidden layers 2728, with a first hidden layer having nodes 2706, 2708, 2710 and 2712, and a second hidden layer having nodes 2714, 2716, 2718 and 2720. The artificial neural network 2700 has an output layer 2730 with nodes 2722, 2724. Each node 2702 to 2724 comprises a processing element (PE), or artificial neuron, that connects to another and has an associated weight and threshold. If the output of any individual node is above the specified threshold value, that node is activated, sending data to the next layer of the network. Otherwise, no data is passed along to the next layer of the network.

In general, artificial neural network 2700 relies on training data 2626 to learn and improve accuracy over time. However, once the artificial neural network 2700 is fine-tuned for accuracy, and tested on testing data 2628, the artificial neural network 2700 is ready to classify and cluster new data 2630 at a high velocity. Tasks in speech recognition or image recognition can take minutes versus hours when compared to the manual identification by human experts.

Each individual node 2702 to 424 is a linear regression model, composed of input data, weights, a bias (or threshold), and an output. Once an input layer 2726 is determined, a set of weights 2732 are assigned. The weights 2732 help determine the importance of any given variable, with larger ones contributing more significantly to the output compared to other inputs. All inputs are then multiplied by their respective weights and then summed. Afterward, the output is passed through an activation function, which determines the output. If that output exceeds a given threshold, it "fires" (or activates) the node, passing data to the next layer in the network. This results in the output of one node becoming in the input of the next node. The process of passing data from one layer to the next layer defines the artificial neural network 2700 as a feedforward network.

In one embodiment, the artificial neural network 2700 leverages sigmoid neurons, which are distinguished by having values between 0 and 1. Since the artificial neural network 2700 behaves similarly to a decision tree, cascading data from one node to another, having x values between 0 and 1 will reduce the impact of any given change of a single variable on the output of any given node, and subsequently, the output of the artificial neural network 2700.

The artificial neural network 2700 has many practical use cases, like image recognition, speech recognition, text recognition or classification. The artificial neural network 2700 leverages supervised learning, or labeled datasets, to train the algorithm. As the model is trained, its accuracy is measured using a cost (or loss) function. This is also commonly referred to as the mean squared error (MSE).

Ultimately, the goal is to minimize the cost function to ensure correctness of fit for any given observation. As the model adjusts its weights and bias, it uses the cost function and reinforcement learning to reach the point of convergence, or the local minimum. The process in which the algorithm adjusts its weights is through gradient descent, allowing the model to determine the direction to take to reduce errors (or minimize the cost function). With each training example, the parameters 2734 of the model adjust to gradually converge at the minimum.

In one embodiment, the artificial neural network 2700 is feedforward, meaning it flows in one direction only, from input to output. In one embodiment, the artificial neural network 2700 uses backpropagation. Backpropagation is when the artificial neural network 2700 moves in the opposite direction from output to input. Backpropagation allows calculation and attribution of errors associated with each neuron 2702 to 2724, thereby allowing adjustment to fit the parameters 2734 of the ML model 2634 appropriately.

The artificial neural network 2700 is implemented as different neural networks depending on a given task. Neural networks are classified into different types, which are used for different purposes. In one embodiment, the artificial neural network 2700 is implemented as a feedforward neural network, or multi-layer perceptrons (MLPs), comprised of an input layer 2726, hidden layers 2728, and an output layer 2730. While these neural networks are also commonly referred to as MLPs, they are actually comprised of sigmoid neurons, not perceptrons, as most real-world problems are nonlinear. Trained data 2604 usually is fed into these models to train them, and they are the foundation for computer vision, natural language processing, and other neural networks. In one embodiment, the artificial neural network 2700 is implemented as a convolutional neural network (CNN). A CNN is similar to feedforward networks, but usually utilized for image recognition, pattern recognition, and/or computer vision. These networks harness principles from linear algebra, particularly matrix multiplication, to identify patterns within an image. In one embodiment, the artificial neural network 2700 is implemented as a recurrent neural network (RNN). A RNN is identified by feedback loops. The RNN learning algorithms are primarily leveraged when using time-series data to make predictions about future outcomes, such as stock market predictions or sales forecasting. The artificial neural network 2700 is implemented as any type of neural network suitable for a given operational task of system 2400, and the MLP, CNN, and RNN are merely a few examples. Embodiments are not limited in this context.

The artificial neural network 2700 includes a set of associated parameters 2734. There are a number of different parameters that must be decided upon when designing a neural network. Among these parameters are the number of layers, the number of neurons per layer, the number of training iterations, and so forth. Some of the more important parameters in terms of training and network capacity are a number of hidden neurons parameter, a learning rate parameter, a momentum parameter, a training type parameter, an Epoch parameter, a minimum error parameter, and so forth.

In some cases, the artificial neural network 2700 is implemented as a deep learning neural network. The term deep learning neural network refers to a depth of layers in a given neural network. A neural network that has more than three layers—which would be inclusive of the inputs and the output—can be considered a deep learning algorithm. A neural network that only has two or three layers, however, may be referred to as a basic neural network. A deep learning neural network may tune and optimize one or more hyperparameters 2736. A hyperparameter is a parameter whose values are set before starting the model training process. Deep learning models, including convolutional neural network (CNN) and recurrent neural network (RNN) models can have anywhere from a few hyperparameters to a few hundred hyperparameters. The values specified for these hyperparameters impacts the model learning rate and other regulations during the training process as well as final model performance. A deep learning neural network uses hyperparameter optimization algorithms to automatically optimize models. The algorithms used include Random Search, Tree-structured Parzen Estimator (TPE) and Bayesian optimization based on the Gaussian process. These algorithms are combined with a distributed training engine for quick parallel searching of the optimal hyperparameter values.

Figure 28:
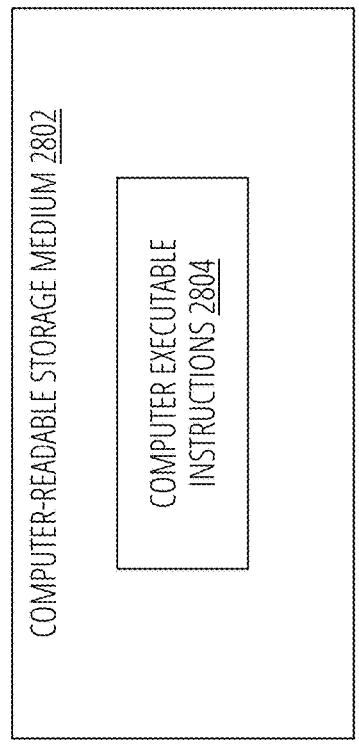
FIG. 28 illustrates a computer-readable storage medium in accordance with one embodiment.

FIG. 28 illustrates an apparatus 2800. Apparatus 2800 comprises any non-transitory computer-readable storage medium 2802 or machine-readable storage medium, such as an optical, magnetic or semiconductor storage medium. In various embodiments, apparatus 2800 comprises an article of manufacture or a product. In some embodiments, the computer-readable storage medium 2802 stores computer executable instructions with which one or more processing devices or processing circuitry can execute. For example, computer executable instructions 2804 includes instructions to implement operations described with respect to any logic flows described herein. Examples of computer-readable storage medium 2802 or machine-readable storage medium include any tangible media capable of storing electronic data, including volatile memory or non-volatile memory, removable or non-removable memory, erasable or non-erasable memory, writeable or re-writeable memory, and so forth. Examples of computer executable instructions 2804 include any suitable type of code, such as source code, compiled code, interpreted code, executable code, static code, dynamic code, object-oriented code, visual code, and the like.

Figure 29:
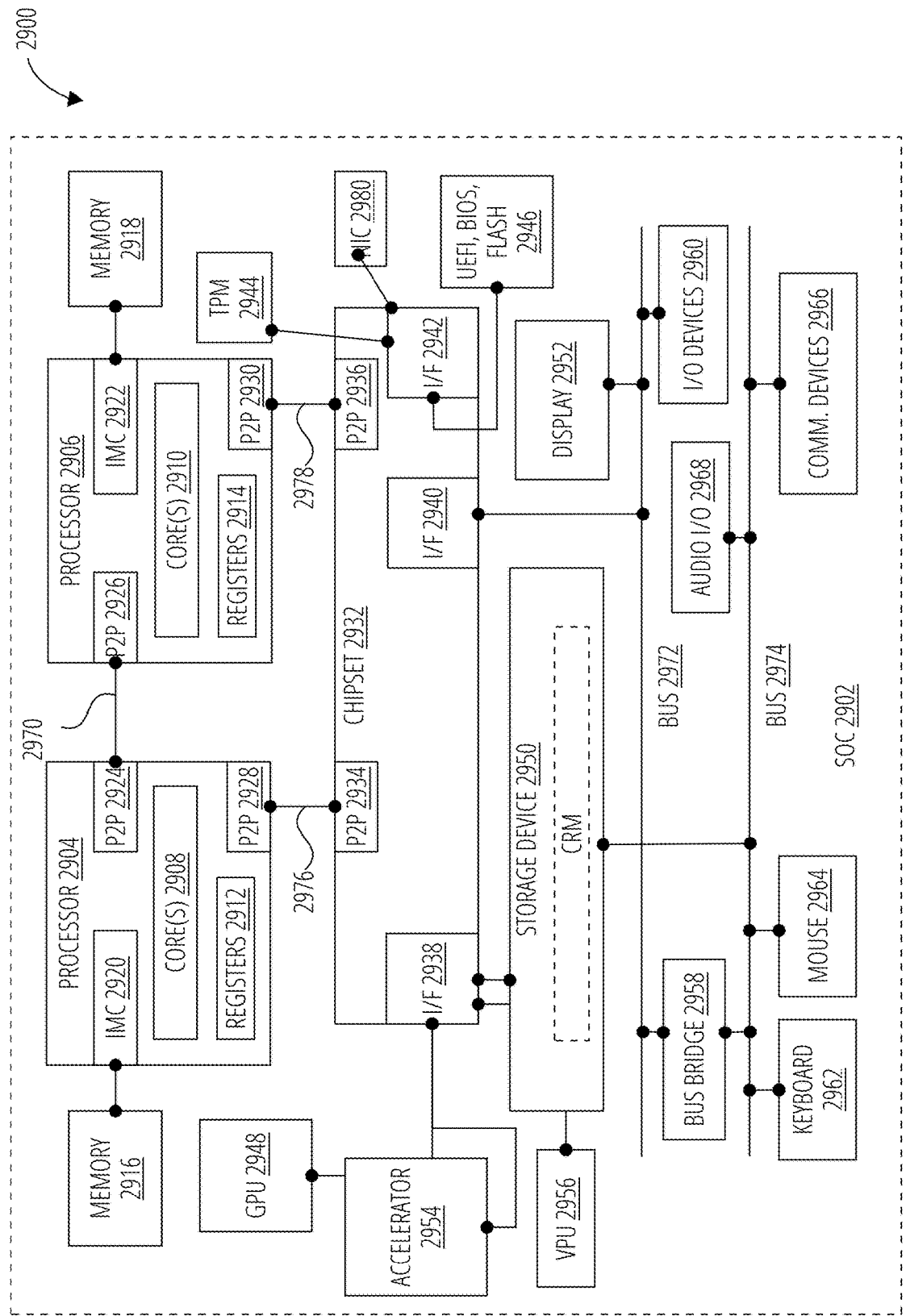
FIG. 29 illustrates a computing architecture in accordance with one embodiment.

FIG. 29 illustrates an embodiment of a computing architecture 2900. Computing architecture 2900 is a computer system with multiple processor cores such as a distributed computing system, supercomputer, high-performance computing system, computing cluster, mainframe computer, mini-computer, client-server system, personal computer (PC), workstation, server, portable computer, laptop computer, tablet computer, handheld device such as a personal digital assistant (PDA), or other device for processing, displaying, or transmitting information. Similar embodiments may comprise, e.g., entertainment devices such as a portable music player or a portable video player, a smart phone or other cellular phone, a telephone, a digital video camera, a digital still camera, an external storage device, or the like. Further embodiments implement larger scale server configurations. In other embodiments, the computing architecture 2900 has a single processor with one core or more than one processor. Note that the term "processor" refers to a processor with a single core or a processor package with multiple processor cores. In at least one embodiment, the computing architecture 2900 is representative of the components of the system 2462. More generally, the computing architecture 2900 is configured to implement all logic, systems, logic flows, methods, apparatuses, and functionality described herein with reference to previous figures.

As used in this application, the terms "system" and "component" and "module" are intended to refer to a computer-related entity, either hardware, a combination of hardware and software, software, or software in execution, examples of which are provided by the exemplary computing architecture 2900. For example, a component is, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server are a component. One or more components reside within a process and/or thread of execution, and a component is localized on one computer and/or distributed between two or more computers. Further, components are communicatively coupled to each other by various types of communications media to coordinate operations. The coordination involves the uni-directional or bi-directional exchange of information. For instance, the components communicate information in the form of signals communicated over the communications media. The information is implemented as signals allocated to various signal lines. In such allocations, each message is a signal. Further embodiments, however, alternatively employ data messages. Such data messages may be sent across various connections. Exemplary connections include parallel interfaces, serial interfaces, and bus interfaces.

As shown in FIG. 29, computing architecture 2900 comprises a system-on-chip (SoC) 2902 for mounting platform components. System-on-chip (SoC) 2902 is a point-to-point (P2P) interconnect platform that includes a first processor 2904 and a second processor 2906 coupled via a point-to-point interconnect 2970 such as an Ultra Path Interconnect (UPI). In other embodiments, the computing architecture 2900 is another bus architecture, such as a multi-drop bus. Furthermore, each of processor 2904 and processor 2906 are processor packages with multiple processor cores including core(s) 2908 and core(s) 2910, respectively. While the computing architecture 2900 is an example of a two-socket (2S) platform, other embodiments include more than two sockets or one socket. For example, some embodiments include a four-socket (4S) platform or an eight-socket (8S) platform. Each socket is a mount for a processor and may have a socket identifier. Note that the term platform refers to a motherboard with certain components mounted such as the processor 2904 and chipset 2932. Some platforms include additional components and some platforms include sockets to mount the processors and/or the chipset. Furthermore, some platforms do not have sockets (e.g., SoC, or the like). Although depicted as a SoC 2902, one or more of the components of the SoC 2902 are included in a single die package, a multi-chip module (MCM), a multi-die package, a chiplet, a bridge, and/or an interposer. Therefore, embodiments are not limited to a SoC.

The processor 2904 and processor 2906 are any commercially available processors, including without limitation an Intel® Celeron®, Core®, Core (2) Duo®, Itanium®, Pentium®, Xeon®, and XScale® processors; AMD® Athlon®, Duron® and Opteron® processors; ARM® application, embedded and secure processors; IBM® and Motorola® DragonBall® and PowerPC® processors; IBM and Sony® Cell processors; and similar processors. Dual microprocessors, multi-core processors, and other multi-processor architectures are also employed as the processor 2904 and/or processor 2906. Additionally, the processor 2904 need not be identical to processor 2906.

Processor 2904 includes an integrated memory controller (IMC) 2920 and point-to-point (P2P) interface 2924 and P2P interface 2928. Similarly, the processor 2906 includes an IMC 2922 as well as P2P interface 2926 and P2P interface 2930. IMC 2920 and IMC 2922 couple the processor 2904 and processor 2906, respectively, to respective memories (e.g., memory 2916 and memory 2918). Memory 2916 and memory 2918 are portions of the main memory (e.g., a dynamic random-access memory (DRAM)) for the platform such as double data rate type 4 (DDR4) or type 5 (DDR5) synchronous DRAM (SDRAM). In the present embodiment, the memory 2916 and the memory 2918 locally attach to the respective processors (i.e., processor 2904 and processor 2906). In other embodiments, the main memory couple with the processors via a bus and shared memory hub. Processor 2904 includes registers 2912 and processor 2906 includes registers 2914.

Computing architecture 2900 includes chipset 2932 coupled to processor 2904 and processor 2906. Furthermore, chipset 2932 are coupled to storage device 2950, for example, via an interface (I/F) 2938. The I/F 2938 may be, for example, a Peripheral Component Interconnect-enhanced (PCIe) interface, a Compute Express Link® (CXL) interface, or a Universal Chiplet Interconnect Express (UCIe) interface. Storage device 2950 stores instructions executable by circuitry of computing architecture 2900 (e.g., processor 2904, processor 2906, GPU 2948, accelerator 2954, vision processing unit 2956, or the like). For example, storage device 2950 can store instructions for the client device 2408, the training device 2518, devices in the system 2462, or the like.

Processor 2904 couples to the chipset 2932 via P2P interface 2928 and P2P 2934 while processor 2906 couples to the chipset 2932 via P2P interface 2930 and P2P 2936. Direct media interface (DMI) 2976 and DMI 2978 couple the P2P interface 2928 and the P2P 2934 and the P2P interface 2930 and P2P 2936, respectively. DMI 2976 and DMI 2978 is a high-speed interconnect that facilitates, e.g., eight Giga Transfers per second (GT/s) such as DMI 3.0. In other embodiments, the processor 2904 and processor 2906 interconnect via a bus.

The chipset 2932 comprises a controller hub such as a platform controller hub (PCH). The chipset 2932 includes a system clock to perform clocking functions and include interfaces for an I/O bus such as a universal serial bus (USB), peripheral component interconnects (PCIs), CXL interconnects, UCIe interconnects, interface serial peripheral interconnects (SPIs), integrated interconnects (I2Cs), and the like, to facilitate connection of peripheral devices on the platform. In other embodiments, the chipset 2932 comprises more than one controller hub such as a chipset with a memory controller hub, a graphics controller hub, and an input/output (I/O) controller hub.

In the depicted example, chipset 2932 couples with a trusted platform module (TPM) 2944 and UEFI, BIOS, FLASH circuitry 2946 via I/F 2942. The TPM 2944 is a dedicated microcontroller designed to secure hardware by integrating cryptographic keys into devices. The UEFI, BIOS, FLASH circuitry 2946 may provide pre-boot code. The I/F 2942 may also be coupled to a network interface circuit (NIC) 2980 for connections off-chip.

Furthermore, chipset 2932 includes the I/F 2938 to couple chipset 2932 with a high-performance graphics engine, such as, graphics processing circuitry or a graphics processing unit (GPU) 2948. In other embodiments, the computing architecture 2900 includes a flexible display interface (FDI) (not shown) between the processor 2904 and/or the processor 2906 and the chipset 2932. The FDI interconnects a graphics processor core in one or more of processor 2904 and/or processor 2906 with the chipset 2932.

The computing architecture 2900 is operable to communicate with wired and wireless devices or entities via the network interface (NIC) 180 using the IEEE 802 family of standards, such as wireless devices operatively disposed in wireless communication (e.g., IEEE 802.11 over-the-air modulation techniques). This includes at least Wi-Fi (or Wireless Fidelity), WiMax, and Bluetooth™ wireless technologies, 3G, 4G, LTE wireless technologies, among others. Thus, the communication is a predefined structure as with a conventional network or simply an ad hoc communication between at least two devices. Wi-Fi networks use radio technologies called IEEE 802.11x (a, b, g, n, ac, ax, etc.) to provide secure, reliable, fast wireless connectivity. A Wi-Fi network is used to connect computers to each other, to the Internet, and to wired networks (which use IEEE 802.3-related media and functions).

Additionally, accelerator 2954 and/or vision processing unit 2956 are coupled to chipset 2932 via I/F 2938. The accelerator 2954 is representative of any type of accelerator device (e.g., a data streaming accelerator, cryptographic accelerator, cryptographic co-processor, an offload engine, etc.). One example of an accelerator 2954 is the Intel® Data Streaming Accelerator (DSA). The accelerator 2954 is a device including circuitry to accelerate copy operations, data encryption, hash value computation, data comparison operations (including comparison of data in memory 2916 and/or memory 2918), and/or data compression. Examples for the accelerator 2954 include a USB device, PCI device, PCIe device, CXL device, UCIe device, and/or an SPI device. The accelerator 2954 also includes circuitry arranged to execute machine learning (ML) related operations (e.g., training, inference, etc.) for ML models. Generally, the accelerator 2954 is specially designed to perform computationally intensive operations, such as hash value computations, comparison operations, cryptographic operations, and/or compression operations, in a manner that is more efficient than when performed by the processor 2904 or processor 2906. Because the load of the computing architecture 2900 includes hash value computations, comparison operations, cryptographic operations, and/or compression operations, the accelerator 2954 greatly increases performance of the computing architecture 2900 for these operations.

The accelerator 2954 includes one or more dedicated work queues and one or more shared work queues (each not pictured). Generally, a shared work queue is configured to store descriptors submitted by multiple software entities. The software is any type of executable code, such as a process, a thread, an application, a virtual machine, a container, a microservice, etc., that share the accelerator 2954. For example, the accelerator 2954 is shared according to the Single Root I/O virtualization (SR-IOV) architecture and/or the Scalable I/O virtualization (S-IOV) architecture. Embodiments are not limited in these contexts. In some embodiments, software uses an instruction to atomically submit the descriptor to the accelerator 2954 via a non-posted write (e.g., a deferred memory write (DMWr)). One example of an instruction that atomically submits a work descriptor to the shared work queue of the accelerator 2954 is the ENQCMD command or instruction (which may be referred to as "ENQCMD" herein) supported by the Intel® Instruction Set Architecture (ISA). However, any instruction having a descriptor that includes indications of the operation to be performed, a source virtual address for the descriptor, a destination virtual address for a device-specific register of the shared work queue, virtual addresses of parameters, a virtual address of a completion record, and an identifier of an address space of the submitting process is representative of an instruction that atomically submits a work descriptor to the shared work queue of the accelerator 2954. The dedicated work queue may accept job submissions via commands such as the movdir64b instruction.

Various I/O devices 2960 and display 2952 couple to the bus 2972, along with a bus bridge 2958 which couples the bus 2972 to a second bus 2974 and an I/F 2940 that connects the bus 2972 with the chipset 2932. In one embodiment, the second bus 2974 is a low pin count (LPC) bus. Various input/output (I/O) devices couple to the second bus 2974 including, for example, a keyboard 2962, a mouse 2964 and communication devices 2966.

Furthermore, an audio I/O 2968 couples to second bus 2974. Many of the I/O devices 2960 and communication devices 2966 reside on the system-on-chip (SoC) 2902 while the keyboard 2962 and the mouse 2964 are add-on peripherals. In other embodiments, some or all the I/O devices 2960 and communication devices 2966 are add-on peripherals and do not reside on the system-on-chip (SoC) 2902.

The various elements of the devices as previously described with reference to the figures include various hardware elements, software elements, or a combination of both. Examples of hardware elements include devices, logic devices, components, processors, microprocessors, circuits, processors, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. However, determining whether an embodiment is implemented using hardware elements and/or software elements varies in accordance with any number of factors, such as desired computational rate, power levels, heat tolerances, processing cycle budget, input data rates, output data rates, memory resources, data bus speeds and other design or performance constraints, as desired for a given implementation.

One or more aspects of at least one embodiment are implemented by representative instructions stored on a machine-readable medium which represents various logic within the processor, which when read by a machine causes the machine to fabricate logic to perform the techniques described herein. Such representations, known as "intellectual property (IP) cores" are stored on a tangible, machine readable medium and supplied to various customers or manufacturing facilities to load into the fabrication machines that make the logic or processor. Some embodiments are implemented, for example, using a machine-readable medium or article which may store an instruction or a set of instructions that, when executed by a machine, causes the machine to perform a method and/or operations in accordance with the embodiments. Such a machine includes, for example, any suitable processing platform, computing platform, computing device, processing device, computing system, processing system, processing devices, computer, processor, or the like, and is implemented using any suitable combination of hardware and/or software. The machine-readable medium or article includes, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions include any suitable type of code, such as source code, compiled code, interpreted code, executable code, static code, dynamic code, encrypted code, and the like, implemented using any suitable high-level, low-level, object-oriented, visual, compiled and/or interpreted programming language.

As utilized herein, terms "component," "system," "interface," and the like are intended to refer to a computer-related entity, hardware, software (e.g., in execution), and/or firmware. For example, a component is a processor (e.g., a microprocessor, a controller, or other processing device), a process running on a processor, a controller, an object, an executable, a program, a storage device, a computer, a tablet PC and/or a user equipment (e.g., mobile phone, etc.) with a processing device. By way of illustration, an application running on a server and the server is also a component. One or more components reside within a process, and a component is localized on one computer and/or distributed between two or more computers. A set of elements or a set of other components are described herein, in which the term "set" can be interpreted as "one or more."

Further, these components execute from various computer readable storage media having various data structures stored thereon such as with a module, for example. The components communicate via local and/or remote processes such as in accordance with a signal having one or more data packets (e.g., data from one component interacting with another component in a local system, distributed system, and/or across a network, such as, the Internet, a local area network, a wide area network, or similar network with other systems via the signal).

As another example, a component is an apparatus with specific functionality provided by mechanical parts operated by electric or electronic circuitry, in which the electric or electronic circuitry is operated by a software application or a firmware application executed by one or more processors. The one or more processors are internal or external to the apparatus and execute at least a part of the software or firmware application. As yet another example, a component is an apparatus that provides specific functionality through electronic components without mechanical parts; the electronic components include one or more processors therein to execute software and/or firmware that confer(s), at least in part, the functionality of the electronic components.

Use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form. Furthermore, to the extent that the terms "including", "includes", "having", "has", "with", or variants thereof are used in either the detailed description or the claims, such terms are intended to be inclusive in a manner similar to the term "comprising." Additionally, in situations wherein one or more numbered items are discussed (e.g., a "first X", a "second X", etc.), in general the one or more numbered items may be distinct or they may be the same, although in some situations the context may indicate that they are distinct or that they are the same.

As used herein, the term "circuitry" may refer to, be part of, or include a circuit, an integrated circuit (IC), a monolithic IC, a discrete circuit, a hybrid integrated circuit (HIC), an Application Specific Integrated Circuit (ASIC), an electronic circuit, a logic circuit, a microcircuit, a hybrid circuit, a microchip, a chip, a chiplet, a chipset, a multi-chip module (MCM), a semiconductor die, a system on a chip (SoC), a processor (shared, dedicated, or group), a processor circuit, a processing circuit, or associated memory (shared, dedicated, or group) operably coupled to the circuitry that execute one or more software or firmware programs, a combinational logic circuit, or other suitable hardware components that provide the described functionality. In some embodiments, the circuitry is implemented in, or functions associated with the circuitry are implemented by, one or more software or firmware modules. In some embodiments, circuitry includes logic, at least partially operable in hardware. It is noted that hardware, firmware and/or software elements may be collectively or individually referred to herein as "logic" or "circuit."

Some embodiments are described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Moreover, unless otherwise noted the features described above are recognized to be usable together in any combination. Thus, any features discussed separately can be employed in combination with each other unless it is noted that the features are incompatible with each other.

Some embodiments are presented in terms of program procedures executed on a computer or network of computers. A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein, which form part of one or more embodiments. Rather, the operations are machine operations. Useful machines for performing operations of various embodiments include general purpose digital computers or similar devices.

Some embodiments are described using the expression "coupled" and "connected" along with their derivatives. These terms are not necessarily intended as synonyms for each other. For example, some embodiments are described using the terms "connected" and/or "coupled" to indicate that two or more elements are in direct physical or electrical contact with each other. The term "coupled," however, also means that two or more elements are not in direct contact with each other, but yet still co-operate or interact with each other.

Various embodiments also relate to apparatus or systems for performing these operations. This apparatus is specially constructed for the required purpose or it comprises a general purpose computer as selectively activated or reconfigured by a computer program stored in the computer. The procedures presented herein are not inherently related to a particular computer or other apparatus. Various general purpose machines are used with programs written in accordance with the teachings herein, or it proves convenient to construct more specialized apparatus to perform the required method steps. The required structure for a variety of these machines are apparent from the description given.

It is emphasized that the Abstract of the Disclosure is provided to allow a reader to quickly ascertain the nature of the technical disclosure. It is submitted with the understanding that it will not be used to interpret or limit the scope or meaning of the claims. In addition, the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

The following examples pertain to further embodiments, from which numerous permutations and configurations will be apparent.

What is claimed is:

1. A method, comprising:
   receiving a selection of a collage template to generate a digital collage, the collage template comprising a digital frame of a set of digital frames;
   retrieving a reference image associated with the digital frame using an image fitting module;
   receiving a selection of a digital image from a graphical user interface (GUI);
   identifying a visual object within a target region of the digital image to be placed in the digital frame based on the reference image using a machine learning model;
   determining a defined position for the visual object within the digital frame based on a position of a visual object in a reference region of the reference image represented as coordinates in a coordinate system; and
   inserting the target region with the visual object at the defined position within the digital frame of the collage template, wherein the entire digital frame is filled with the target region.

2. The method of claim 1, comprising:
   retrieving visual object data for the reference image associated with the digital frame using the machine learning model; and
   identifying the visual object within the target region of the digital image based on the visual object data for the reference image using the machine learning model;
   wherein the visual object data for the reference image comprises a reference segmented avatar representing a visual object within the reference image, the visual object comprising a person with a set of body segments, the reference segmented avatar comprising a set of key points, line segments, and angles between line segments representing the set of body segments for the person.

3. The method of claim 1, comprising generating a target segmented avatar representing the visual object within the digital image, the visual object comprising a person with a set of body segments, the target segmented avatar comprising a set of key points, line segments, and angles between line segments representing the set of body segments for the person.

4. The method of claim 1, comprising matching a portion of a reference segmented avatar for a visual object within the reference image with a portion of a target segmented avatar for the visual object within the digital image based on a shared number of key-points, a shared number of line segments, or a shared number of angles between line segments.

5. The method of claim 1, comprising identifying the visual object within the target region of the digital image based on a shared set of key points, line segments, and angles between line segments for a reference segmented avatar and a target segmented avatar.

6. The method of claim 1, comprising adjusting a visual property of the target region to place the visual object in the defined position within the digital frame based on a shared set of key points, line segments, and angles between line segments for a reference segmented avatar and a target segmented avatar.

7. The method of claim 6, wherein adjusting the visual property of the target region of the digital image comprises adjusting a size parameter, an angle parameter, an alignment parameter, a position parameter, a light parameter, a color parameter, a sharpness parameter, a filter parameter, a crop parameter, an orientation parameter, a transform parameter, a skew parameter, an aspect ratio parameter, an effect parameter, a spot removal parameter, an eye parameter, or a style parameter.

8. The method of claim 1, wherein the visual property comprises a size for the target region, further comprising:
   calculating a reference average length across line segments in a reference segmented avatar for a visual object within the reference image;
   calculating a target average length across line segments in a target segmented avatar for the visual object within the digital image; and
   adjusting a size parameter of the target region using a ratio of the reference average length and the target average length.

9. The method of claim 1, comprising adjusting a parameter of the digital frame of the collage template to fit the modified digital image, wherein the parameter represents a shape adjustment, a size adjustment, a border adjustment, a text adjustment, an edge adjustment, a sticker adjustment, or a background adjustment.

10. The method of claim 1, comprising:
generating the digital collage from the collage template; and
presenting the digital collage on a graphical user interface (GUI) of an electronic display of a client device.

11. A system, comprising:
a memory component; and
one or more processing devices coupled to the memory component, the one or more processing devices to perform operations comprising:
presenting a graphical user interface (GUI) for an image editing system, the GUI to include GUI elements for creating a digital collage;
receiving a selection of a collage template to generate a digital collage, the collage template comprising a digital frame of a set of digital frames;
retrieving a reference image associated with the digital frame using an image fitting module;
receiving a selection of a digital image from the GUI;
identifying a visual object within a target region of the digital image to be placed in the digital frame based on the reference image using a machine learning model;
determining a defined position for the visual object within the digital frame based on a position of a visual object in a reference region of the reference image represented as coordinates in a coordinate system; and
inserting the target region with the visual object at the defined position within the digital frame of the collage template, wherein the entire digital frame is filled with the target region.

12. The system of claim 11, comprising:
retrieving visual object data for the reference image associated with the digital frame using the machine learning model; and
identifying the visual object within the target region of the digital image based on the visual object data for the reference image using the machine learning model;
wherein the visual object data for the reference image comprises a reference segmented avatar representing a visual object within the reference image, the visual object comprising a person with a set of body segments, the reference segmented avatar comprising a set of key points, line segments, and angles between line segments representing the set of body segments for the person.

13. The system of claim 11, comprising generating a target segmented avatar representing the visual object within the digital image, the visual object comprising a person with a set of body segments, the target segmented avatar comprising a set of key points, line segments, and angles between line segments representing the set of body segments for the person.

14. The system of claim 11, comprising matching a portion of a reference segmented avatar for a visual object within the reference image with a portion of a target segmented avatar for the visual object within the digital image based on a shared number of key-points, a shared number of line segments, or a shared number of angles between line segments.

15. The system of claim 11, comprising:
identifying the visual object within the target region of the digital image based on a shared set of key points, line segments, and angles between line segments for a reference segmented avatar and a target segmented avatar; and
adjusting a visual property of the target region to place the visual object in the defined position within the digital frame based on the shared set of key points, line segments, and angles between line segments.

16. A non-transitory computer-readable medium storing executable instructions, which when executed by one or more processing devices, perform operations comprising:
receiving a selection of a collage template to generate a digital collage, the collage template comprising a digital frame of a set of digital frames;
retrieving a reference image associated with the digital frame using an image fitting module;
receiving a selection of a digital image from a graphical user interface (GUI);
identifying a visual object within a target region of the digital image to be placed in the digital frame based on the reference image using a machine learning model;
determining a defined position for the visual object within the digital frame based on a position of a visual object in a reference region of the reference image represented as coordinates in a coordinate system; and
inserting the target region with the visual object at the defined position within the digital frame of the collage template, wherein the entire digital frame is filled with the target region.

17. The non-transitory computer-readable medium of claim 16, comprising instructions, which when executed by one or more processing devices, perform operations comprising:
retrieving visual object data for the reference image associated with the digital frame using the machine learning model; and
identifying the visual object within the target region of the digital image based on the visual object data for the reference image using the machine learning model;
wherein the visual object data for the reference image comprises a reference segmented avatar representing a visual object within the reference image, the visual object comprising a person with a set of body segments, the reference segmented avatar comprising a set of key points, line segments, and angles between line segments representing the set of body segments for the person.

18. The non-transitory computer-readable medium of claim 16, comprising instructions, which when executed by one or more processing devices, perform operations comprising generating a target segmented avatar representing the visual object within the digital image, the visual object comprising a person with a set of body segments, the target segmented avatar comprising a set of key points, line segments, and angles between line segments representing the set of body segments for the person.

19. The non-transitory computer-readable medium of claim 16, comprising instructions, which when executed by one or more processing devices, perform operations comprising matching a portion of a reference segmented avatar for a visual object within the reference image with a portion of a target segmented avatar for the visual object within the digital image based on a shared number of key-points, a shared number of line segments, or a shared number of angles between line segments.

20. The non-transitory computer-readable medium of claim 16, comprising instructions, which when executed by one or more processing devices, perform operations comprising:
- identifying the visual object within the target region of the digital image based on a shared set of key points, line segments, and angles between line segments for a reference segmented avatar and a target segmented avatar; and
- adjusting a visual property of the target region to place the visual object in the defined position within the digital frame based on the shared set of key points, line segments, and angles between line segments.

\* \* \* \* \*